J. P. CLULEY.
COMPUTING MACHINE.
APPLICATION FILED NOV. 20, 1912.

1,332,543.

Patented Mar. 2, 1920.
30 SHEETS—SHEET 1.

Witnesses:
Eugene L. Riderhofer
Eugenie Le Roux

Inventor
John P. Cluley
by George Bayard Jones
Atty.

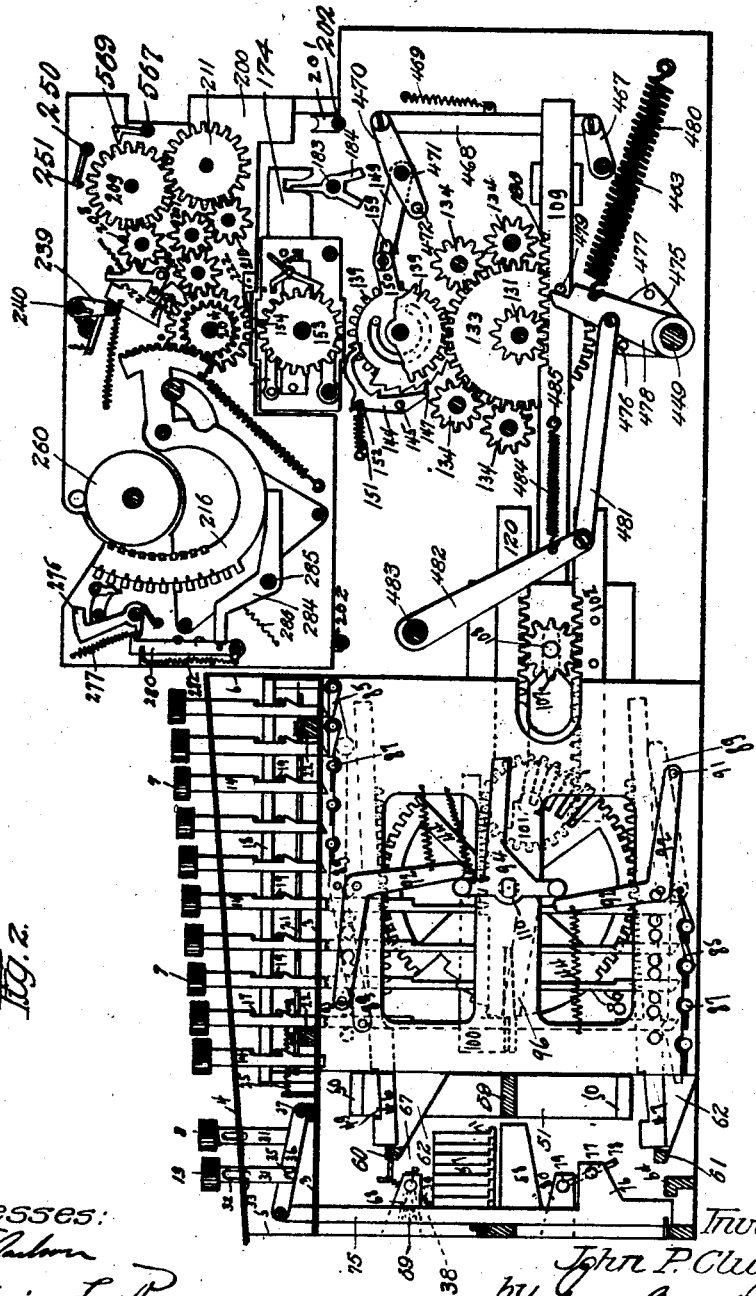

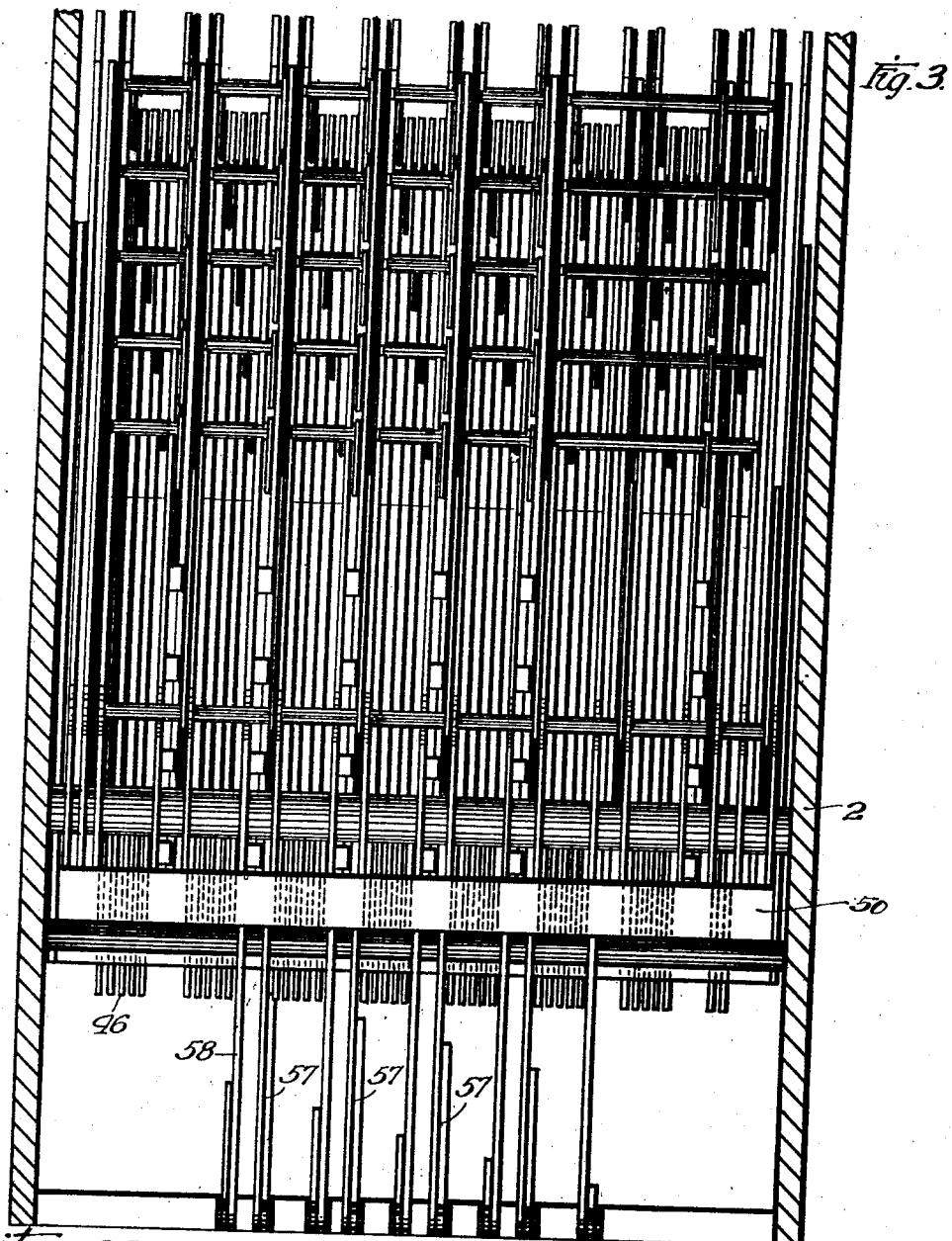

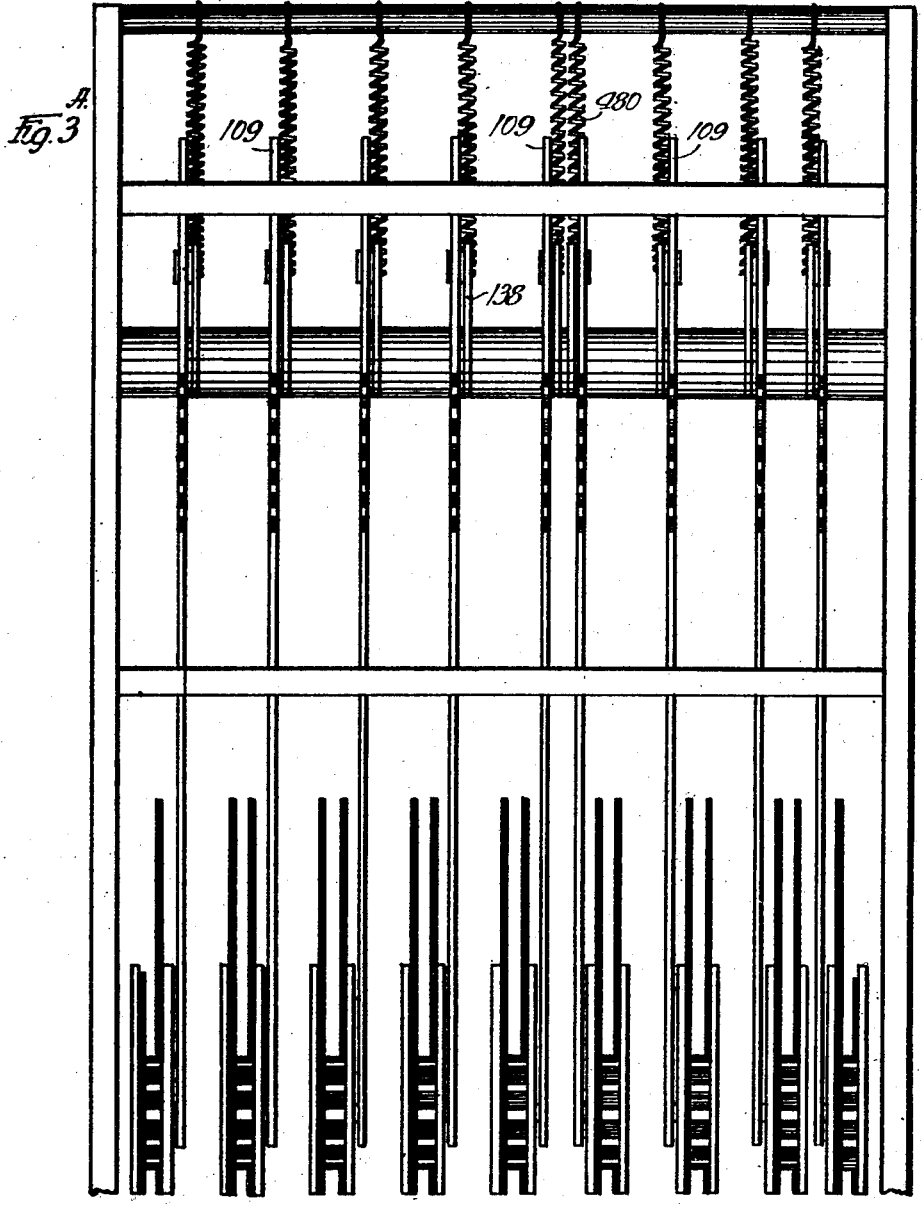

J. P. CLULEY.
COMPUTING MACHINE.
APPLICATION FILED NOV. 20, 1912.

1,332,543.

Patented Mar. 2, 1920.
30 SHEETS—SHEET 5.

J. P. CLULEY.
COMPUTING MACHINE.
APPLICATION FILED NOV. 20, 1912.

1,332,543.

Patented Mar. 2, 1920.
30 SHEETS—SHEET 6.

Witnesses:
Eugene L. Niederhofer
Eugénie Le Roux

Inventor:
John P. Cluley.
by George Depard Jones
Atty.

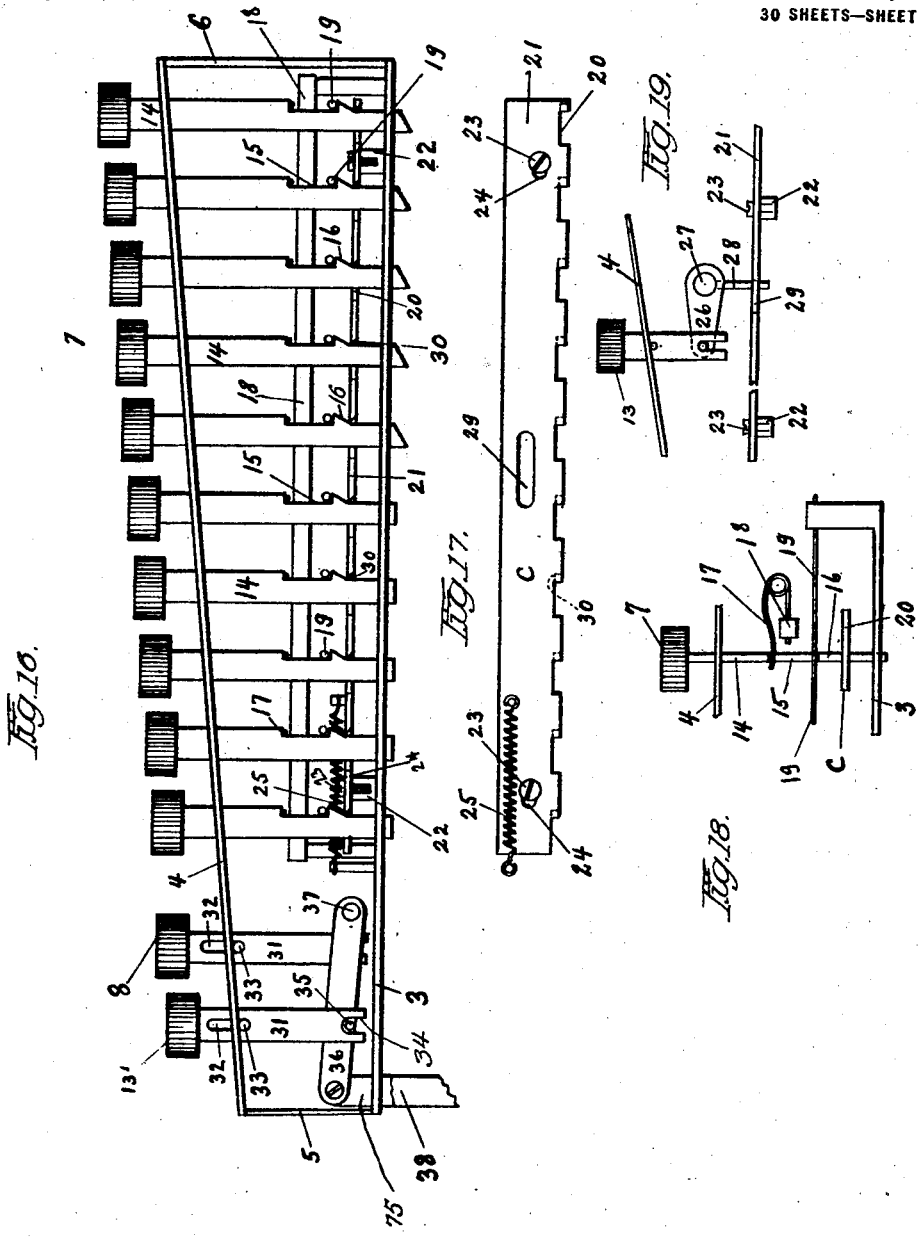

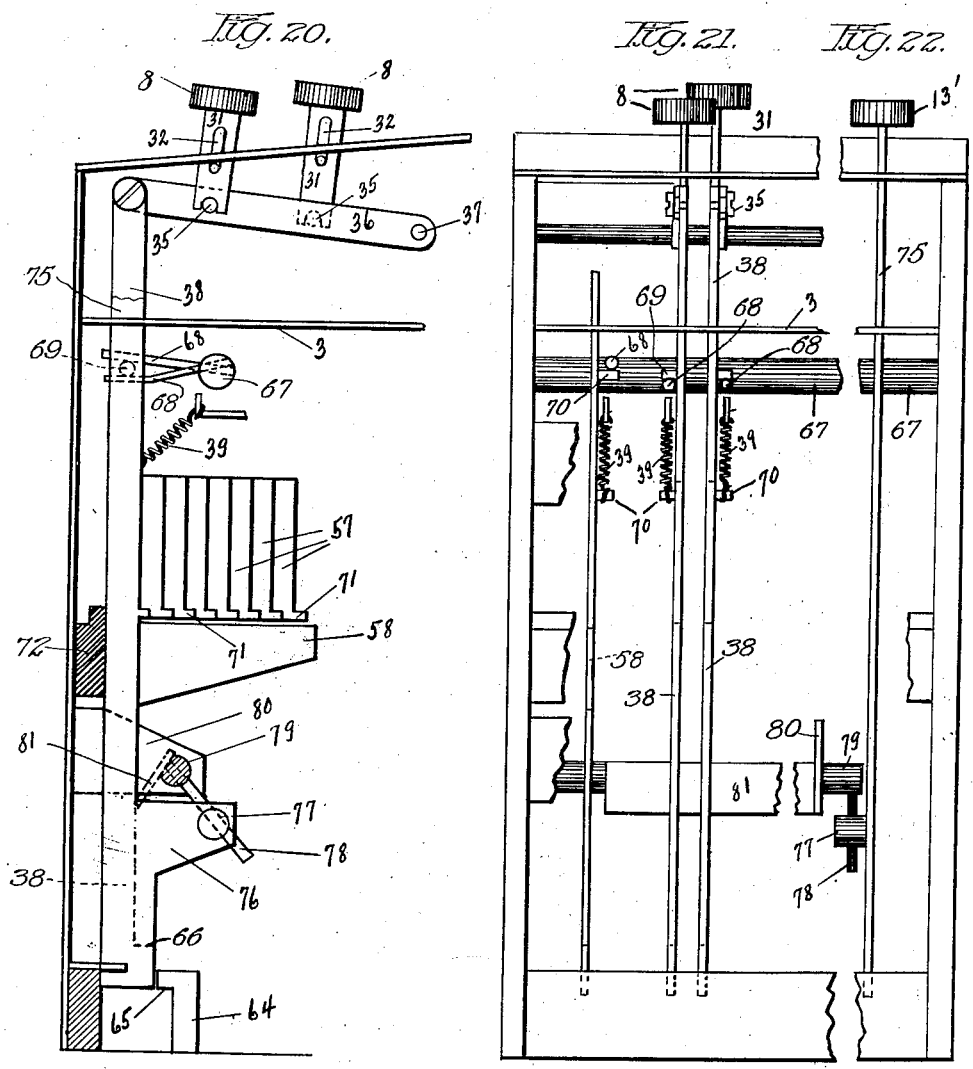

P. CLULEY.
COMPUTING MACHINE.
APPLICATION FILED NOV. 20, 1912.
1,332,543.
Patented Mar. 2, 1920.
30 SHEETS—SHEET 9.
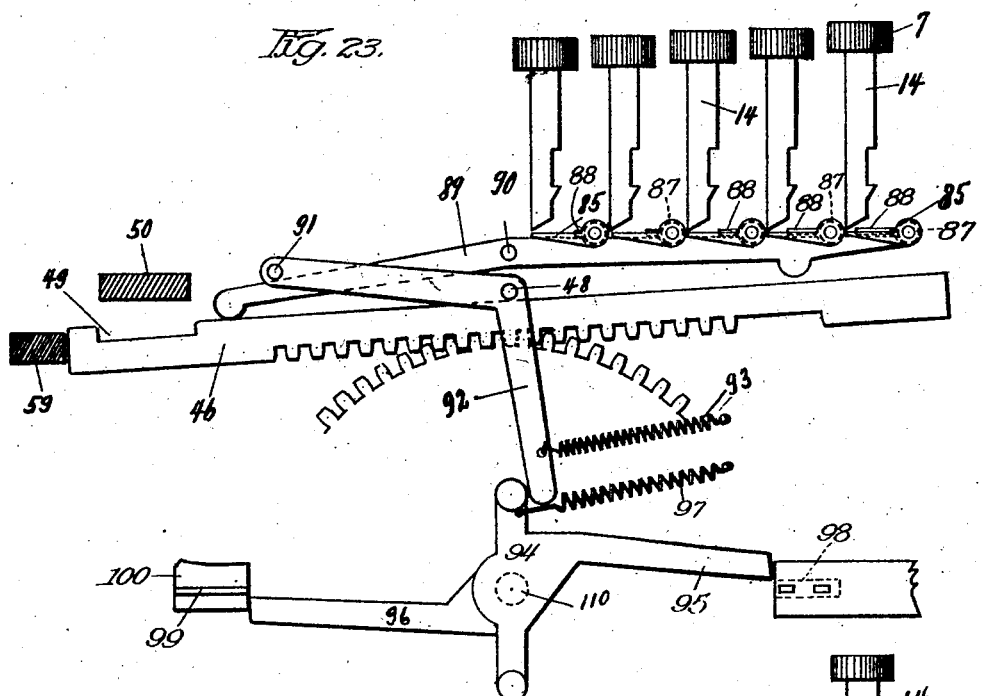
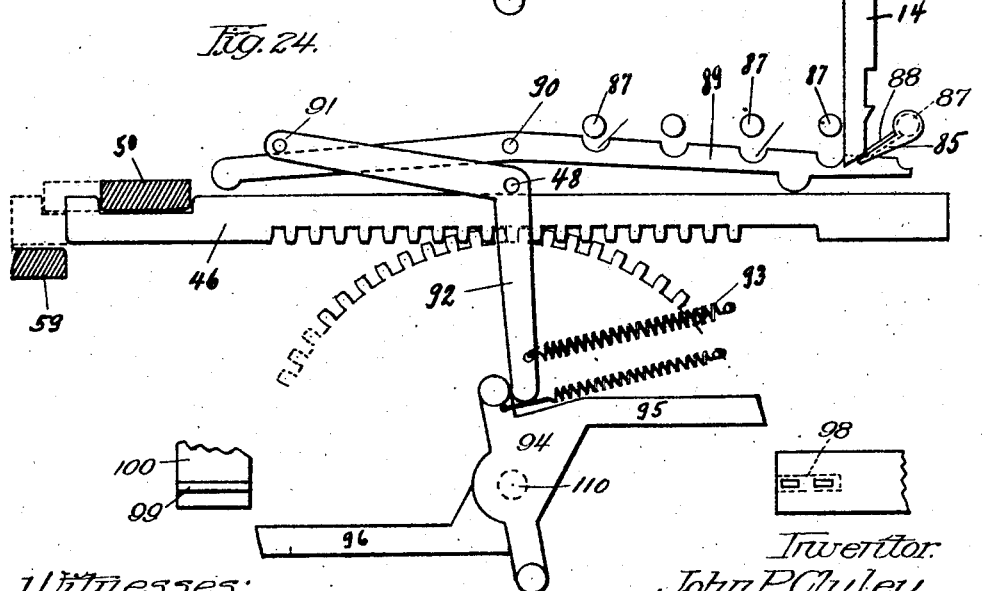
Witnesses:
Eugene L. Pederhofer
Eugenie Le Roux
Inventor:
John P. Cluley.
by George Byard Jones
Atty.

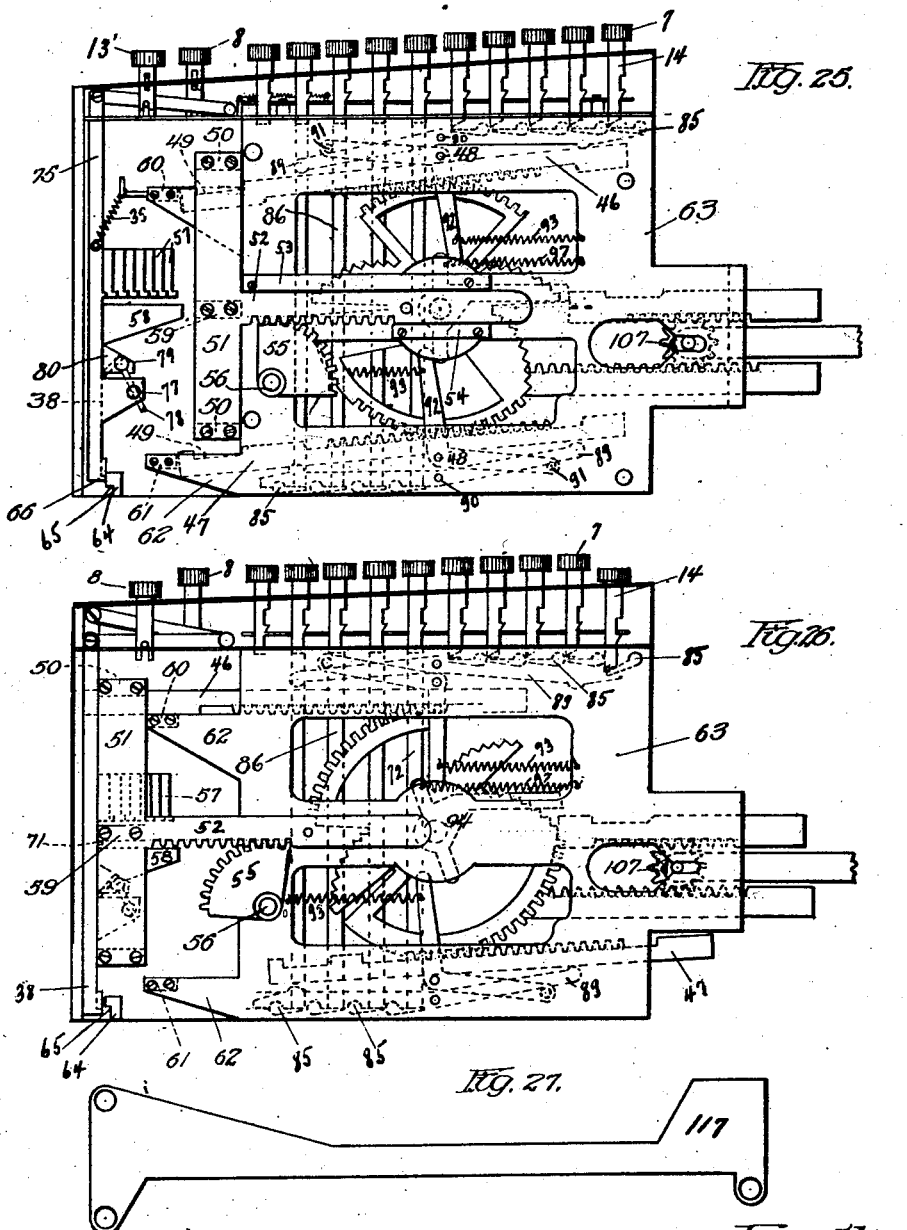

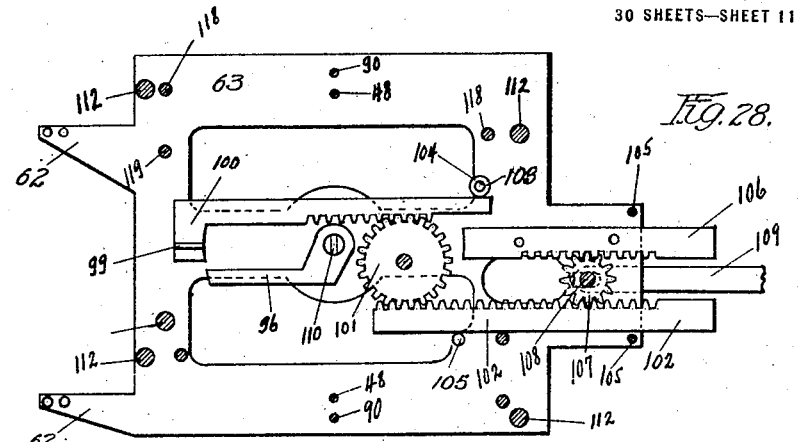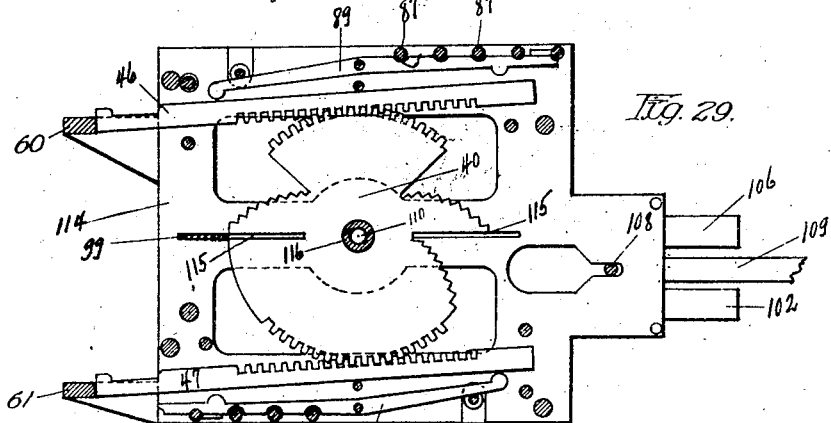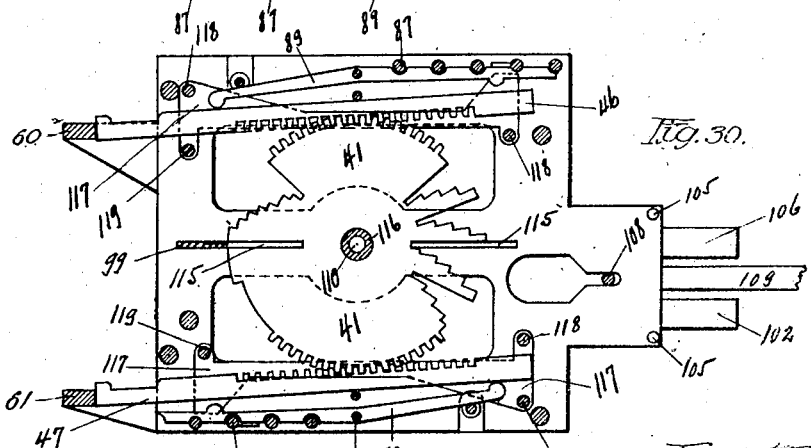

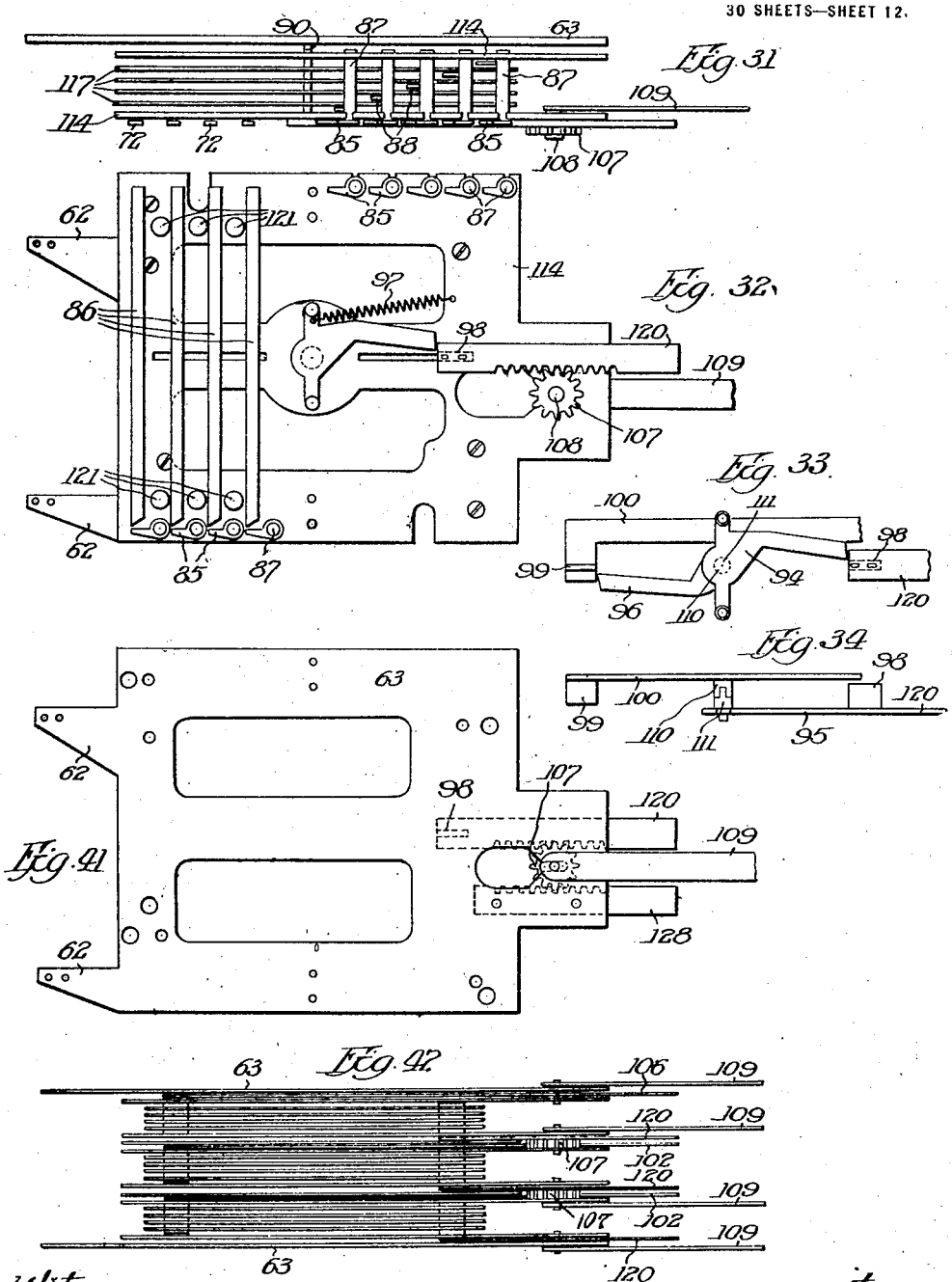

J. P. CLULEY.
COMPUTING MACHINE.
APPLICATION FILED NOV. 20, 1912.
1,332,543.
Patented Mar. 2, 1920.
30 SHEETS—SHEET 13.
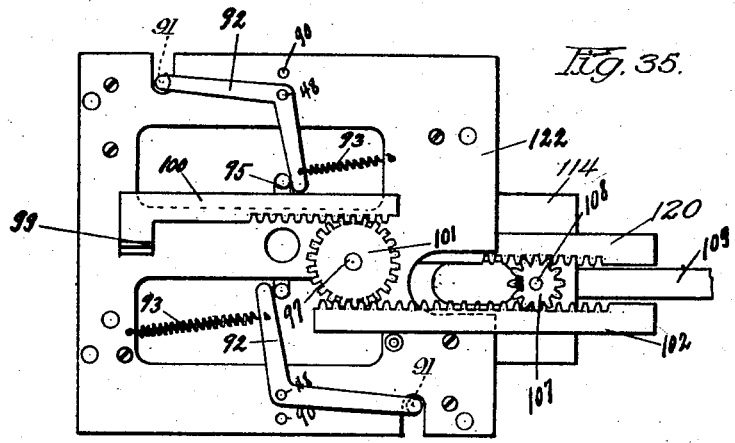
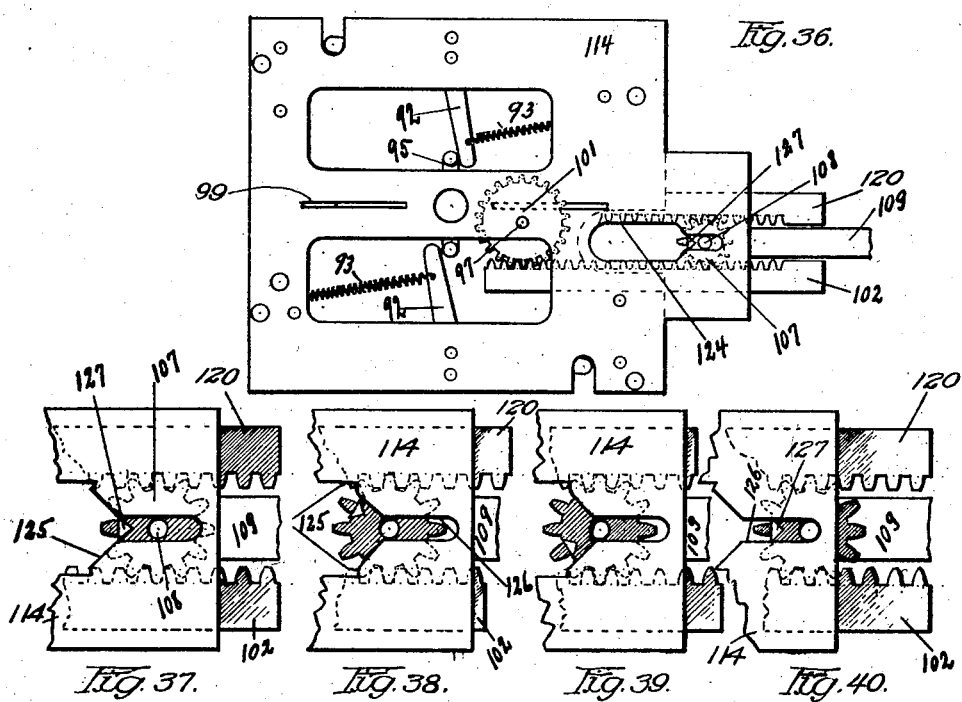

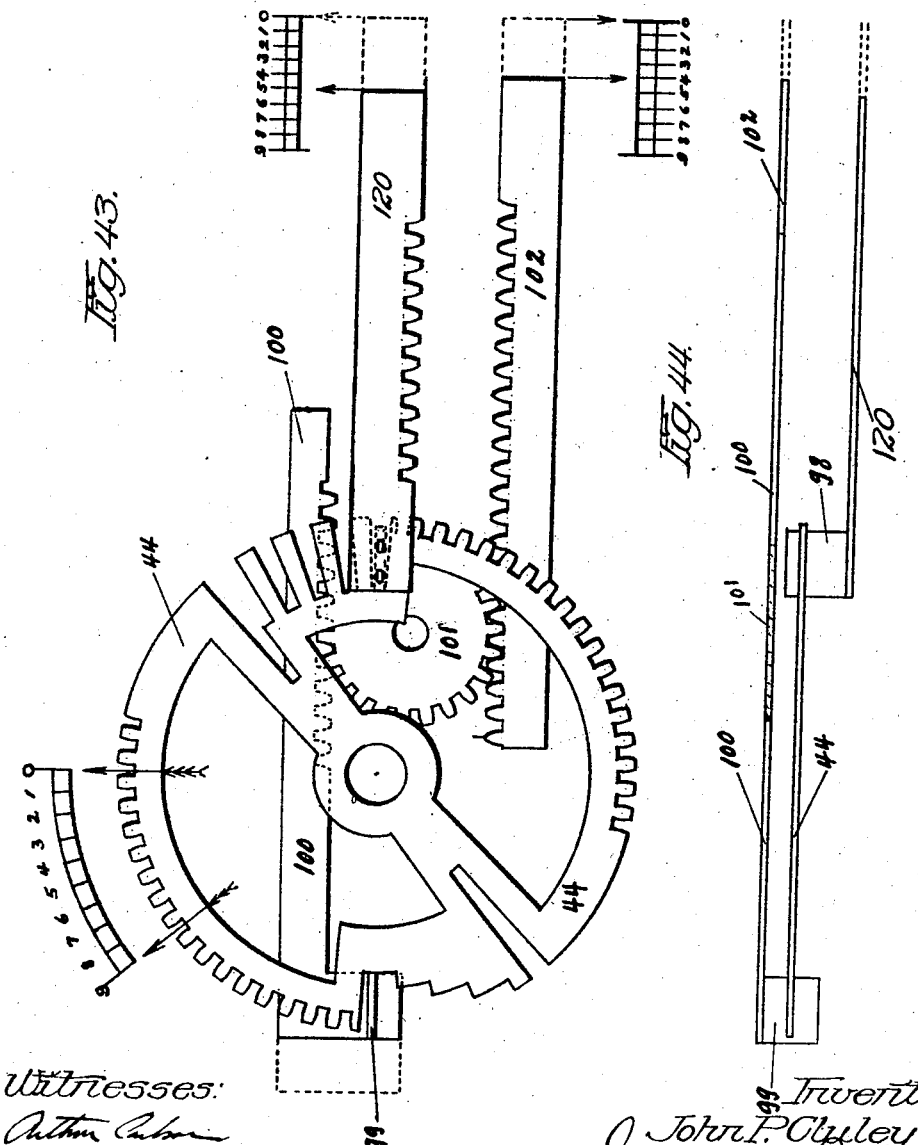

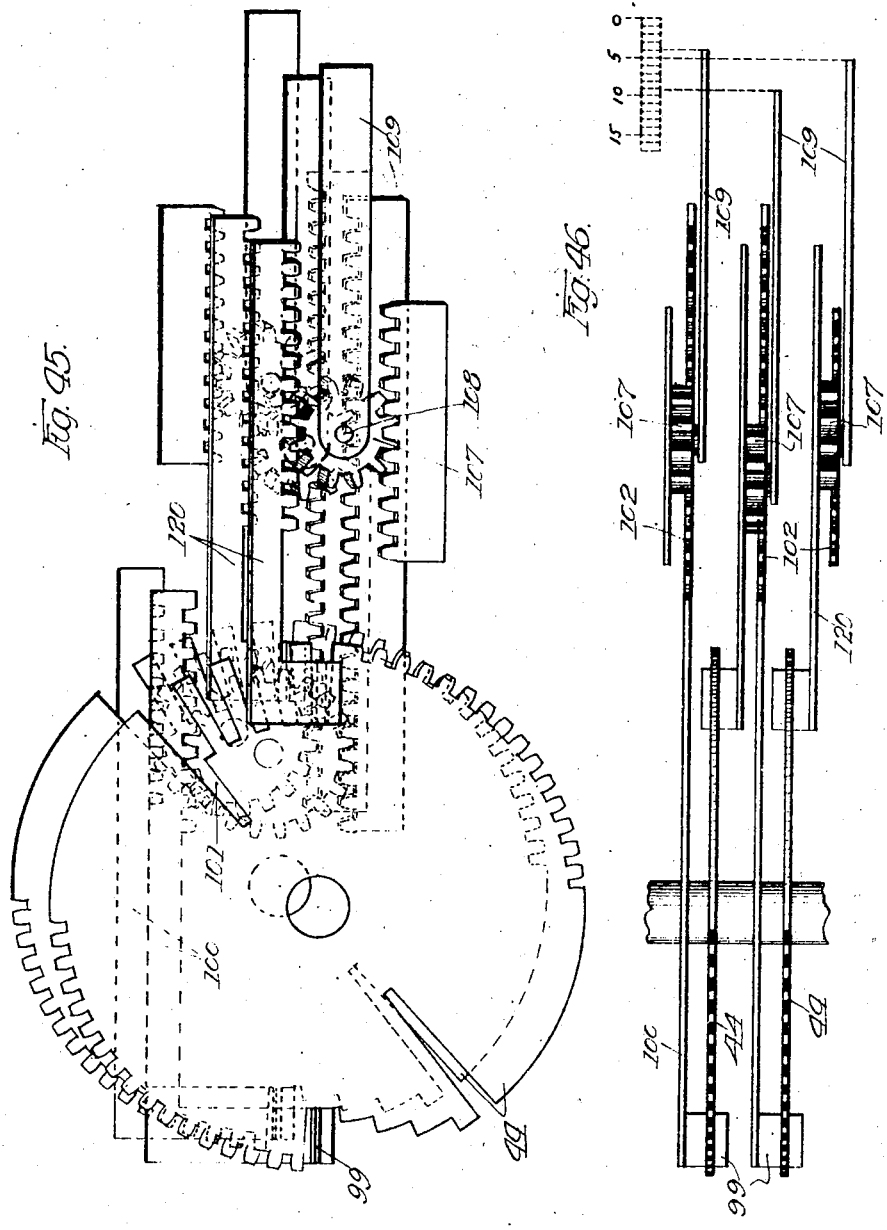

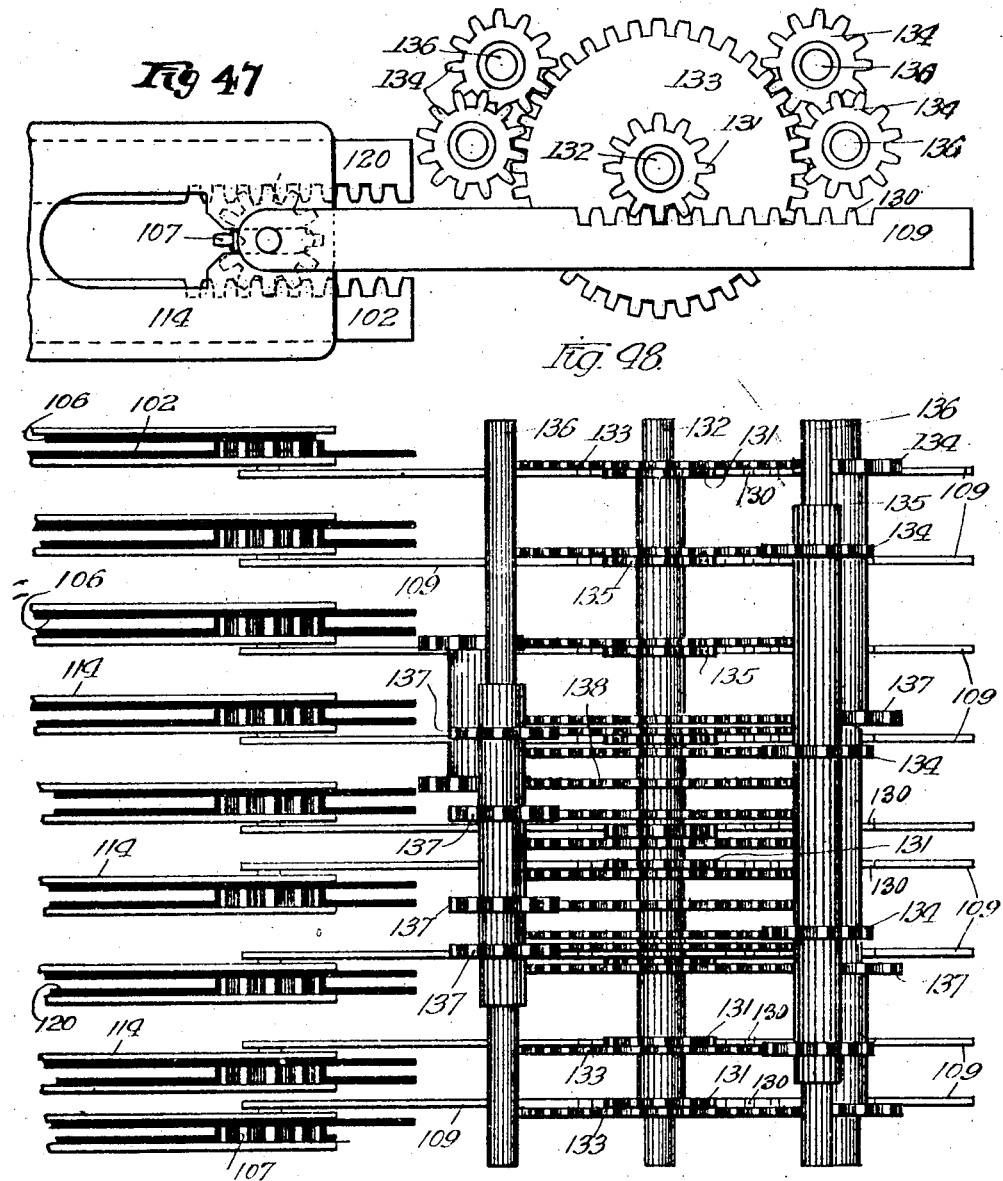

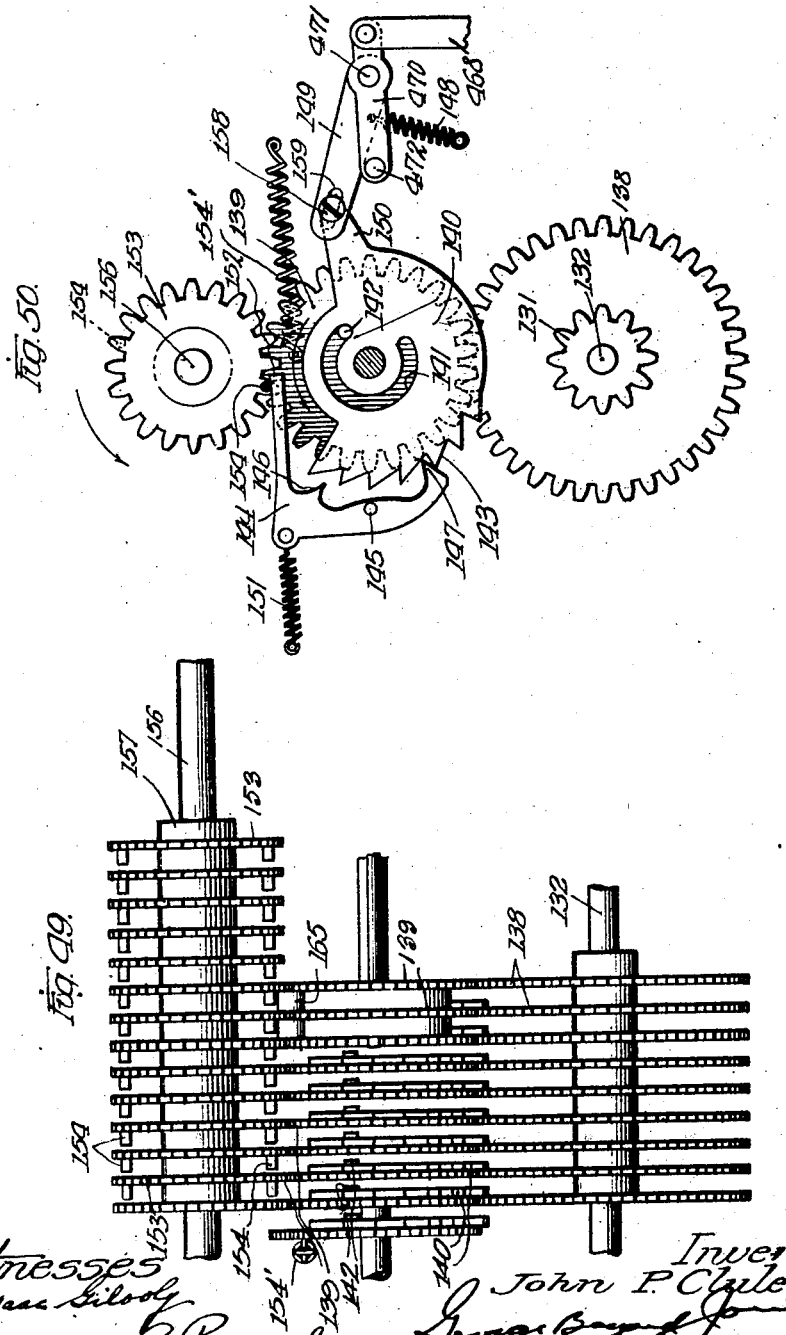

J. P. CLULEY.
COMPUTING MACHINE.
APPLICATION FILED NOV. 20, 1912.

1,332,543.

Patented Mar. 2, 1920.
30 SHEETS—SHEET 18.

Witnesses:
Eugene L. Niederhofer
Eugénie Le Roux

Inventor
John P. Cluley.
by George Bayard Jones
Atty.

J. P. CLULEY.
COMPUTING MACHINE.
APPLICATION FILED NOV. 20, 1912.
1,332,543.
Patented Mar. 2, 1920.
30 SHEETS—SHEET 19.
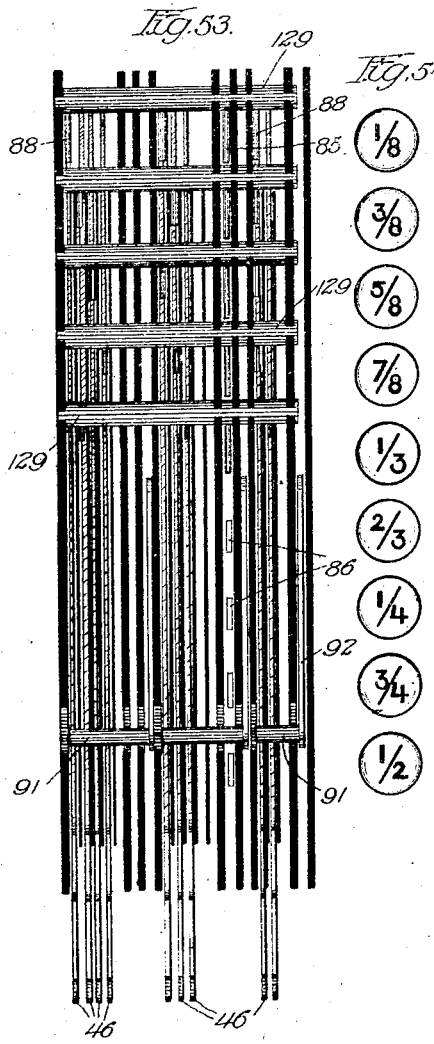
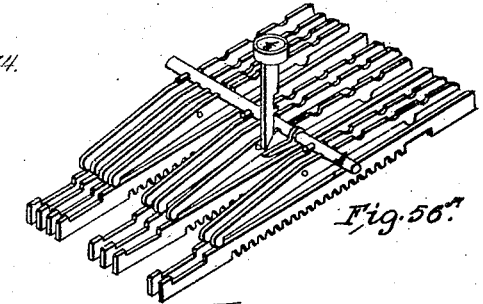
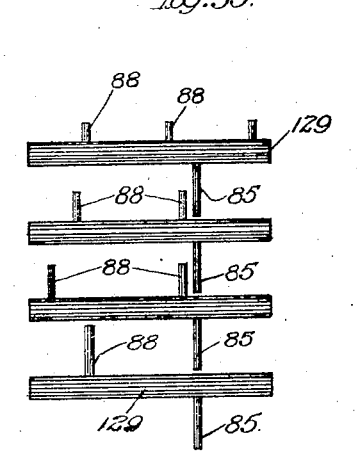
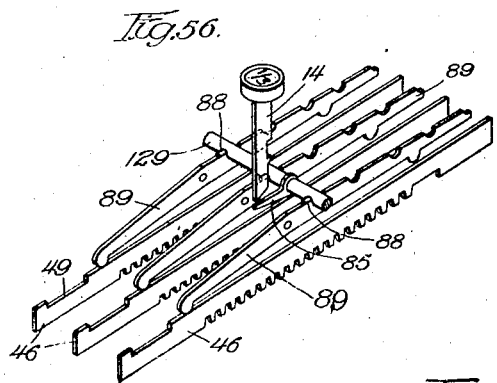

J. P. CLULEY.
COMPUTING MACHINE.
APPLICATION FILED NOV. 20, 1912.
1,332,543.
Patented Mar. 2, 1920.
30 SHEETS—SHEET 20.
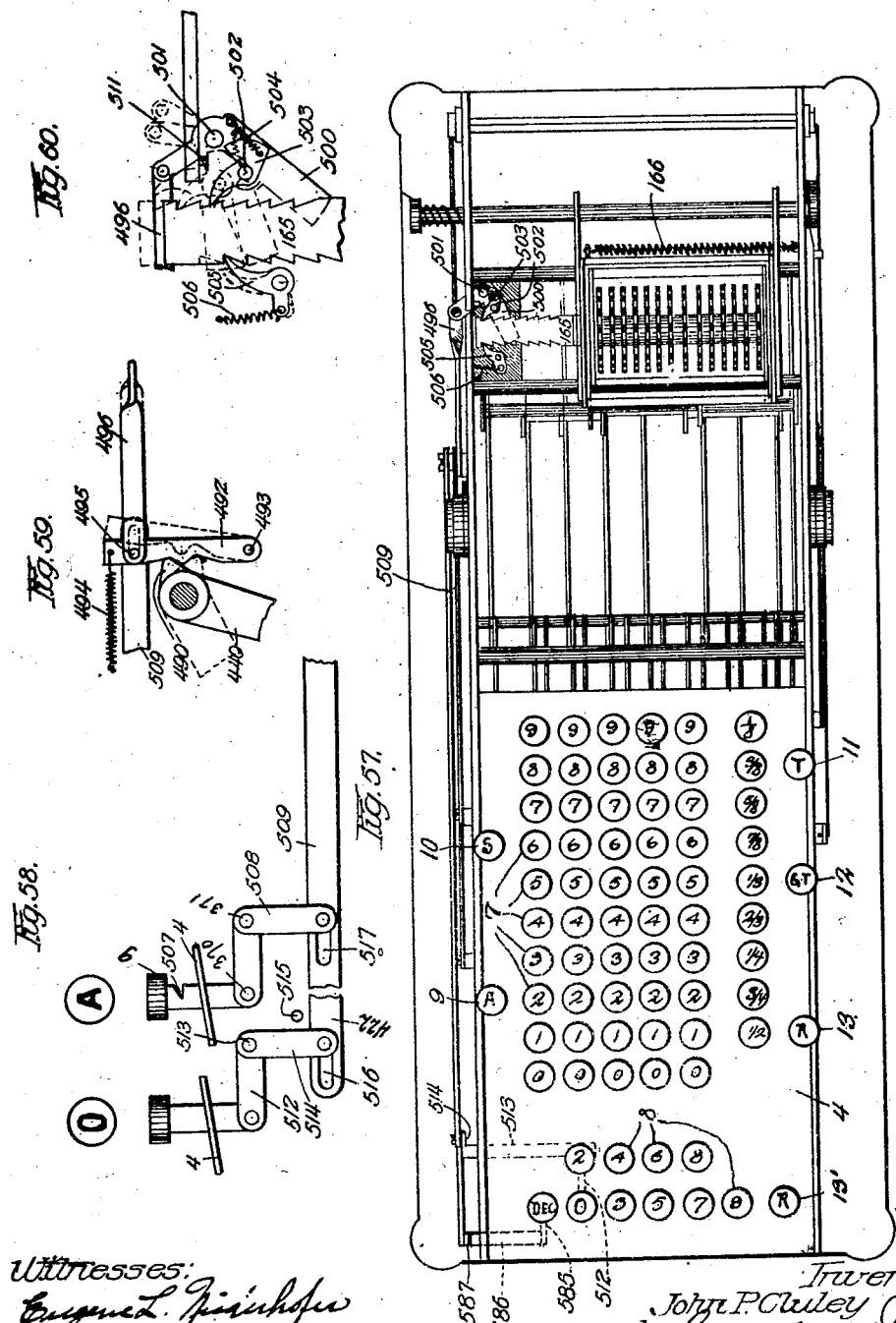

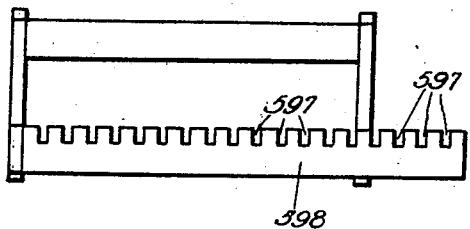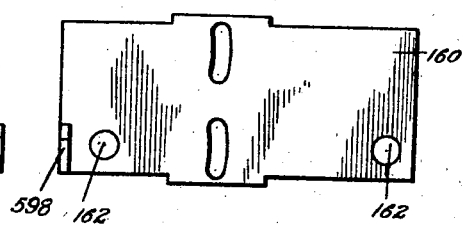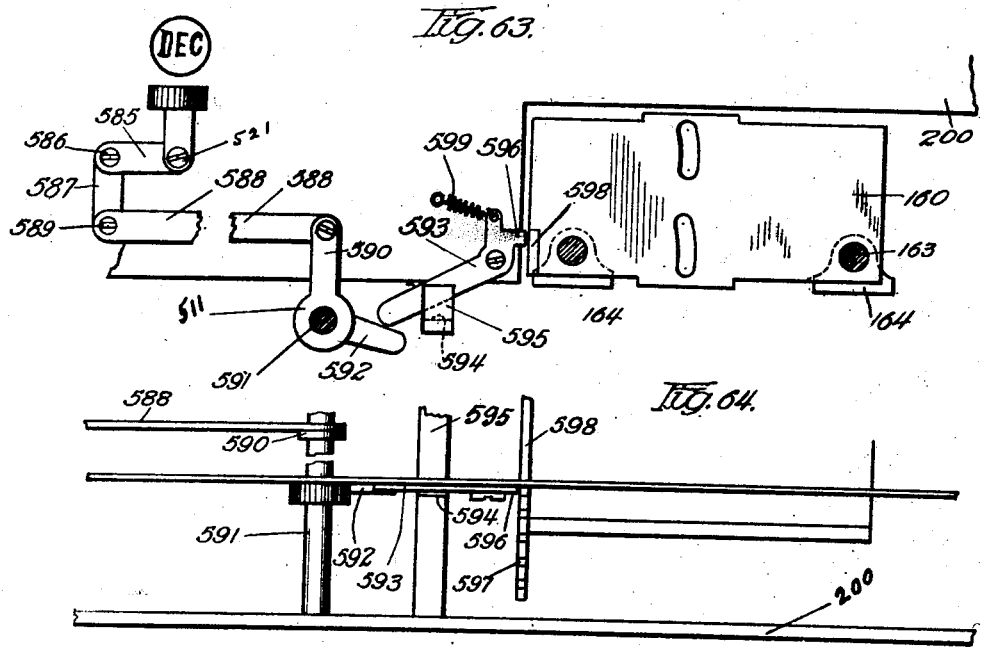

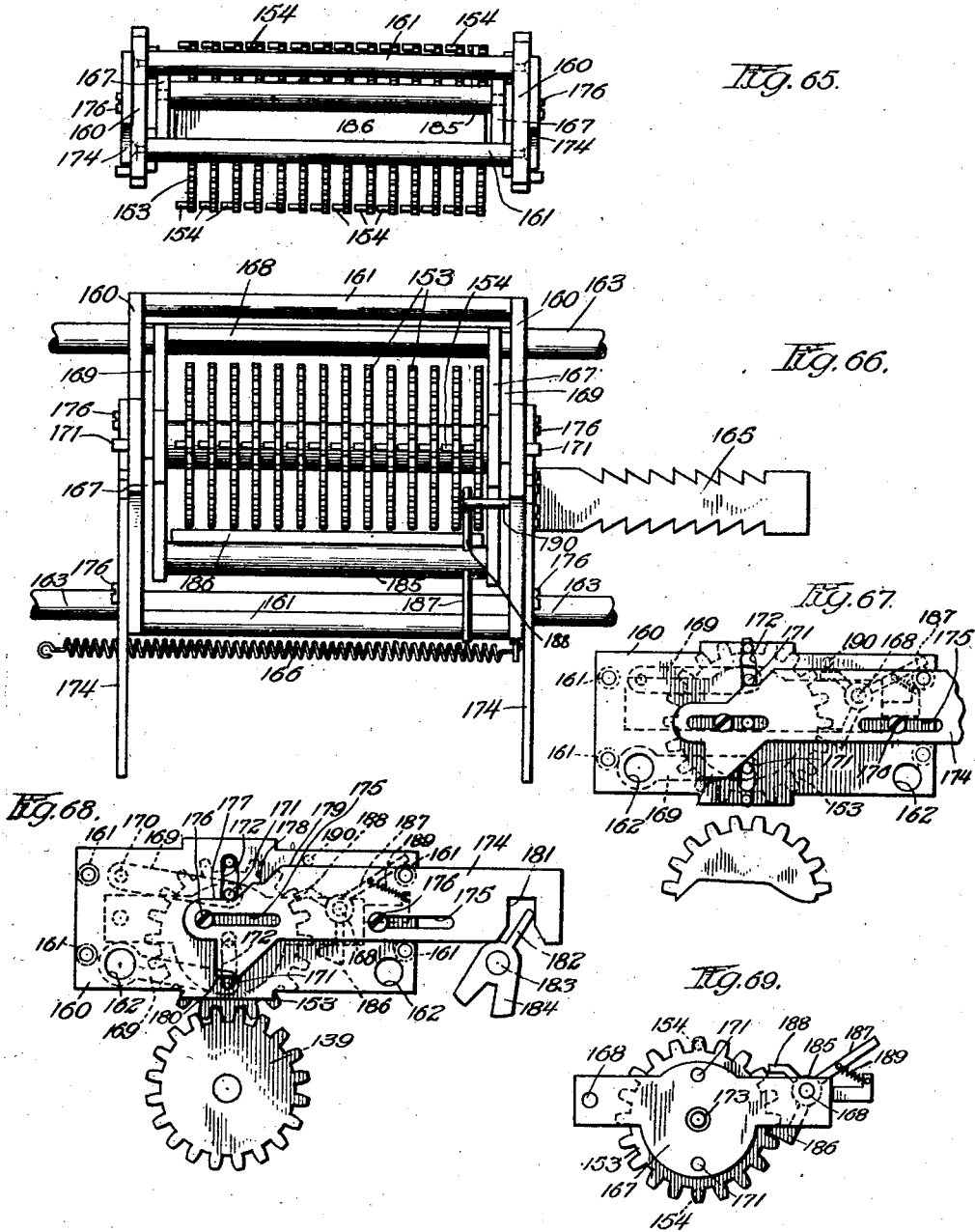

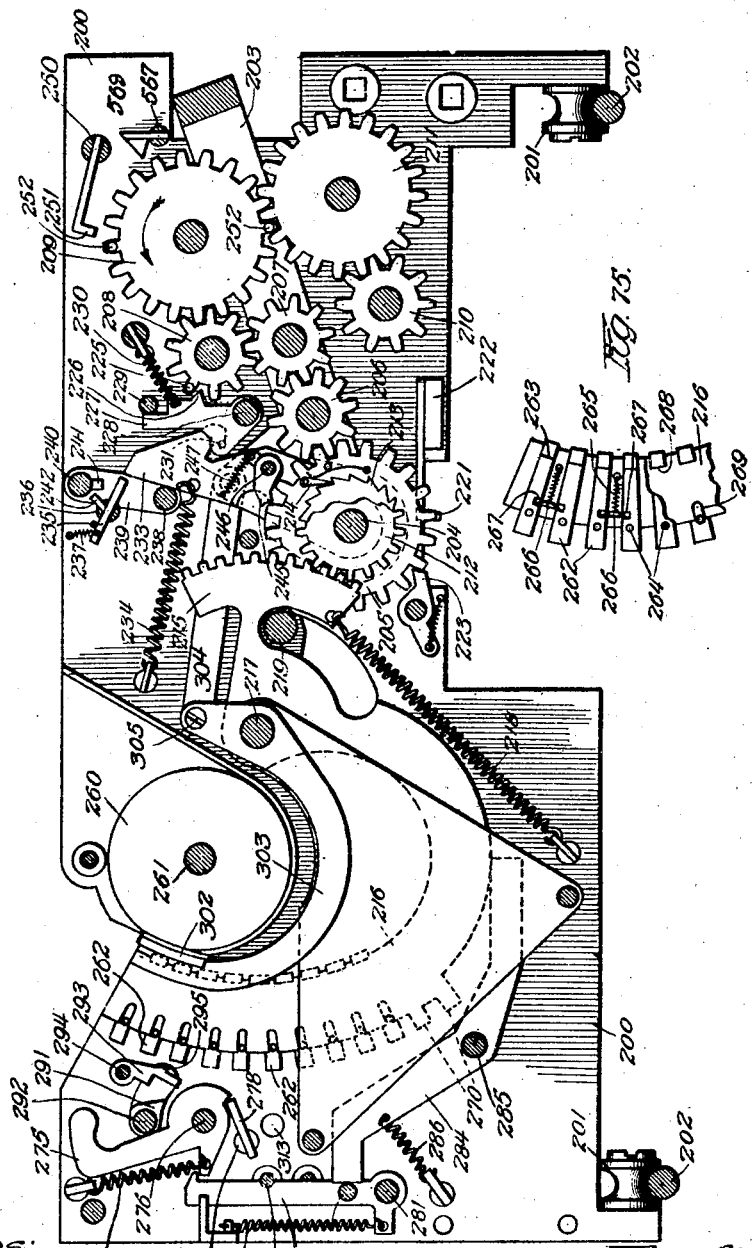

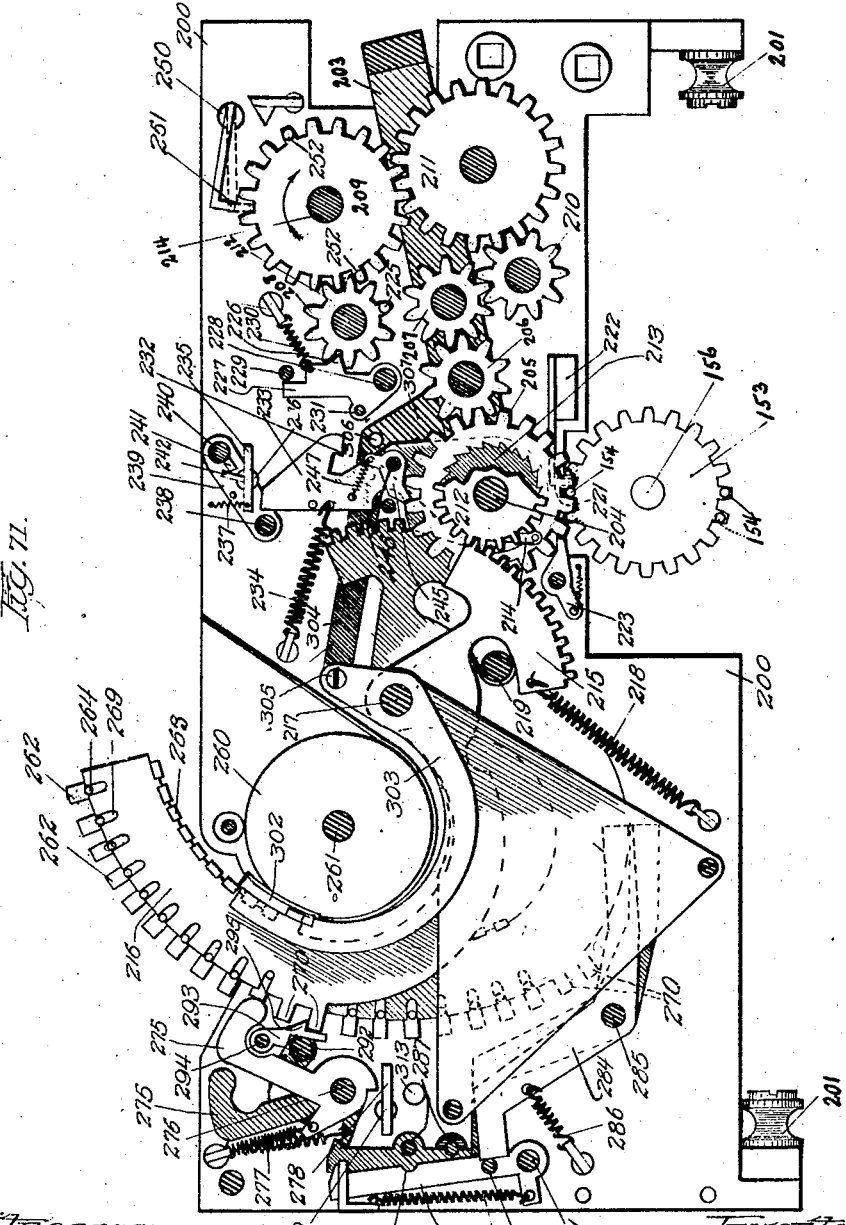

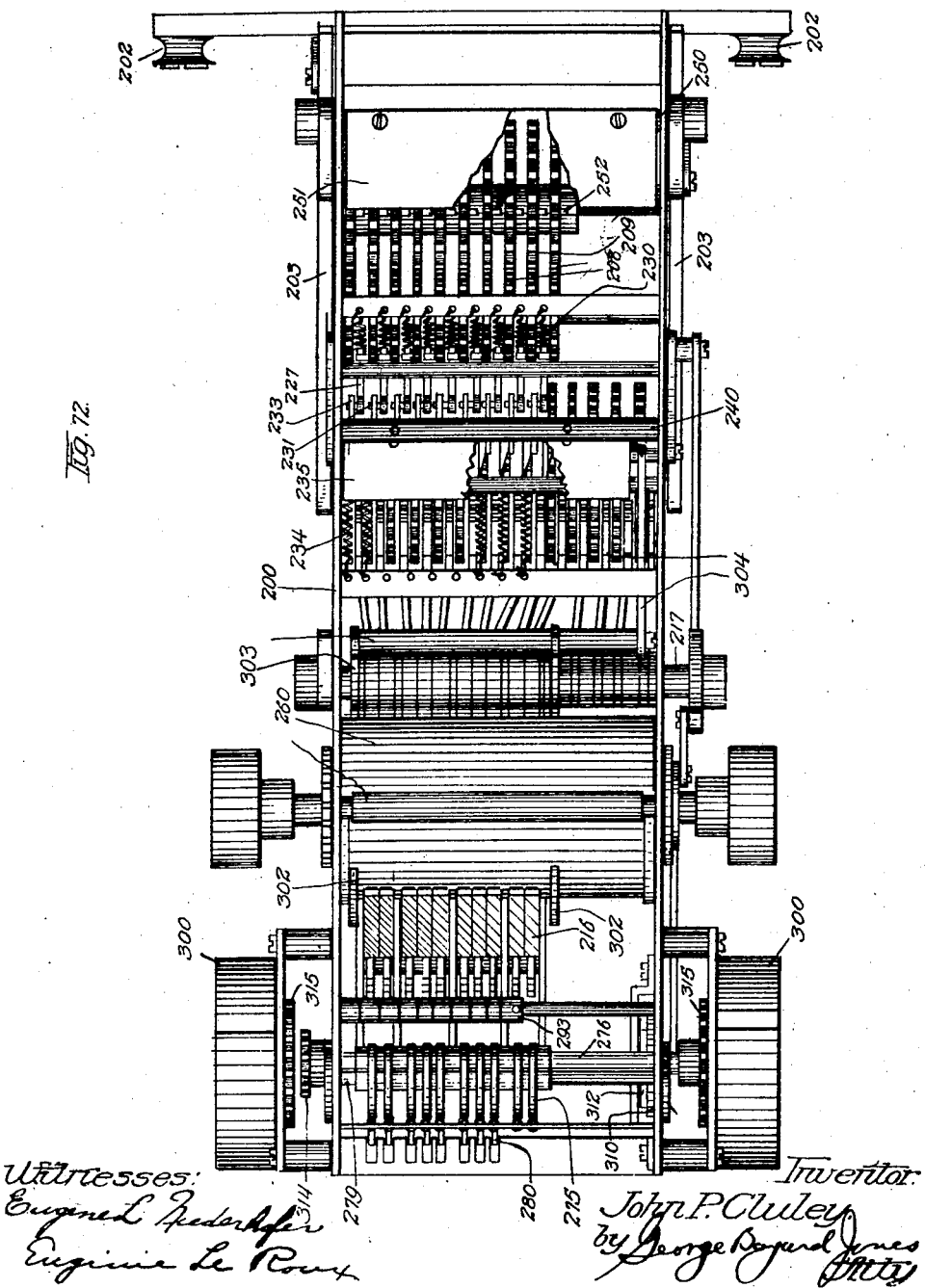

J. P. CLULEY.
COMPUTING MACHINE.
APPLICATION FILED NOV. 20, 1912.

1,332,543.

Patented Mar. 2, 1920.
30 SHEETS—SHEET 27.

Witnesses:
Eugene L. Federhofer
Eugénie Le Roux

Inventor:
John P. Cluley
by George Bayard Jones
Atty.

J. P. CLULEY.
COMPUTING MACHINE.
APPLICATION FILED NOV. 20, 1912.
1,332,543.
Patented Mar. 2, 1920.
30 SHEETS—SHEET 28.
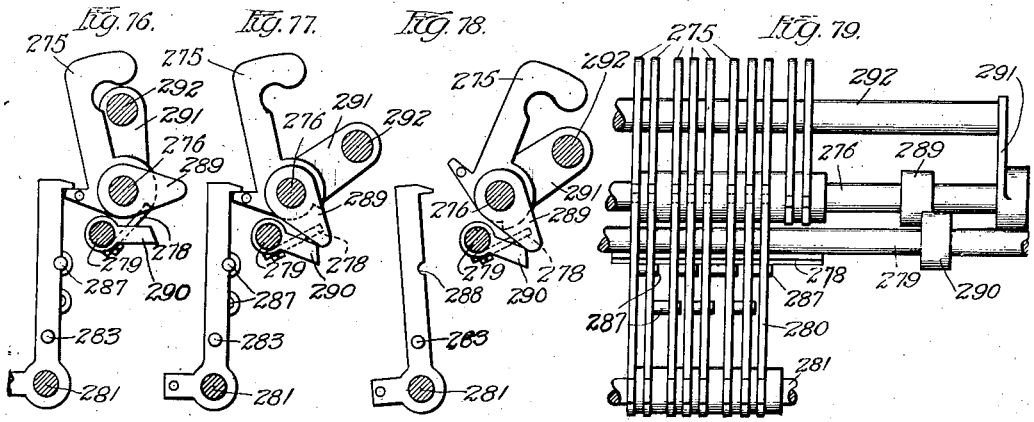
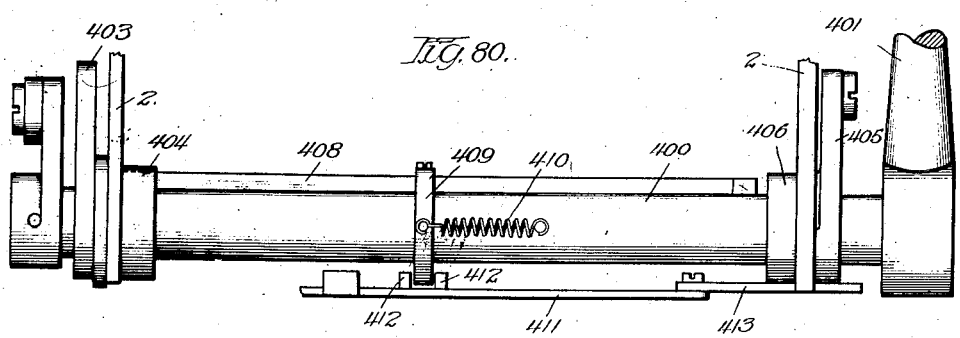
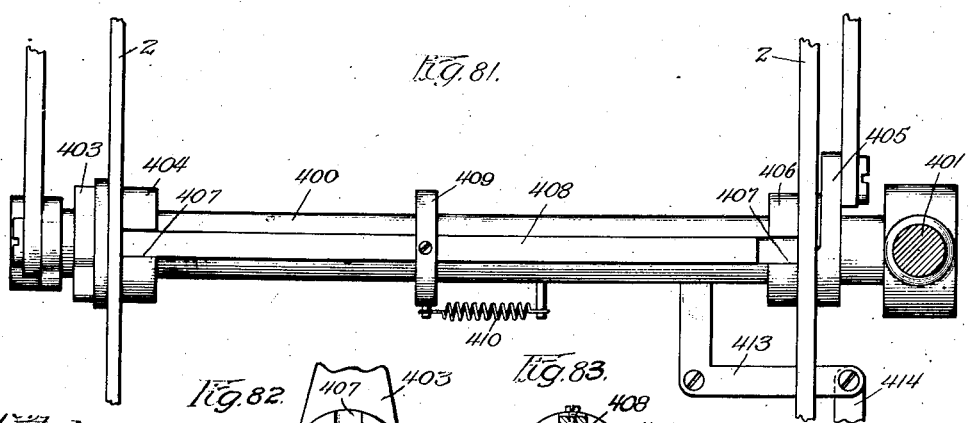

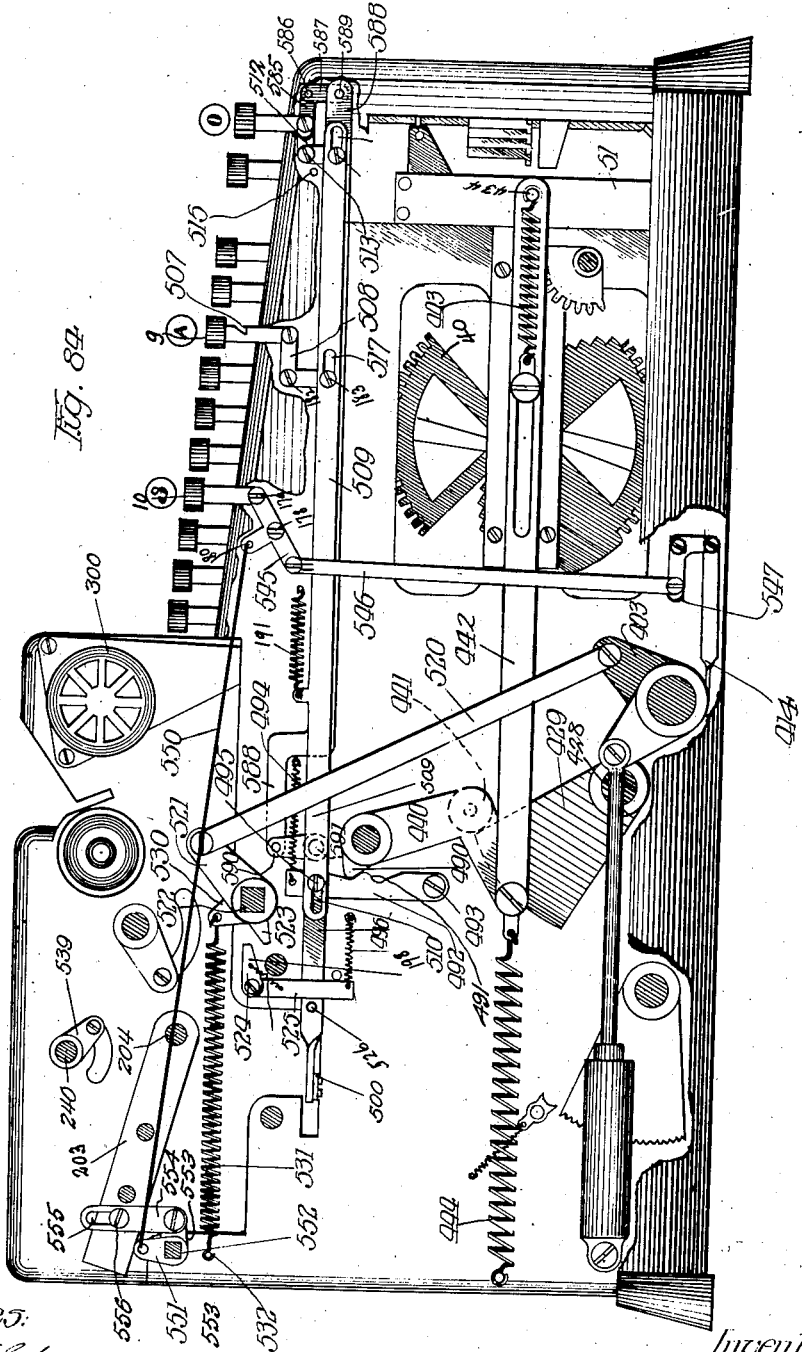

J. P. CLULEY.
COMPUTING MACHINE.
APPLICATION FILED NOV. 20, 1912.

1,332,543.

Patented Mar. 2, 1920.
30 SHEETS—SHEET 30.

Witnesses:

Inventor
John P. Cluley
by George Bayard Jones
Atty.

UNITED STATES PATENT OFFICE.

JOHN P. CLULEY, OF CHICAGO, ILLINOIS, ASSIGNOR TO CLULEY MULTIPLIER COMPANY, OF GREEN BAY, WISCONSIN, A CORPORATION OF DELAWARE.

COMPUTING-MACHINE.

1,332,543.  Specification of Letters Patent.  Patented Mar. 2, 1920.

Application filed November 20, 1912. Serial No. 732,563.

*To all whom it may concern:*

Be it known that I, JOHN P. CLULEY, a citizen of the United States, residing at Chicago, in the county of Cook and State of Illinois, have invented new and useful Improvements in Computing-Machines, (Case 2,) of which the following is a full, clear, concise, and exact description, reference being had to the accompanying drawing, forming a part of this specification.

My invention relates to improvements in computing machines.

The broad features of my invention as a whole may find application in many ways and may be embodied in widely different forms of structures. The invention, furthermore, has many and various phases, all of which may be embodied in more than one form and some of which are of sufficient breadth to find embodiment in a very great variety of structures or combinations of elements. In order to better explain the invention and its various phases, I shall describe one embodiment thereof which I have worked out in practice and which represents what I consider at present to be the preferred design from a commercial viewpoint. This machine may be termed for convenience a multiplying machine, although it is capable of performing other mathematical operations; for example, addition and subtraction. In view of the foregoing statements, it will be obvious that the machine about to be described is by no means the only desirable embodiment of the invention, and, furthermore, the invention is not limited to said embodiment.

Among the many objects of my invention the following may be regarded as the more important:

To provide improved means for multiplying directly in a manner closely analogous to the usual mental computations.

To provide a direct multiplying machine which will also add and subtract.

To provide means for automatically pointing off the product with the decimal point in the proper place.

To provide an improved machine which will print products, accumulate the amounts thus printed and then print the grand total or sum of said products.

To provide a machine in which the various main elements are of unit construction, whereby a machine of any desired capacity may be readily assembled by making only minor modifications in, or substitutions of, certain related elements.

To provide a machine having novel multiplying elements which perform a double function, whereby the number of said elements is reduced substantially one-half.

To provide a compact, simplified machine having a greatly reduced number of parts.

To provide a machine of improved mechanical construction made up for the most part of flat metal of configurations which may be readily stamped by the use of dies, thereby insuring increased simplicity, decreased expense of manufacture, rapid assembling, interchangeability of parts, and freedom from liability of derangement.

To provide a machine so organized and arranged that the operator is relieved, as far as possible, from mental effort, being required merely to strike the proper keys in the proper order and then cause the actuation of the machine.

To provide a machine in which the multiplier keys may be struck in the same order that they would ordinarily be written in longhand, viz., from left to right.

To obtain a complete product (by a multiplier of one digit) during one complete forward and backward movement of the main operating shaft or equivalent part.

To obtain a substantially uniform movement of the handle; that is, a full and unvarying movement regardless of the digit constituting the multiplier.

To provide a machine having removable parts which may be readily changed to express the result in any one of a number of different denominations, for example, decimal system, English money, feet and inches, etc.

To provide a multiplying machine in which the decimal key is one of the multiplier keys and is depressed in its regular order with respect to the multiplier digits.

Before proceeding to a detailed description of the preferred machine illustrated in the drawings, a general idea of the operation thereof may be obtained from the following description:

The multiplicand is set up on a bank of multiplicand keys in a manner similar to that employed in the well known commercial adding machines. The multiplicand keys include fraction keys which may be depressed in the same manner as the other multiplicand keys. The multiplier keys, including the decimal key, are struck one at a time in natural order from left to right, and the handle is pulled forward and released after the depression of each multiplier key. Each operation of the handle causes the machine to multiply the set-up multiplicand by the single multiplier digit struck prior to said operation. The machine is provided with a carriage which moves transversely across the machine with a step by step movement whenever the handle is operated. This step by step movement provides for the accumulation within said carriage of partial products, to give a total product of any multiplicand by any multiplier within the capacity of the machine. In order to print any total product the handle uust be given an additional pull, a total key having been previously depressed. The machine also accumulates or adds successive total products. The grand total of said products may be printed at any time by pressing a grand total key and operating the handle. In all of the items printed, the digits are properly arranged with respect to the decimal point; that is to say, the item is automatically pointed off without any additional effort whatever on the part of the operator. The machine is thus particularly adapted for use as a billing machine, as items may be first multiplied and the products printed at the end of the line, the successive products being printed in a vertical column which may then be added, giving the total of all the products. Provision is also made for subtracting any desired product, as where it is desired to credit certain items at the end of the bill.

The following views are disclosed in the drawings:

Fig. 2 is a sectional elevation thereof.

Fig. 3 is a top plan view of one half of the mechanism with the carriages and upper casing removed.

Fig. 3ᴬ is a top plan view of the remainder of said mechanism.

Figs. 4 to 9 inclusive are diagrams illustrating the manner in which the multiplier disks are laid out.

Figs. 10 to 15 inclusive are elevational views of the various multiplier disks employed.

Fig. 16 is a side elevation of the keyboard mechanism.

Fig. 17 is a plan view of a locking plate used therein.

Fig. 18 is a front elevation of a single key and adjuncts.

Fig. 19 is a side elevation of the release key for the multiplier keys.

Fig. 20 is a side elevation of the multiplier stops showing the multiplier keys associated therewith.

Fig. 21 is a front elevation thereof.

Fig. 22 is a front elevation of the multiplier release key.

Figs. 23 and 24 are elevations of the selective mechanism controlled by the multiplicand keys showing a portion of said mechanism in two extreme positions respectively.

Fig. 25 is a side elevation of a multiplier unit and associated keys and other adjuncts with the parts in normal position.

Fig. 26 is a similar elevation with one of the disks rotated to the limit of its travel.

Fig. 27 is an elevation of a guide or spacer.

Figs. 28, 29 and 30 are elevations of various portions of a multiplying unit illustrating the successive steps in assembling the same.

Fig. 31 is a top plan view of a unit when nearly assembled.

Fig. 32 is a side elevation thereof.

Fig. 33 is an elevation of a locking device for the racks.

Fig. 34 is a top plan view thereof.

Fig. 35 is an elevation of the end plate of a multiplier unit showing the assembled racks.

Fig. 36 is a view of the same elements shown in Fig. 35 having superimposed thereon an additional plate representing the beginning of the next unit.

Figs. 37, 38, 39 and 40 illustrate successive positions, in the operation of a device for insuring restoration of the racks to initial position.

Fig. 41 is an elevation of the side plate of the end unit of the group of multiplier units.

Fig. 42 is a top plan view of a series of units showing the differential rack mechanism.

Figs. 43 and 44 are more or less diagrammatic elevation and plan views of a single multiplier disk and coöperating racks.

Figs. 45 and 46 are somewhat similar views showing the coöperation between two disks and accompanying racks.

Fig. 47 is an elevation of the intermediate racks and pinions for transferring the movement determined by the differential mechanism to the traveling carriages.

Fig. 48 is a top plan view thereof.

Fig. 49 is a front elevation of the carrying, trip or transfer mechanism in the main body of the machine.

Fig. 50 is a side elevation thereof.

Figure 51:
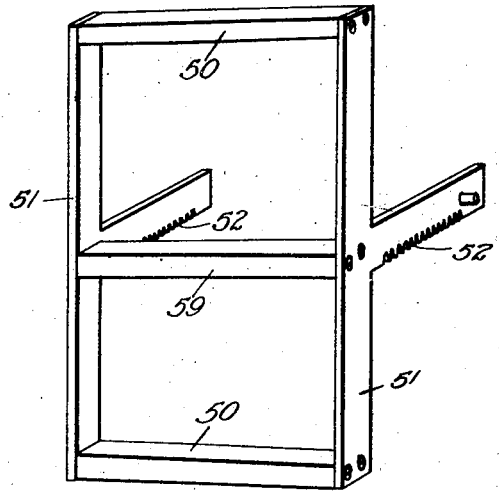

Fig. 51 is a perspective view of the sliding frame which has a differential forward travel depending on the stops controlled by the multiplier keys.

Figure 52:
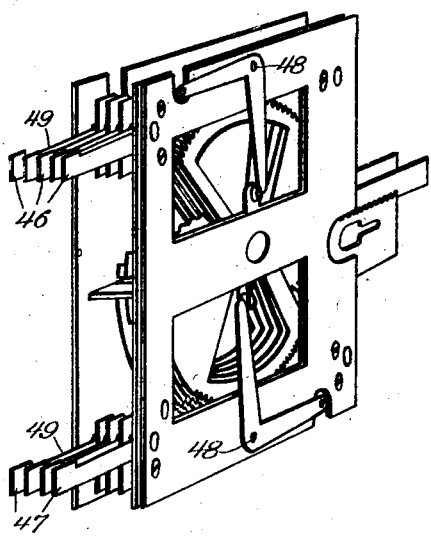

Fig. 52 is a perspective view of a multiplier unit.

Fig. 53 is a top plan view of the fractional multiplier units.

Fig. 54 is a top plan view of the fraction keys.

Fig. 55 is a top plan view of certain details of the actuating arms.

Fig. 56 is a perspective view of part of the selective mechanism for the fraction multiplier disks.

Fig. 56^A is a perspective view of the selective mechanism for the one-eighth key.

Fig. 57 is a top plan view of the main body of the machine with the main carriage removed to disclose the intermediate carriage.

Fig. 58 is an elevation of the connections between the addition and subtraction keys and the escapement mechanism for the intermediate carriage.

Figs. 59 and 60 are respectively views of the automatic control means for the escapement mechanism and said escapement itself.

Figs. 61, 62, 63 and 64 are views of the mechanism controlled by the decimal key for locking the intermediate carriage to the main carriage.

Fig. 65 is an end elevation of the intermediate carriage.

Fig. 66 is a top plan view thereof.

Fig. 67 is a side elevation thereof.

Fig. 68 is a somewhat similar view showing the pinions of the intermediate carriage in lowermost position.

Fig. 69 is an elevation of the supporting frame for said pinions.

Fig. 70 is a sectional elevation of the main carriage with the parts arranged in normal position to perform addition.

Fig. 71 is a similar view with the parts arranged in position to perform subtraction and with the printing arms raised to extreme uppermost position.

Fig. 72 is a top plan view of the main carriage with certain parts broken away to disclose the underlying mechanism.

Figure 73:
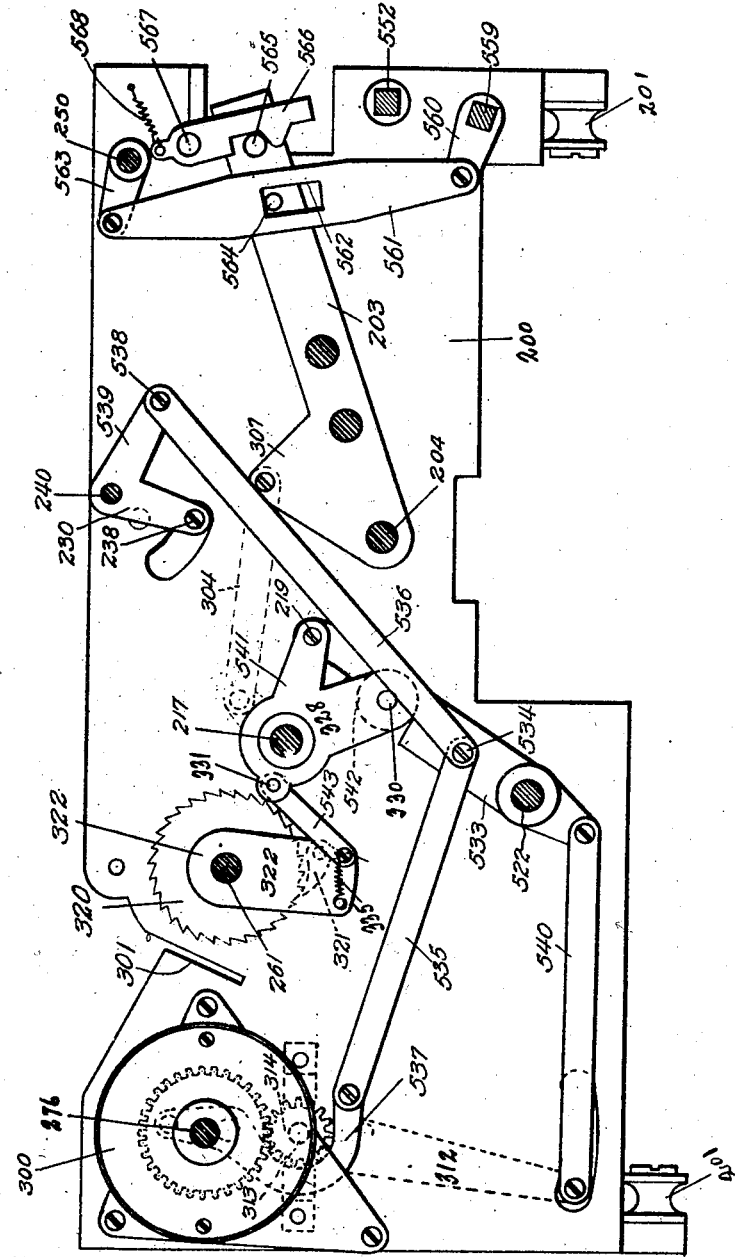

Fig. 73 is a side elevation of the main carriage showing the operating connections therefor, the latter being in position for addition.

Figure 74:
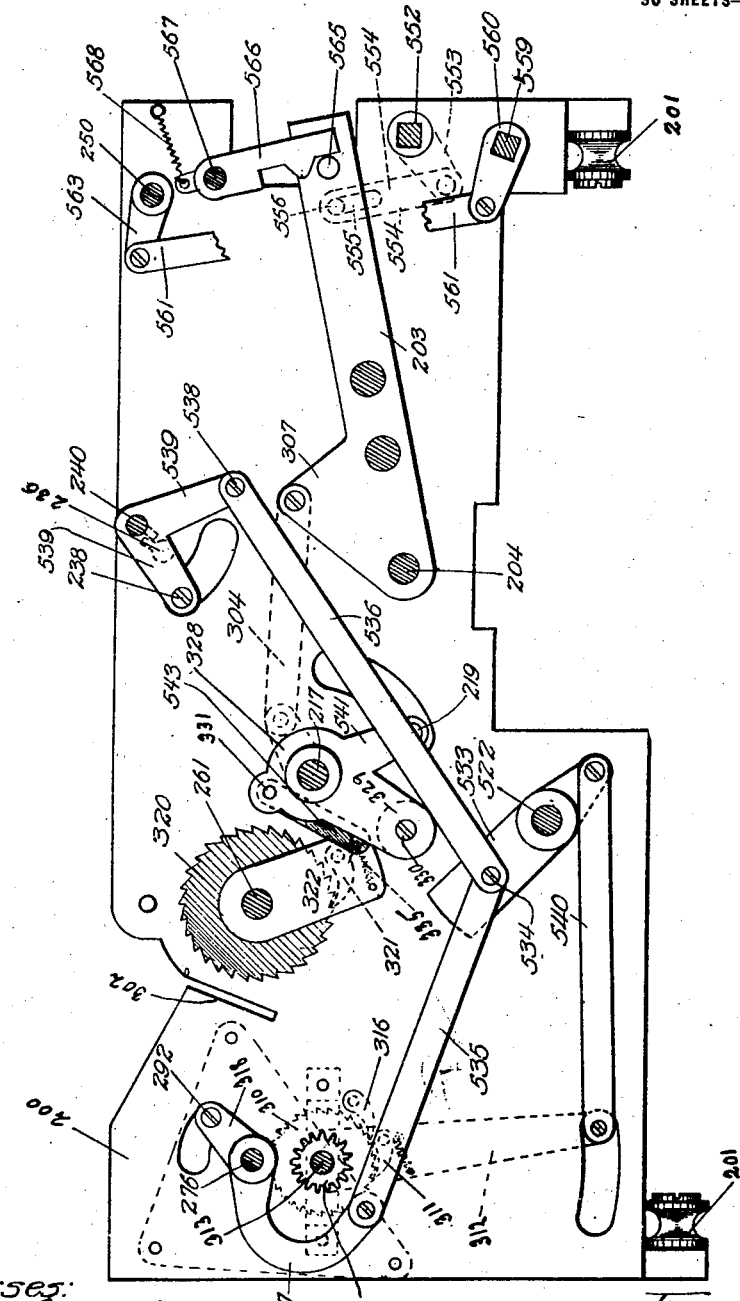

Fig. 74 is a similar view with said parts arranged in position for subtraction.

Fig. 75 is an elevation of a portion of one of the type arms with certain parts broken away to disclose the construction.

Figs. 76, 77, 78 and 79 illustrate the type hammers in various successive operative positions.

Fig. 80 is an elevation of the main operating shaft and adjuncts.

Fig. 81 is a top plan view thereof.

Figs. 82 and 83 illustrate certain details thereof.

Fig. 84 is an elevation of one side of the machine with the outer casing removed, showing the operating links, levers and adjuncts.

Figure 85:
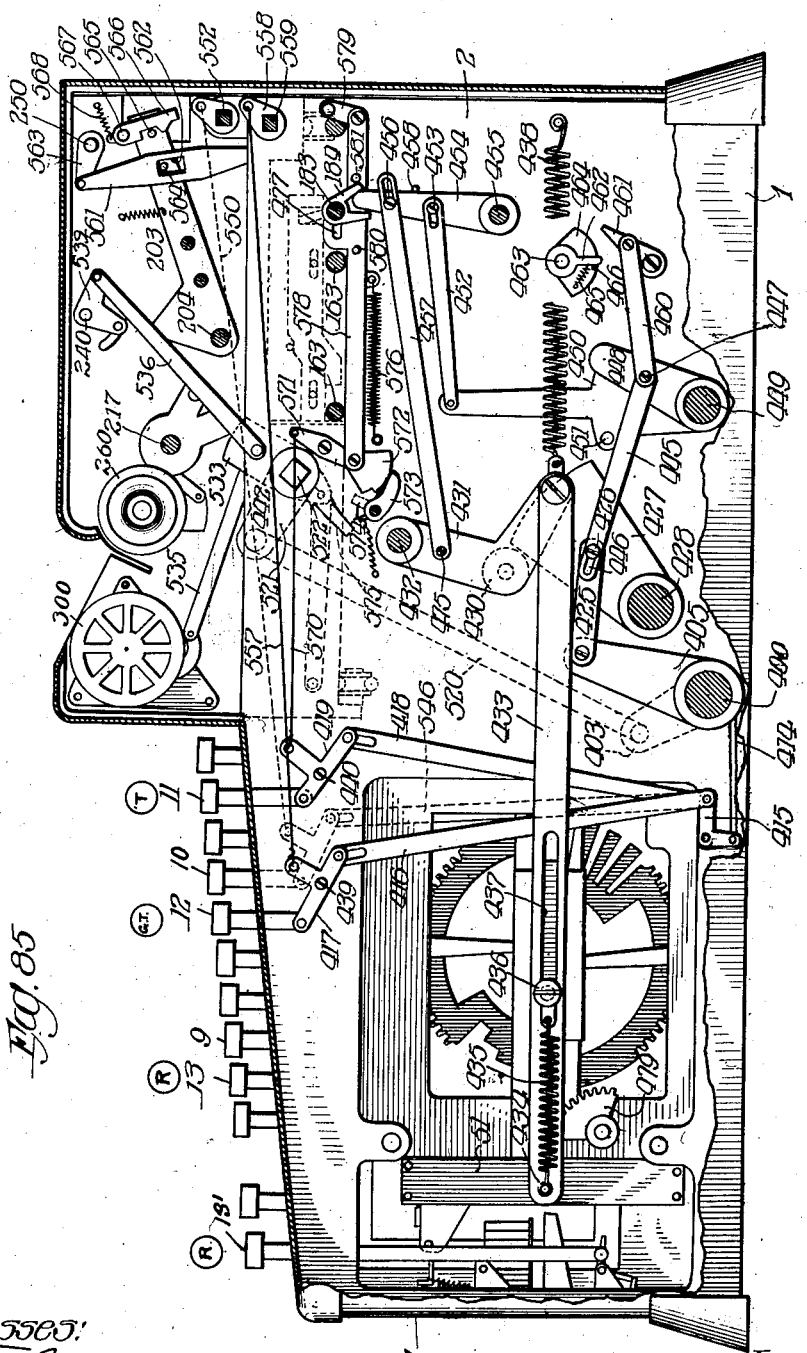

Fig. 85 is a somewhat similar view of the opposite side of the machine.

The machine is provided with an outer casing 1, and a suitable frame 2, the arrangement and form of which will be apparent from an inspection of the drawings and will be described more in detail in connection with the various elements of the machine wherever necessary. To render clearer the description, the machine may be divided, in a general way, into the following sections, which will be described one at a time: The keyboard, notched disks, actuating means for a multiplying totalizer, multiplying totalizer, transfer mechanism of multiplying totalizer, main carriage, printing mechanism, main operating shaft connections and operation.

THE KEYBOARD.

Figure 1:
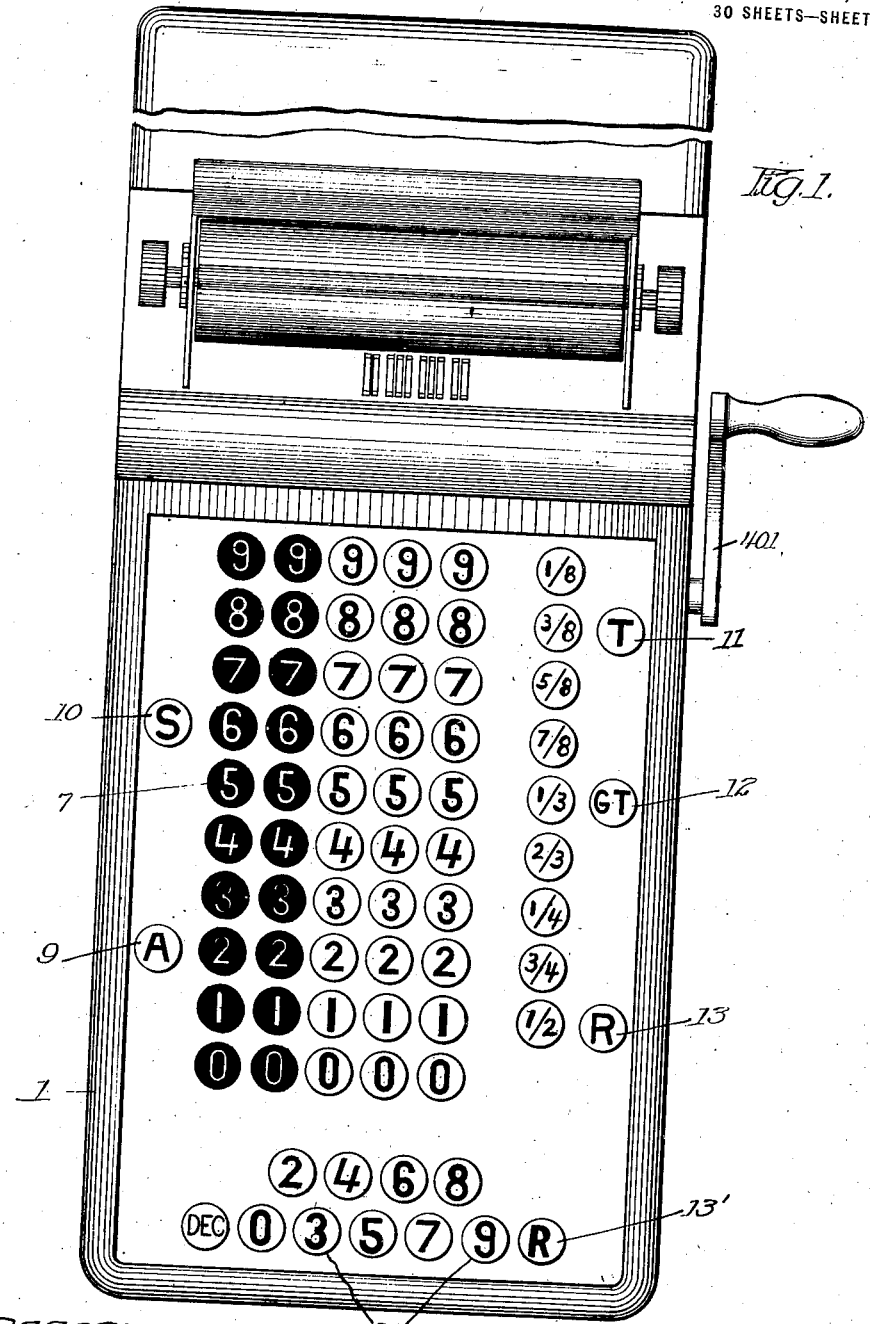
Figure 1 is the top plan view of the machine which represents the preferred embodiment of the invention.

The keyboard is shown more particularly in Figs. 1, 2, 16, 17, 18, 19, 25 and 26. It is constructed with a supporting plate 3 and an upper plate 4, suitably spaced therefrom by end walls 5, 6, the upper plate being preferably inclined. The supporting elements 3, 4, are preferably flat integral plates, but may be constructed in the form of longitudinal strips or in other forms, if desired. The multiplicand keys 7 are arranged in a bank and the multiplier keys 8 are arranged preferably in front of the multiplicand keys in a single series. The multiplicand keys are arranged preferably in parallel rows, there being in the present instance five longitudinal rows of 10 keys each, the keys in each row representing the digits from 1 to 9 inclusive and also the zero. The zero keys could be omitted entirely as far as the computation is concerned. They are employed as a convenience, however, each indicating by its depression the fact that a zero has been struck in that particular row, order or column. They are also conveniently used as the auxiliary release keys of the various rows, as hereinafter described. There is also an additional row of multiplicand keys representing various fractions. Of course, it is to be understood that the total number of multiplicand rows may be varied to meet different requirements. The present machine is particularly adapted, by virtue of its construction in readily detachable units or sections, to be extended indefinitely within practical limits to increase its capacity to meet unusual or extreme requirements. The fraction keys, as will be apparent from Fig 1, represent the fractions $\frac{1}{8}$, $\frac{3}{8}$, $\frac{5}{8}$, $\frac{7}{8}$, $\frac{1}{3}$, $\frac{2}{3}$, $\frac{1}{4}$, $\frac{3}{4}$ and $\frac{1}{2}$. These fractions represent those encountered most frequently in making ordinary computations. It will be apparent as the description proceeds, however, that the machine may be assembled with keys representing any desired fraction, and that there is no limit to the number of fractions which may be represented, except the practical requirements of weight, bulk, expense or inconvenience.

Multiplicand keys.

The multiplicand keys are carried by suitable key stems 14 which pass loosely through and are guided by the plates 3 and 4. The key stems in the transverse rows are identical and the key stems in any row are the same as those in the remaining rows except that those toward the rear are of increasing length and the five rear stems are beveled at the bottom, as is apparent from Fig. 16. Each of said key stems is preferably recessed or notched out at 15, the lower wall of the notch forming a locking shoulder and joining the beveled surface or cam 16. The lower ends of said keys, when in uppermost position, normally protrude through said plate 3 and are adapted to engage certain arms or levers hereinafter described. The key stems are normally impelled upwardly by suitable springs 17 which are supported on bars 18, there being preferably one bar for each longitudinal row. The keys are normally held in uppermost position, their upward movement being limited by the rods 19 which pass through the keyboard frame from one side to the other, there being one rod for each transverse row of multiplicand keys. The lower reduced portion of each key stem passes through a notch or opening 20 in a locking plate 21, one locking plate being provided for each longitudinal row of multiplicand keys. Said plates are carried on suitable supports 22 and are preferably secured thereto by screws 23, which pass through elongated openings 24 in each of said locking bars. A spring 25 tends to maintain each locking bar in forward position. As shown in the drawings, each bar is forced rearwardly, however, by the inclined wall or cam surface 16 whenever a key is depressed, said locking bar immediately snapping back to initial position, however, as soon as the lower wall of the notch 15 is lowered sufficiently. See for example Fig. 26. It will be readily seen that each locking plate will hold in lowermost position whatever key in its row is depressed. If said locking plate is moved slightly to the rear, however, the spring 17 will restore the key to its initial position, said spring engaging the upper wall of said notch 15 at all times.

The rearward movement or unlocking movement of the locking plate 21 may be accomplished in two ways, either by the depression of the release key 13 or by the depression of some other key in the same row. The release key 13, when depressed, rocks the arm 26 which is fast to the shaft 27 and has projecting therefrom a plurality of arms or pins 28, there being one arm for each locking bar. Each arm projects through an opening 29 in one of the locking plates and is adapted, when the release key is depressed, to engage the rear wall of said opening and move the locking bar to the rear a sufficient distance to disengage the locking shoulder of any key stem that happens to be depressed, thereby permitting said key stem to be snapped up to initial position. Whenever said release key is depressed all of the locking plates 21 are moved simultaneously, and accordingly the entire multiplicand keyboard is restored. The depression of any key in a row will also act to release any other key in the same row previously depressed and held down at the time. For example, if the operator by mistake depresses a 7 key, which is thereupon locked down, and desires to correct the mistake by the substitution of the 6 key, all that is necessary is to depress the 6 key, whereupon the rearward movement of the unlocking plate caused by the depression of said 6 key will release the 7 key. From this it will be seen how the zero key may be used as a release key, said zero key having no other function except to indicate, when in depressed position, that no digit in that row has been set up. It should be noted that one wall of the opening or notch 20 in the locking plate is beveled at 30. The bevel, however, is slight, being less than the projecting locking shoulder on the key stem. By virtue of this bevel a smaller rearward movement of the locking plate will serve to release a key than would otherwise be the case. It is necessary to move the plate rearwardly only far enough to permit the corner formed at the upper end of the cam surface 16 to engage the beveled surface 30, whereupon the spring 17 is strong enough to force the key up and thereby forcibly complete the rearward movement of the locking plate 21 against the action of the spring 25. It will also be noted that this result might also be accomplished by a slight reverse bevel of the upper corner of the cam 16, leaving the walls of the notch 20 perpendicular. By virtue of either beveled arrangement described, the release of the keys is insured even in the absence of perfect accuracy and uniformity in the key stems and in the size and spacing of the notches 20.

The locking plates being arranged horizontally take up only a minimum space vertically. They also permit a short stroke of the key levers to locking position. Furthermore, the construction is simple and strong, the notched out portions in the locking plate being insufficient to materially decrease the strength thereof.

Among the many other advantages of the preferred details of construction described above, the ease of assembling may be mentioned. In assembling the key stems and the keys or caps which have previously been secured thereto, the operator picks up the zero keys, for example, one at a time and pushes the stems down through the openings in the guide plates. The spring 17 snaps into the notch and exerts an upward pressure on the stem and the locking shoulder of the stem snaps under the locking plate 21, whereby the key is held down, and in a similar manner the operator pushes the remaining zero keys rapidly into position. The locking rod 19 is then slid into position, so that whenever the zero keys are released their upward movement will be limited by said rod. The operator next takes up the 1 keys and pushes them into position. Each 1 key as it snaps under the locking plate releases the zero key previously inserted, which thereupon flies up and strikes the locking rod 19. By the time the row of 1 keys and the fraction key is in place the zero keys have all snapped up to normal position. The insertion of the row of 2 keys restores the 1 keys and so on. By the time the row of 9 keys has been inserted all remaining multiplicand keys are in normal position and it is necessary merely to operate the release key to throw up the 9 keys to normal position. Accordingly, the entire multiplicand keyboard may be very rapidly assembled.

Fraction keys.

The fraction keys are similar to the remaining multiplicand keys. Their operation is described more fully under the heading "Fraction units."

Multiplier keys.

The multiplier keys 8 consist of a single series or group representing the digits from 2 to 9, inclusive, and also the zero and decimal key. For the sake of convenience the 1 key is omitted, the mechanism being set so that the machine always multiplies by 1, unless some other multiplier key is depressed. The multiplier keys may, of course, be arranged in any suitable manner. For the sake of compactness they are arranged in a double row, and for convenience they are located nearer to the operator than the multiplicand keys.

The multiplier key stems 31 are each provided with a slot 32, through which pass suitable rods 33 which limit both the upward and downward movement thereof. The lower ends of said key stems are forked at 34 and each straddles a pin 35 projecting from an arm 36 mounted loosely on a supporting shaft 37. The depression of a key serves to rock the corresponding arm 36 through a small angle, and thereby lower the link 38 which sets a suitable stop, as hereinafter described, said link being normally held in uppermost position by a spring 39. Accordingly, no additional springs are required to hold the keys in uppermost position.

Special keys.

Besides the multiplicand and multiplier keys, an addition key 9 is provided and also a subtraction key 10, a totalizer key 11, a grand total key 12, a multiplicand release key 13, and a multiplier release key 13'.

The coöperation between the various multiplier and multiplicand keys and the elements controlled thereby will be hereinafter fully described. At this point it will be sufficient to state that the multiplicand keys act as selecting devices to select certain multiplier elements having the form of pinions or gears or disks with a peculiar contour or outline representing the multiples of the digits corresponding to given keys. The multiplier keys, when depressed, set stops which limit the back and forth rotative movement of said pinions or disks to properly position the same, so that, generally speaking, each may limit the travel of two racks, the movement of one rack being proportional to the left hand digit of the product, and the movement of the other rack being proportional to the right hand digit of said product. For example, considering the product 9×5, which is 45; one of said racks will be permitted to move 4 units and the other 5 units before being obstructed by the same disk. These movements, if communicated directly to two adjacent numeral wheels (which is not necessarily the case) will cause said wheels to indicate 45.

Notched Disks.

There is one multiplier unit for each row of multiplicand keys, with the exception of the row of fraction keys. There are three units operated by the fraction keys shown, making a total of eight units, as seen particularly in Fig. 3. All of the five multiplier units representing the rows or orders to the left of the decimal point are identical, and the three units operated by the fraction keys are substantially the same as the other units, differing therefrom mainly in the matter of relative arrangement and in certain details as well, as described more fully hereinafter.

One of said five units will first be described, it being understood that the description applies equally well to the remaining four units. The unit is made up of five multiplier pinions or disks and suitable adjuncts (see Figs. 10 to 14 inclusive). These pinions or disks 40, 41, 42, 43, 44 are arranged side by side and are loosely mounted on a suitable hollow shaft, so that they may be rotated either forward or backward. The peripheries of the pinions are not continuous toothed circles, but are cut away so as to form steps or notches, no two disks being exactly alike as regards these steps. The steps represent the multiples of the nine digits, 1, 2, 3, 4, 5, 6, 7, 8, 9, the notches of each disk representing the multiples of two digits. Accordingly, five disks are sufficient to represent the multiples of the nine digits and also the zero.

For an understanding of the general function of the various disks reference may be had to the diagrams in Figs. 4, 5, 6, 7, 8 and 9. These diagrams show how a disk may be marked off and cut out to represent the multiples of the digits 4 and 6, for example.

Figure 4:
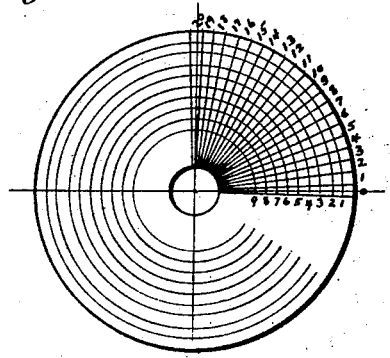
Figure 5:
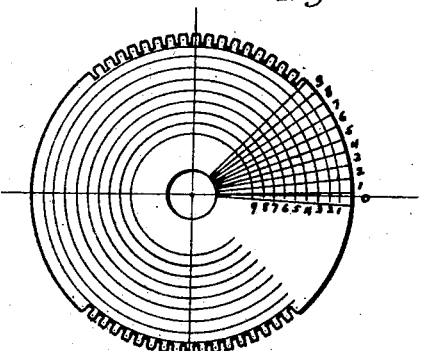

Fig. 4 shows how the disk is first laid off by drawing nine concentric circles equally spaced from the periphery. A portion of the periphery is then marked off into equal angles. Gear teeth are then cut above and below each group occupying about ninety degrees of the circumference, as in Fig. 5.

The disk is then notched or recessed in a manner that will be understood from a consideration of the multiples of 4, which are listed in the left-hand column below.

|  | Tens digits. | Units digits. |
|---|---|---|
| 4 | 0 | 4 |
| 8 | 0 | 8 |
| 12 | 1 | 2 |
| 16 | 1 | 6 |
| 20 | 2 | 0 |
| 24 | 2 | 4 |
| 28 | 2 | 8 |
| 32 | 3 | 2 |
| 36 | 3 | 6 |

It will be seen that most of these multiples are represented by two digits, a digit in the units column and a digit in the tens column. Accordingly, the units digits and the tens digits may be separated into two columns and considered as separate groups as in the right-hand column.

Figure 6:
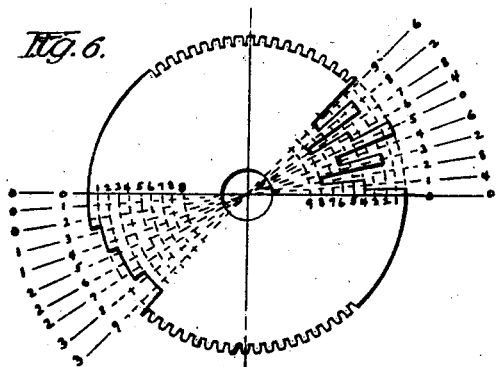

The units digits listed above, of which there are nine, may be represented by steps, notches or recesses, cut in from the periphery of the disk, as shown on the right-hand side of the diagram in Fig. 6, and the tens digits, of which there are seven, may be represented on the left-hand side thereof and are preferably arranged diametrically opposite the corresponding digits of the first group, although said groups need not necessarily be arranged opposite each other, but may occupy any relative positions on the circumference, the latter being a continuous curve. The sides of the notches are radial lines and the bottoms thereof are short arcs of circles the desired distance from the circumference. The depth of the first lowermost notch is 4 arbitrarily selected units, as indicated on the diagram, the depth of the second notch is 8 units, the depth of the third notch is 2 units, and so on, these values corresponding to the right-hand or units digits of the multiples 4, as illustrated above. Referring to the left-hand group of steps or notches, it will be seen that the first step is not cut in, but is simply the periphery of the disk and is marked zero. The second step is a continuation of the first and is also zero. The third and fourth steps are cut in one arbitrarily selected unit, the next three steps are cut in two units and the succeeding steps in increasing amounts in the proportion indicated by the tens digits of the multiples of 4 illustrated above.

Figure 7:
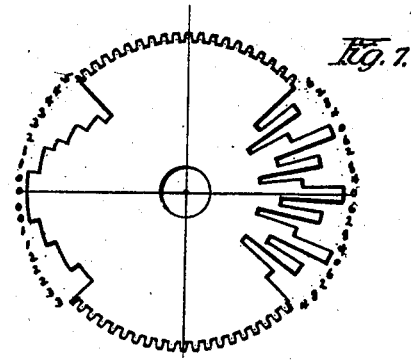

In like manner, additional disks may be laid off to represent the multiples of the remaining digits. Accordingly, nine disks would ordinarily be required. I have so designed the disks, however, that each may represent the multiples of two digits, thereby reducing the required number of disks practically one-half. Fig. 7 shows how the disk shown in Fig. 6 is further notched to represent multiples of 6 also. Of course, in practice, the disks themselves are not marked off and cut out individually, but are stamped by suitable dies.

Figure 8:
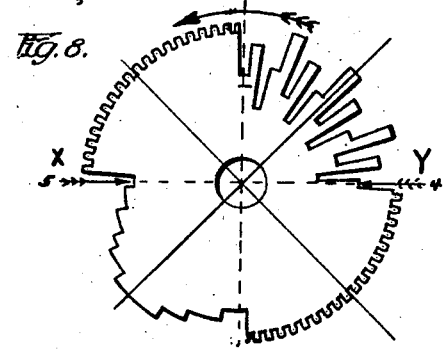
Figure 9:
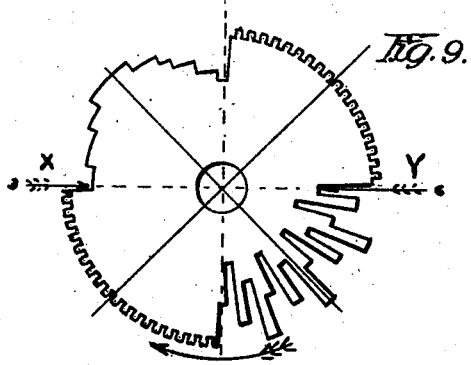
Figure 10:
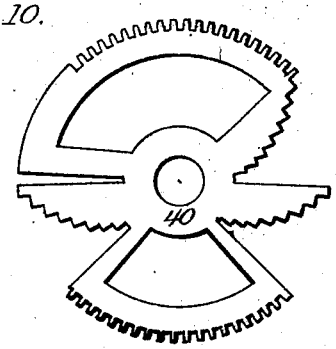
Figure 11:
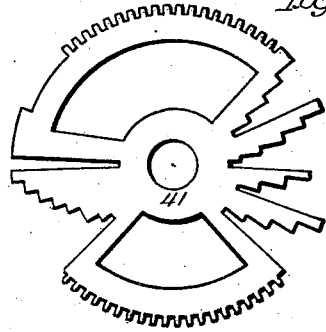
Figure 12:
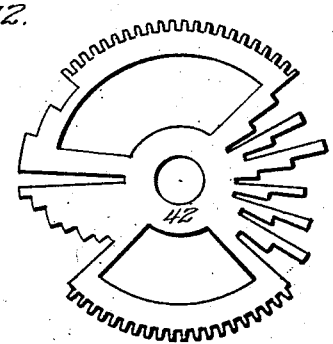

Assume now that the disk has been cut out as indicated, and that two arms or arrows X, Y (Figs. 8 and 9) are arranged in a line with each other on opposite sides of the disk, and tend to move toward each other, but are normally obstructed by the periphery of the disk: If the disk is now rotated in the direction indicated in Fig. 8, to the ninth angular position, the arrows X and Y can move toward each other until obstructed, the arrow X moving 5 units and the arrow Y moving 4 units. These movements, if communicated directly to two numeral wheels, would cause said wheels to indicate 54 or the product of 9×6. Similarly, the reverse movement of the disk to the ninth angular position in the other direction, as shown in Fig. 9, would permit of movement of said arrows to represent 36 or the product of 9×4.

It will be seen that by rotating the disk a less angular amount in a forward or backward direction, the various notches presented to the arrows will permit the latter to move and indicate all the multiples of the digits 4 and 6.

Hence, in the operation of the machine, the multiplicand keys are used to select the proper disk and to determine whether it shall rotate backward or forward, and the multiplier keys are used to determine the angular throw to be imparted to said disk.

Figure 13:
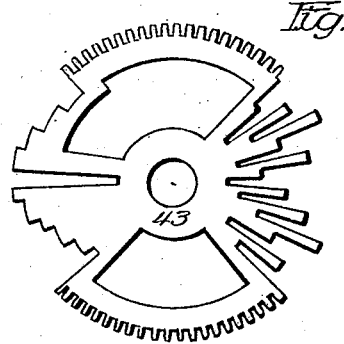
Figure 14:
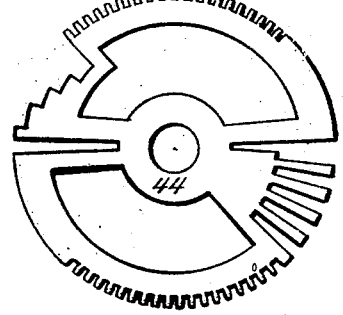

From the above description of the 4 and 6 disk, which is shown also at 43, Fig. 13, it will be apparent how the additional disks may be laid out to represent the multiples of the remaining digits. Each disk represents multiples of two digits and I have designed in this manner all the disks which I employ with the exception of the 5 disk, which may be assumed to represent also the multiples of zero. Accordingly, only five disks are required instead of nine or ten, For example, disk 40 represents multiples of 1 and 9; disk 41, multiples of 2 and 8; disk 42, multiples of 3 and 7; disk 43, multiples of 4 and 6; and disk 44, multiples of 5 and 0.

While I prefer to use only five disks for each group, it is of course apparent that nine disks may be used, as previously stated. A tenth disk having a smooth periphery may also be employed for the zero if desired, although said additional disk is unnecessary, as the multiples of zero are all zero. With a group of nine disks and suitable means for rotating the same, it is apparent that by the depression of suitable multiplicand keys representing the digits from one to nine inclusive, any one of the nine disks may be selected for rotation, the extent of the rotation being determined by stops set up by any one of the nine multiplier keys representing the digits from one to nine inclusive. The machine which I have worked out in practice operates, broadly speaking, on this principle, but said machine embodies the additional refinements described, whereby each disk represents the multiples of two digits.

By virtue of this double function performed by each disk, the number of disks required is reduced substantially one-half. This feature is of great commercial importance, as each multiplier unit, instead of being made up of nine (or 10) adjacent disks, may be made up instead of five disks. When it is considered that a complete unit or a group of disks is required for each order and that these groups are preferably arranged side by side, as shown in Fig. 3, it will be seen that the width of the machine for any desired capacity is determined by the number of disks required, which is necessarily large. Accordingly the reduction in dimensions, weight and expense effected by virtue of this novel double function of the multiplier elements is a very important consideration and constitutes one of the features of the invention.

The construction of the multiplier elements as disks or pinions of circular outline lends itself readily to the carrying out of the duplication phase of the invention just described. This phase of the invention, however, is in no sense limited to the use of a rotatable multiplier element as distinguished from a multiplier element having a different movement or an entirely different outline. It is apparent that multiplier elements may be constructed in numerous ways to represent multiples of more than one digit and that positioning movements such as will properly position said element to make use of the two or more sets of multiples may readily be effected to meet varying requirements. Accordingly, I do not limit myself to the back and forth rotative movement imparted to the disks illustrated, although such movement has many practical advantages.

Another important phase of my invention relates to the relation between the two digits, the multiples of which are represented by a single disk or other multiplier element. It is apparent that each multiplier element may be made to carry out its intended function when representing the multiples of any two numbers or digits. By making each element represent the multiples of complementary numbers, however, I have been able to secure important advantages not heretofore available. These advantages are based on the mathematical coincidence which may be illustrated best by a comparison of the multiples of complementary numbers. For example, in the following two columns the multiples of 4 and 6 are listed:

| Multiples of 4 | Multiples of 6 |
|---|---|
| 4 | 6 |
| 8 | 1 2 |
| 1 2 | 1 8 |
| 1 6 | 2 4 |
| 2 0 | 3 0 |
| 2 4 | 3 6 |
| 2 8 | 4 2 |
| 3 2 | 4 8 |
| 3 6 | 5 4 |

It will be noted that the digits in the units column of the multiples of 4 are identical with the digits in the units column for the multiples of 6, but are arranged in the reverse order. In other words, the right-hand column of the multiples of 4 begins with 4 and ends with 6, whereas the right-hand column of the multiples of 6 begins with 6 and ends with 4, the intermediate numbers being the same in each case. From this it will be seen that where a group of steps or notches are laid out to represent the units digit of the multiples of any number under ten, the same steps or notches may also be used to represent the units digit of the multiples of a corresponding complementary number, and a simple back and forth movement which reverses itself at each stroke, will position said notches in the proper consecutive order.

In the disks illustrated in Figs. 10 to 15, it will be seen that on the right-hand side of the disks, the groups of notches above and below the horizontal diameter of the disks are identical in each case. In fact, a single group of notches will answer the requirement for the units of the multiples, as stated above. Inasmuch, however, as the "tens" of the multiples of complementary numbers do not exhibit the same coincident as is found in the "units" of the multiples, I find it convenient in the commercial machine to duplicate the group of units notches in view of the necessity for two dissimilar groups of "tens" notches. The fact that the two groups of units notches are identical, however, greatly facilitates the work of laying out dies and has other important advantages. While in the preferred form of machine I have arranged the units and the tens notches on the same disk, they may, of course, be arranged on separate elements or in many other different ways which will readily suggest themselves, and accordingly I do not limit myself to the arrangement illustrated. Furthermore, referring again to the diagrams, it is, of course, not essential that the arms X, Y be arranged diametrically opposite each other, as they may be arranged at any desired angle to each other, assuming that the two groups of units and tens notches are correspondingly located so that the rotation of the disk will position them properly.

Fractional disks.

The three right-hand multiplier units shown in Fig. 3 and in Fig. 53 are the ones by which fractions are multiplied. In general these disks perform the same functions as those previously described, being operated in such manner as to represent the decimal equivalents of any fractions within the capacity of the machine.

Setting of disks.

The means for rotating the disks or pinions to position them properly will now be described (see Figs. 2, 23, 24, 25 and 26). Each disk performs the function of a pinion, having two portions of the periphery given up to gear teeth, as shown in the drawings. Each of the five pinions is engaged at all times by an upper rack 46 and four of the five pinions are similarly engaged by a lower rack 47, held loosely in engagement therewith by pins 48, whereby both upper and lower racks are permitted to rock slightly. Accordingly, there are five upper racks. There are only four lower racks, however. The fifth disk, for which there is no corresponding lower rack, represents the zero as well as five, no rotation being required for the zero. The forward end of each rack is notched out or cut away at 49, whereby the walls of said notch may engage the upper or lower cross-bar 50 of a sliding frame 51 (see also Figs. 51 and 52). It will be apparent that if the upper rack of a given pinion is caused to engage said sliding frame, the forward movement thereof will rotate the disk in one direction, whereas if the lower rack is caused to engage said frame, the disk will rotate in the opposite direction.

The relation of the multiplicand keys to the various racks is such that the depression of any of the keys 1 to 4 inclusive, will throw one of the lower racks into engagement with the sliding frame. The depression of any of the keys 5 to 9 inclusive, will cause the engagement of one of the upper racks with said frame. This relative arrangement of upper and lower racks with the various multiplicand keys is more or less arbitrary, and may, of course, be varied. The frame 51, as shown particularly in Figs. 25, 26, 51 and 52 is provided with a rearwardly extending rack 52 on each side thereof, which racks are confined between and guided by suitable plates or projections 53 and 54. Said racks mesh with a pair of segments 55 fixed to a common shaft 56 extending across the machine. When the operating handle is pulled forward, the sliding frame 51 is caused to slide forward by suitable mechanism hereinafter described, the racks and segments, 52 and 55, insuring a parallel motion to both sides of the frame and preventing binding thereof.

Keyboard control of disks.

The forward movement of said frame may be limited to any one of nine successive positions by nine suitable stops. This varying travel produces a differential rotation of one or another of the five disks in each group, it being impossible to rotate more than one disk at a time in each group. There are eight stops 57, formed one on each of the vertical links 38 and preferably integral therewith (see also Fig. 20). Any one of these stops may be set by lowering the same into the path of the sliding frame 51 through the depression of one of the multiplier keys 2 to 9 inclusive. An additional stop 58 is also provided, which represents the 1 multiplier, for which the multiplier key is preferably omitted. This stop projects farther than any of the others from its link 38 and permits only a slight forward movement of the sliding frame and hence only a slight angular rotation of whatever disk is locked to said frame through one of its racks. Said stop 58 is normally in the path of travel of the cross-bar 59 of said sliding frame and accordingly limits the forward movement of said frame to the 1 position, whenever the operating handle is pulled forward and when no multiplier key whatever is depressed. Hence, it will be seen that whenever the multiplicand keys alone are depressed and the handle is operated, the machine becomes an adding machine, as each number set up by the multiplicand keys is automatically multiplied by 1, the product being the number itself, and the successive products being accumulated or added in a manner analogous to that of the usual adding machine.

Whenever one of the multiplier keys is depressed, the corresponding stop 57 therefor, is lowered into the path of the traveling frame and the stop 58 is simultaneously lowered out of the path of travel thereof by means hereinafter described. If the 9 key is depressed, the travel of the sliding frame and the rotation of a disk is a maximum. The depression of any of the other multiplier keys provides for an angular rotation a less amount corresponding to the value of the digit represented by the key.

It should be noted that, inasmuch as both the upper and lower racks are always in mesh with the pinion or disk, the forward movement of one rack will cause a corresponding rearward movement of the other rack (see Fig. 26). The rearwardly moving rack performs no function, however, but simply slides loosely back and forth. When the racks are in idle position, any forward or backward movement thereof is obstructed by cross-arms 60, 61, carried by extensions or brackets 62 on the outer retaining walls 63, between which walls the entire groups of units and their adjuncts are confined. When any rack is locked into engagement with one of the cross-bars 50 of the sliding frame, the upward movement of the forward end of said rack, which is necessary to cause the engagement thereof with said cross-bar, is just sufficient to permit said rack to clear the adjacent cross-arms 60 or 61. Accordingly, as soon as said rack begins its forward travel, it rides over the adjacent cross-arm and is positively locked in engagement with the sliding frame during the entire forward and backward movement thereof.

Referring more particularly to Figs. 20, 21, 22, 25 and 26: The links 38 are normally drawn upwardly and rearwardly by the springs 39. Their upward movement, as previously explained, is limited by the multiplier keys. Their rearward movement is limited by the cross-bar 64, which has a shoulder 65. When a multiplier key is depressed, the corresponding link 38 is also depressed and a projection or toe 66 on the lower end thereof snaps under the shoulder 65, thereby holding the link and key in depressed position. Said depression also causes the shaft 67 to rock slightly, said shaft having projecting pins 68 thereon, which are engaged by projections 69 on said links 38. One of the pins 68 rides over a projection 70 on the link which carries the stop 58. Accordingly, the depression of any multiplier key lowers said stop 58 out of the path of travel of the sliding frame as previously explained. The links 38 are also provided with a second intermediate toe 71 which projects from the lower ends of the stops 57. When the sliding frame moves forward, it strikes whichever stop has been set and causes the link to swing forward through a very small arc, forcing said link against the transverse elements 72 of the main frame, whereby a solid backing for said link is provided, and the forward movement of the sliding frame and the consequent rotation of the disk in either direction is accurately defined. The slight forward movement of said link unlocks the toe 66 from the shoulder 65, but said link is prevented from lifting by the toe 71 which is now caused to bear against the under side of the cross-bar 59, thereby retaining the link and the multiplier key in depressed position until the traveling carriage begins its rearward movement, at which time the spring 39 restores these parts to normal position.

In Fig. 26 the sliding frame 51 is shown in its extreme forward position, being limited by the stop controlled by the 9 multiplier key, which is shown depressed. The 9 multiplicand key is also depressed and accordingly the 9 and 1 disk has been rotated by the forward movement of the upper rack 46, to the ninth angular position, in which the horizontally alined notches in said disk represent 8 and 1 or 81, the product of $9 \times 9$. The link 38 is released from the shoulder 65, but is locked in depressed position by its second locking toe 71 which is under the cross-arm 59.

If the operator depresses the wrong multiplier key, the same may be restored to normal position by depressing the release key 13' (Fig. 22). The depression of said release key lowers a link 75, which is somewhat similar to the links 38, but which has no locking shoulders thereon. It is provided however with an arm or bracket 76, which carries a short post 77 mounted so as to turn therein. A pin 78 passes loosely through an opening in said post, and is fixed to a shaft 79, rotatably mounted in suitable brackets 80, carried by the main frame of the machine. Said shaft 79, has a bar or plate 81, suitably secured thereto, and extending across the series of links 38. Said plate 81, does not interfere with the normal operation of said links by the multiplier keys. The depression of the release key however, lowers the link 75, and through the post 77 and pin 78 rocks the shaft 79 through a small angle, thereby causing the lower edge of the plate 81 to sweep forward whatever link 38 may have been locked in depressed position by its locking shoulder 66, thereby unlocking said link and permitting the corresponding spring 39 to restore the link and the multiplier key to initial position.

It will be seen that the depression of a multiplier key does not release a previously depressed key, as is the case with the multiplicand keys. In fact in the operation of the machine several or all of the multiplier keys may be depressed simultaneously under certain circumstances. When the handle is operated, the forward movement of the sliding frame 51 acts to release the multiplier keys one at a time, as said frame strikes first whichever stop 57 projects the farthest from its link. Accordingly, if it so happens that the desired multiplier as read from left to right is made up of digits which increase in value, such for example as 1389, all four of said multiplier keys may be depressed initially and will be released one at a time, from left to right, by the sliding frame in its successive excursions. If, however, the desired multiplier is made up of digits which decrease in value or which are irregular in this respect, it is necessary to depress the multiplier keys one at a time and pull the handle once, for each key so depressed.

*Locking means for racks.*

In order to illustrate the mechanism for locking the racks to the sliding frame, the train of links and other elements operated by the depression of the 9 key will be described, particular reference being had to Figs. 2, and 23 to 32 inclusive. When the key-board is assembled, the lower ends of the multiplicand key stems 14 are arranged above and adapted when depressed to rock a corresponding series of arms 85 through a small angle. The keys 5 to 9 inclusive in each row are adapted when depressed, to bear directly against their corresponding arms 85 which are arranged adjacent thereto. The arms for the keys 1 to 4 inclusive are arranged near the bottom of the machine and accordingly a rod 86 is interposed between said arms and key stems and in alinement with the latter, whereby the downward movement of any of said keys will be communicated directly to said arms. There is no connection of any kind between the zero key and the multiplicand units. Referring to Figs. 23, 24, 31, 32, each arm 85 is fixed to a shaft 87 which also carries a pin 88. When the outer end of the arm 85 is lowered, the shaft 87 is rotated and the end of the pin 88 is also lowered and depresses the end of the lever 89, which is pivoted at 90, and arranged with its other end normally bearing against the rack 46 to maintain the outer end thereof out of engagement with the sliding frame. There are five upper levers 89 all pivoted about the same support 90, there being one lever for each upper rack and also one for each of the four lower racks. The forward end of each lever, which is normally in engagement with its rack, maintains a yielding pressure thereon, being held down by the pin 91 which bridges all five of said levers, as seen in Fig. 23.

Said pin is carried by the bell crank lever 92 which is pivotally mounted on the guide pin 48 and held in normal position by a spring 93. Said lever 92 is engaged at its lower end by one of the vertical arms of a double bell crank lever 94. Said double bell crank lever has two oppositely disposed locking arms 95 and 96, which are maintained in locking position by a suitable spring 97. Said spring accordingly aids in causing a yielding pressure on the upper racks 46 by virtue of the series of links and other elements just described. Hence, when the key stem 14 is depressed, two results are accomplished: First, the rack is rocked about its point of support on the disk and locked to the sliding frame, and as the rack travels forward the effort required to move the same and rotate the disk is very slight. Second, the depression of the key stem by rocking the bell crank lever 92 against the action of the springs, raises the unlocking arm 95 and lowers the unlocking arm 96 which normally obstruct the inward movement of two shoulders or tongues 98, 99, hereinafter described. As will be seen from Figs. 33 and 34, the arms 95, 96 are not arranged in the same vertical plane, but are offset an amount substantially equal to the thickness of the combined five disks, and are connected by interlocking hubs hereinafter described. The lowermost position of the pin 91 is determined by the upward movement of the rear end of the arm 89 which is notched out to accommodate the shafts 87, one of which is engaged by each of said arms 89.

It will be seen from Fig. 31, that the five pins 88 become successively shorter. This construction is provided so that the angular throw imparted to any rack when the same is rocked, will be the same regardless of which key is depressed. Inasmuch as the keys are depressed a constant amount, it is apparent that unless this compensating arrangement was provided the angular throw imparted to the arm 89, and consequently to the rack 46, would be greater for those key stems located nearer the pivotal point 90. The pressure required to operate the various keys is also equalized by this arrangement.

The arrangement of arms and levers whereby the lower racks 47 are rocked into engagement with the sliding frame, will now be apparent, as said arrangement is similar to the arrangement provided for the upper racks.

*Assembly of units.*

The manner of assembling the multiplier units will be understood from an inspection of Figs. 28, 29, 30. The plate 63 constitutes one of two outer plates or retaining walls between which all of the multiplier units are confined (see also Figs. 41 and 42). The extreme left-hand unit is assembled by superimposing on the left-hand plate 63 the various elements shown in Fig. 28. The rack 100 which carries the shoulder or tongue 99, previously mentioned, is arranged in mesh with a reversing pinion 101, which latter is meshed with a second rack 102. When the shoulder 99, which projects from the rack a sufficient distance to bear against the peripheries of all of the five disks which go to make up the unit, moves radially inward or to the right, the rack 102 moves an equal distance to the left. The upper rack is guided in its movement by the roller 103 on the pin 104. The lower rack is supported by a suitable pin 105. An additional rack 106 is provided which in this left-hand unit is preferably riveted or otherwise secured to the plate 63. Between the racks 102 and 106, a pinion 107 is arranged in engagement with both, said pinion being rotatably mounted on a suitable stud 108, which is carried by a sliding arm 109. It is apparent that when the rack 102 travels to the left, the arm 109 will move to the left one-half the distance traveled by said rack, the pinion 107 traveling back and forth along the stationary rack 106. The locking arm 96, previously described in connection with Figs. 33 and 34, is located with its hub 110 arranged centrally of the plate 63. Said hub is provided with a dovetailed portion arranged to fit into the corresponding hub 111 on the oppositely extending rocking arm 95. Suitable bolts 112 are provided which are adapted to pass through the entire series of multiplier units and act to hold all the parts in assembled position.

A second plate or partition 114 is next laid on top of the assembled elements shown in Fig. 28, with the hub 110 projecting through the central opening therein. This second plate is preferably similar to the retaining plate 63 except that it is not provided with the projecting brackets 62 and may be made of thinner metal. It has in addition two horizontal slots 115, through the left-hand one of which the tongue 99 is adapted to project and in which slot said tongue is guided in its back and forth movement. The right-hand slot 115 in this particular instance performs no function but is useful elsewhere as hereinafter explained, this plate 114 being an exact duplicate of a large number of plates used throughout the multiplier units as hereinafter described. A collar 116 is slipped over the hub 110 and the multiplier disk 40 (representing digits of 1 and 9) is mounted loosely on said hub. The upper and lower racks 46, 47, the pivoted arms 89 and the shafts 87 are then assembled as shown in Fig. 29. This figure includes also Fig. 28 with additional elements superimposed thereon. Fig. 30 is intended to represent Fig. 29 with additional elements assembled thereon. These additional elements are the separator strips 117 which are slipped loosely over suitable rods 118 and 119 and serve not only to separate adjacent disks, but to guide the racks as they travel back and forth in mesh with the teeth on said disks. In Fig. 30 there is also shown the next consecutive disk 41, representing multiples of 2 and 8, and the racks which mesh therewith. Said disk and racks are arranged over said separator strips 117. Additional separator strips are then placed over said disks and racks and another disk and rack are then superimposed, together with the necessary adjuncts previously described and in this manner the unit is built up until it contains all five disks, 40 to 44 inclusive. A second plate similar to 114 is then placed thereon, this plate constituting the right-hand wall of the group or unit of the highest order. See Fig. 31. Said plate has mounted thereon a sliding rack 120 somewhat similar to the rotating rack 106 except that the former carries the shoulder or tongue 98 previously described. Various other elements which are mounted on this plate have previously been described, and the function thereof will be clear. Among said elements are a second pinion 107 and a second rack 109 on which said pinion is pivotally mounted. It should be noted also that the vertical rods 86 are confined between and guided in their movement by a series of pins or studs 121, said rods being beveled at their lower ends.

The next unit is built up by superimposing on the assembled elements shown in Fig. 31, a plate 122 (see Fig. 35) another rack 100, a reversing pinion 101 and reverse rack 102. Said reverse pinion 107 shown also in Fig. 31, said pinion being engaged from above by the rack 120, previously described. In other words, the movement of rack 120 is determined by the disks of the left-hand unit or unit of the highest order, whereas the movement of the corresponding rack 102 which meshes with the lower side of said pinion, is determined by the disks of the next lower order, the movement of the third rack 109 being proportional to the combined movements of said first two racks. The bell crank levers 92 previously described, are also mounted on this plate 122 and have attached thereto the springs 93 which are also attached to openings in said plate.

The plate 114 shown in Fig. 36 is placed over the parts seen in Fig. 35 and the assembling of the unit proceeds by the addition of disks, spacers and various adjuncts as described in connection with the assembling of the first unit. Said plate 114 has an opening 124 therein, the right-hand end walls 125 of which converge at forty-five degree angles as shown, and lead to an elongated opening or slot 126, which is adapted to receive a pin or lug 127, the latter being preferably triangular and carried by and projecting from the pinion 107. The function of this pin is hereinafter described.

The assembling of the remainder of the five units is simply a duplication of the assembling process for the first unit. The assembling of the fraction units is with few exceptions, similar to that just described. The fraction units will be described more in detail hereinafter.

ACTUATING MEANS FOR MULTIPLYING TOTALIZER.

The coöperation between the sliding racks 102, 120, and the differential movement which they impart to the third sliding rack or arm 109, will be clear from an inspection of Figs. 43 and 44, one of which is more or less diagrammatic. In the diagram the disk 44 is illustrated, as this disk represents the multiples of 5 and 0, the steps or notches being less complex than those of the other disks. The diagram illustrates how the product of 9 times 5 is obtained. From the foregoing description it will be apparent how, when the 5 multiplicand key is depressed in the proper row, the 5 disk will be selected for rotation and the depression of the 9 multiplier key will permit the rotation of the disk to the ninth angular position. Said disk is shown in this position in the diagram. When the operating handle is pulled, the shoulder 98 on the rack 120 is moved inwardly until obstructed by the bottom of the last recess. This recess is five units deep and the movement of the rack will be represented by 5 as indicated on the scale in said diagram. The shoulder or tongue 99 is caused to move to the right until obstructed by the bottom of the uppermost left-hand step, which is four units deep. Accordingly, the rack 100 moves to the right four units and through the reversing pinion 101 permits the rack 102 to move to the left four units as indicated on the lowermost scale. The movement of these racks accordingly represents the digits of 45 or the product of 9 times 5. It will be seen that in an elementary machine the movement of the two racks 102 and 120 might be communicated directly to two numeral wheels arranged side by side, the combined wheels indicating directly the product, 45. In order to provide for the multiplication by a single digit, of numbers of more than one digit, however, I provide the above mentioned differential mechanism whereby the movement of racks of the same order may be accumulated or transferred to a single element, said accumulation of the two movements being preferably simultaneous, but not necessarily so.

Differential finger mechanism.

The function of the differential mechanism will be clear from a consideration of the mental steps employed in multiplying 55 by 9. This operation may be indicated as follows:

```
   55
    9
   --
   45
  45
   --
  495
```

Mechanism for obtaining this product is illustrated in Figs. 45 and 46, in which the elements represented in Figs. 43 and 44 are duplicated. In other words, there are two groups of racks and one disk only in each group representing adjacent orders. The other disks are omitted for the sake of clearness. In Fig. 45 the position of the racks is the same as shown in Fig. 43, in which the rack 102 is moved four spaces and the rack 120 is moved five spaces. In the second group of racks the movement is the same, namely rack 102 is moved four spaces and rack 120 is moved five spaces. The adjacent racks 102 and 120 in Fig. 46 both engage the same pinion 107 and tend to move it in the same direction. Accordingly, the sliding arm 109, on which said pinion is mounted, has moved to the left a distance proportional to the sum of the movements of said racks. Hence, it has moved a distance proportional to nine spaces, as indicated on the diagram. Accordingly it will be seen that the positions of the uppermost and lowermost racks, seen in Fig. 46, together with the position of the arm 109 in said figure, indicate in a general way the product 495, that is the product of 9×55.

The operation may be more fully described in connection with a multiplicand having more digits than in the problem set out above. For example, consider the multiplication of 765×9. The operation may be indicated as follows:

```
   765
     9
   ---
    45
   54
  63
  ----
  6885
```

From the operation of the 5 disk previously described, it will be apparent how the product of 9×5 or 45 is obtained after depressing the 5 multiplicand key of the lowest order and depressing the 9 multiplier key. In a like manner the product of 9×6 may be obtained by the rotation of the proper disk in the tens order or second from the lowest order. Similarly the product of 9×7 may be obtained by the rotation of the proper disk in the third from the lowest order. In the complete product the units digit is 5; the tens digit is the sum of 4 plus 4, which is 8; the hundreds digit is 5 plus 3, which is 8; and the thousands digit is 6. By virtue of the differential movement referred to above, the accumulation or adding of the digits in any given order may take place simultaneously whereby all the multiplicand keys may first be set up for any number however large and said number may then be multiplied by one digit by a single pull of the handle or an equivalent operation.

*Forward and backward stroke of operating handle.*

When the operator pulls the handle forward the notched disks 44 are first rotated and then the shoulders 98 and 99 move toward each other until stopped by the notches, the sliding arm 109 moving forward a proportionate amount. On the backward stroke of the operating handle, the said shoulders 98 and 99 are moved away from each other, thereby permitting the notched disks 44 to be restored to normal position immediately thereafter. During this restoration of the shoulders and the parts associated therewith, the pin 127 coöperates with the slot 126 shown in Figs. 37-40, thereby insuring that each of the racks 100—120 is restored to initial position, otherwise one rack might be moved back more than enough to clear the notched disk, whereas the other rack might not be moved far enough to clear said disk unless means were provided for insuring the complete restoration of each rack. During said restoration, the movement imparted to the pinion 107 is applied through the pin 108 from the rack 109, so that the pin 127 is caused to strike one or the other of the inclined shoulders 125, thereby automatically alining said pin 127 so that it will enter said slot. The rack 109 and also the pin 108 move an amount equal to one-half the depth of the notch in the disk as far as any single notch is concerned or one-half the sum of the total depth of the notches, which movement is invariable in this respect. It will be seen that the angles of the shoulders 125 are approximately 45° angles, thereby enabling this function to be readily fulfilled.

The simultaneous operation of the differential mechanisms for the various orders will be understood from Fig. 42. In this figure it will be seen that each pinion 107 (with the exception of the lowermost pinion representing the units order) is acted upon by the two racks, 102 and 120, as previously described, the rack 120 having its movement governed by the unit side of a disk of the higher order and the rack 102 having its movements governed by the tens side of a disk of the lower order. In other words, each rack 120 represents by its movement the units of a partial product and each rack 102 represents by its movement the tens of a partial product and the movement of each rack 102 is combined with the movement of the rack 120 of the succeeding higher order, as the movement of both racks represent digits of the same order. This combining of the two movements takes place simultaneously for all orders and is effected by virtue of the fact that adjacent racks 102 and 120 both act on the same pinion 107 and move the same to the left, imparting to the sliding arms 109 a movement proportional to the sum of the movements of said pairs of racks. With the differential arrangement illustrated, the movement of each sliding arm is in fact equal to exactly one-half the sum of the combined movements of the two racks. The differential movement which I have employed is very simple and effective and represents the preferred form of this phase of my invention. I do not limit myself, of course, to this form of differential however, as various other forms may be employed, permitting either simultaneous or successive accumulation of the movements of the two racks.

In Fig. 41, it will be seen that the rack 128 is permanently secured to its supporting plate and simply forms a track for the pinion 107. The rack 120, however, slides in the usual manner. Accordingly the movement imparted to the arm 109 is proportional simply to the movement of the rack 120. The movement of said arm represents the extreme right-hand digit of the product, to which there is nothing to carry from a lower order as there is no lower order. In a simple form of machine in which no fractions are multiplied, said arm would correspond to the first order to the left of the decimal point, namely, the units order. In such a case it will be apparent that if we assume the operation of the elements shown in Figs. 41, 42 for the purpose of multiplying 765 by 9, the resulting movements of the four arms shown will be proportional to the digits 6, 8, 8, 5, the product of said numbers.

In the present design of machine, however, the elements shown in Fig. 41 represent right-hand side of the last fraction unit which fraction units will now be described.

The three right-hand multiplier units shown in Fig. 3 and also in Fig. 53 are the ones by which fractions are multiplied. The depression of a fraction key causes the selection of disks representing the decimal equivalent of the said fraction.

*Fraction units.*

Figure 15:
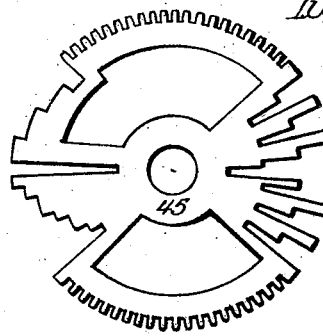

The fraction units are quite similar to the regular multiplier units previously described, and are made up of disks which are preferably duplicates of those shown in Figs. 10 to 15 inclusive. The first unit to the right of the decimal point, namely the third from the right-hand unit seen in Figs. 3 and 53 is made up of five disks which represent multiples of the following digits, read from left to right: 1, 3, 6, 8, 5, the 1, 3 and 5 disks being inverted with respect to the same disks in the main units. The second unit to the right of the decimal point is made up of the following five disks arranged from left to right: 2, 7, 3, 6, 5, the 2, 3 and 5 disks being inverted. The right-hand unit is made up of three disks representing the following: 5, ⅓, ⅔. The one-third and two-thirds disk is of special construction and is shown in Fig. 15.

When it is desired to set up the fraction ⅛ in the multiplicand, the key marked ⅛ is depressed. The decimal equivalent of ⅛ is .125. The connections between the ⅛ key and the three decimal units (see Figs. 53 to 56 inclusive) is such that the 1 disk is selected in the unit to the right of the decimal point, the 2 disk is selected in the next unit and the 5 disk is selected in the third or right-hand unit. The selecting mechanism consists of the rotatable shaft 129 from which project pins 88, similar to those previously described, but spaced apart the proper distance to rock simultaneously the various levers 89, when the arm 85 is depressed by a key stem, and cause the racks 46 to engage the sliding frame 51 in a manner which will now be well understood. Accordingly, by the depression of a single key the proper disks are selected in the same manner as if three separate keys, namely 1, 2, 5, had been depressed. The arrangement whereby the remaining fractions indicated are set up will now be clear. Of course a much larger number of fraction keys may be used than the number illustrated, the provision of means for automatically selecting the decimal equivalent of the desired fractions, lending itself to almost indefinite expansion. The product obtained, by multiplying the fraction by any given multiplier, is transferred to the intermediate carriage in the same manner as that described in connection with the multiplication of the usual digits to the left of the decimal point.

The depression of any of the five rear keys, namely ⅛, ⅜, ⅝, ⅞, ⅓ operates selective mechanism arranged above the disks as seen in Fig. 53. In this respect the operation is analogous to that shown in Figs. 25 and 26.

The depression of the four forward keys, namely ⅔, ¼, ¾, ½ operates selective mechanism arranged below said disk, this operation also being readily understood in view of said figures. The exact arrangement of the lower selecting devices is shown in Fig. 55, each arm 85 being set opposite the corresponding key by which it is depressed.

The arrangement of the disks and adjuncts is of course more or less arbitrary for the fractions under consideration and is subject to wide variation. The arrangement would of course differ if different fractions were desired. The disks need not be the same as the disks in the main units, but may be specially designed so as to reduce the number required, thereby eliminating some of the complementary numbers where they are not required in the fraction units, and substituting some essential number or digit whose multiples are required.

The ⅓ and ⅔ disk (Fig. 15) is so designed that an extra unit is carried into the product, which would otherwise be lost. For example the decimal equivalent of ⅓ is .333. The true value is .333⅓. In thre ordinary operation of the machine 3×.333 would be .999, whereas the correct product should be 1.0. The notches in said disk are so arranged that in the multiples of ⅓ by 3, 6, and 9, a product is produced of 1, 2, 3, rather than .999, 1.999, 2.999. This necessitates a slight change in the configuration on both sides of the disk. The same general modification is made for the multiples of ⅔ by 3, 6, and 9, resulting in 2, 4, and 6, instead of 1.999, 3.999, and 5.999. This results in a special disk of the configuration shown in Fig. 15. Fig. 56 shows the selective mechanism for the ⅓ key. When the key is depressed, the disk in the left hand unit representing multiples of 3, is locked to the sliding frame through its rack and similarly the 3 disk in the middle one of the fraction units is also locked thereto, the disk selected in the right hand group representing 3⅓. The actuating means for the ⅔ multiplier is arranged beneath these same three disks, the rods 86 constituting the intermediate connections. (See also Fig. 32.) The disks selected by the depression of the ⅔ key, represent multiples of 6, 6 and 6⅔ respectively.

The manner of operating the fraction disks is the same as the operation of the disks in the units to the left of the decimal point, the rotation of any disks in one of the fraction units serving to position the shoulders or wings 98, 99, arranged on the respective racks 120, 100. The movement of said racks is communicated to pinions 107 which are carried by additional arms 109. It will be apparent, of course, that instead of fraction keys, a plurality of rows of digit keys may be arranged to the right of the decimal point for setting up the decimal equivalent of fractions or both fraction keys and decimal keys may be used.

It is to be understood, of course, that the ⅓ and ⅔ keys illustrated herein are special keys adapted only for a special purpose, and that for most purposes the ⅓ key may simply represent .333 and the ⅔ key represent .666, in which case the disks employed would be the regular "3" and "6" disks.

Concentrating mechanism.

The arms 109 are necessarily spaced apart a considerable distance. In order to transmit the movement of the pinions 133 to an accumulator in which the pinions are more compactly arranged, I provide the mechanism shown in Figs. 47 and 48. In these figures the rotative movement of the various pinions 133 is transferred to a closely grouped series of pinions preferably arranged at the middle of the machine, although in some cases it is desirable to group said pinions at the right hand side thereof. Of the several pinions 133, all but one of them have in mesh therewith a smaller pinion 134, each of which latter pinions is fastened to a collar or sleeve 135 rotatably mounted on a suitable shaft 136. At the opposite end of each collar is a second pinion 137 of the same size as the pinion 134, said second pinion being in mesh with the pinion 138 of the same size as the driving pinion 133. The pinions 138 are closely grouped and are preferably spaced equal distances from each other. In the present case, there are nine such grouped pinions, although the number employed is dependent upon the desired capacity of the machine. By virtue of the above arrangement, it will be seen that said pinions are gathered together in the middle of the machine, so as to provide a compact arrangement. I do not limit myself to the means illustrated for transferring the movement of the various arms 109 to a closely grouped set of pinions as various other arrangements may be employed.

Multiplying Totalizer.

The multiplying totalizer comprises the various pinions and coöperating elements through which the movement taken from the differential arms heretofore described, is transmitted to the carrier which contains the main register, totalizer or accumulator. The items are transmitted to the main carriage through an intermediate carriage or trans-set mechanism which is caused to accumulate the respective partial products during a step-by-step movement across the machine and transfer them to the main carriage in such relation that the total of the partial products will equal the final product. The forward movement of the various arms 109 represents the total accumulation for each order or column, including those to the right of the decimal point. This accumulation may be in excess of 10, however, and suitable carrying mechanism must be provided before the product can be properly shown on the accumulator wheels. For example, if we consider that the various racks 109 have received a differential movement representing the product of 138×9, it will be seen that the movement of certain of the racks is in excess of 10, as illustrated in the brackets in the following computation:—

```
    1   3   8
            9
    ―――――――――
        7   2
    2   7
    9
  (11)(14)(2)
```

The movement of the arm of the lowest order is two units, the movement of the next arm is 14 units, and the movement of the next arm is 11 units. The carrying devices will properly transfer certain of these digits to the next higher order, to express the product properly, thus:—

```
        2
      1 4
    1 1
    ―――――
    1 2 4 2
```

Each arm 109 (see Figs. 2, 47 and 48) is provided with a series of teeth 130 whereby the rear end thereof constitutes a rack. Said teeth are in mesh with the pinion 131, loosely mounted on the shaft 132, but secured to and adapted to turn with the adjacent pinion 133. The pinion 133 is larger than the pinion 131, so as to give preferably a 1 to 3 increase in the circumferential movement of the teeth, the sliding movement of the arms 109 being comparatively small.

Transfer Mechanism of Multiplying Totalizer.

This mechanism will be found in Figs. 49 and 50, and the operating mechanism therefor in Fig. 2, hereinafter described. When the operator pulls the handle forward, the pinions 138 rotate certain pinions immediately above the same and in mesh therewith. On the backward stroke of the operating handle, said upper pinions are caused to mesh with the gears in the trans-set carriage, which latter trip the transfer mechanism thereby permitting said upper pinions to return beyond normal position and effect a carrying or transfer to the pinions of the next higher order. This additional carrying movement is simultaneously transmitted to the gears of the trans-set carriage.

Each pinion 138 (see Figs. 49 and 50) is in mesh with a pinion 139 immediately above the same. The number of pinions 139, however, is in excess of the number of pinions 138, so that the former project to the left beyond the latter to permit a transfer to an order higher than the order represented by the left hand pinion 138. The drawings show ten such pinions in Fig. 49. Said upper pinions normally constitute the end of the train and are not in mesh with the pinions in the traveling carriage except during a certain portion of the operation, namely, during the backward movement of the operating handle, as hereinafter described. All the pinions 139, except the "units" pinion, are provided with a tripping, carrying or transfer mechanism. Adjacent to each pinion is a plate 140, provided with an arc-shaped slot 141 within which a pin 142 fixed to the pinion 139, is adapted to travel. The plate 140 is provided on one side with a series of ratchet teeth 143 which coöperate with the escapement mechanism 144. Said escapement mechanism is preferably pivoted about the shaft 145 and is provided with two teeth 146 and 147. The plate 140 is normally in the position shown in Fig. 50 being held against the tooth 147 by the action of the spring 148, which normally impels the arm 149 in a downward direction, said arm having a loose connection with an extension 150 on said plate 140. The escapement arm 144 is normally held in the position shown, by a spring 151. Whenever the outer end 152 of said escapement arm is tripped or momentarily depressed, however, it will be seen that the plate 140 will be permitted to rotate one tooth, the teeth 143 being sucessively engaged by the projections 146 and 147, as the escapement arm 144 is rocked.

The tripping is effected by the series of pinions 153 when lowered into mesh with the pinions 139, each pinion 153 carrying two pins or projections 154 spaced apart a distance of ten teeth circumferentially. One or the other of said pins 154 strikes and depresses the end of arm 152 momentarily.

It will be noted that prior to the operation of the machine the intermediate carriage is as far to the right as possible, the left hand end of its group of pinions 153 being two steps to the right of the left hand end of the group of pinions 139 immediately beneath it. When the operator first pulls the handle forward the intermediate carriage moves one step to the left, and at the end of the stroke the pinions in the carriage drop into mesh with the pinions immediately beneath them, the relation of the pinions then being that shown in Fig. 49.

The partial rotation of the plate 140 moves the end of the slot away from the initial position of the pin 142, whereby the pinion 139 which may be assumed to have rotated in the direction shown by the arrow when the arms 109 are thrown forward, is permitted in its return movement to rotate beyond its normal limit of travel. The arrangement is such that whenever the run of the "units" pinion 139 exceeds 10 teeth, the arm 152, between the "units" and "tens" pinions, is tripped by one of the pins 154, whereupon the adjacent "tens" pinion 139 is permitted to move in such a direction as to increase the total by one. Said movement is in a direction opposed to the arrow. In a like manner the rotation of the "tens" pinion an amount in excess of ten teeth will trip the pinion of the next higher order, and so on. The extreme left hand pinion 139, when tripped, is given a partial rotation by means of the spring 154' secured thereto at one end and at the other end to a suitable portion of the frame. This spring is provided for the reason that said end pinion 139 is not in mesh with any of the pinions 138 beneath it and therefore cannot be rotated thereby, as in the case of the remaining pinions 139. In this manner the proper partial product is obtained as in the preceding example where 9×138 gives 1242 on the pinion 153. It often happens that the pinions 139 are tripped two teeth but never more than this. For example, consider the product of 9×19 as an extreme case:

```
   1 9
     9
   ----
   8 1
   9
   ----
  (17)1
```

It will be seen that one of the pinions 139 will have a run of seventeen teeth. If we assume that the pinion 153, in mesh therewith during reverse rotation, instead of standing in the zero position, has previously been moved to the 9 position by an earlier operation, the movement of seventeen teeth communicated thereto will cause it to turn to a position representing 9+17, or 26 teeth from initial position. The 2 digit of the 26 will be carried to the next higher pinion in this case, causing the double trip.

The operating mechanism whereby, when the operator pulls the handle, the sliding frame is caused to move forward and the various rack arms are also caused to be moved forward, will hereinafter be described more in detail. It is sufficient at this point to understand that each of the rack arms 109 is positively locked in rearmost position when the machine is at rest, but when the handle is operated, each of said arms is unlocked and simultaneously put under an increased spring tension, whereby whatever racks have previously been unlocked indirectly by the operation of the multiplicand keys, will be permitted to move forward and thereby impart a variable angular throw to the pinions 139. The partial rotation of the plate 140 is effected during the rearward movement of said racks by the spring 148 which pulls down on the arm 149, as previously described. Said plate is not restored immediately to initial position at the end of each operation of the machine, but is restored whenever the operator again pulls the handle forward in the subsequent multiplying operation, at which time said arm 149 is rocked to normal position against the action of the spring 148 by suitable means hereinafter described. The pinions 153 in the intermediate carriage are lifted out of mesh with the pinions 139, before the latter are restored to normal position.

Referring now to Figs. 37 to 40 inclusive, the function of the pin 127 carried by the pinion 107 will be explained. When the arm 109 is in normal position the said pinion and pin are in the position shown in Figs. 36 and 37. Whenever either or both of the racks 102, 120 are moved to the left, the pinion 107 also moves to the left, the pin 127 performing no function during such movement. If only the lower rack moves, as shown in Fig. 38, the pin 127 simply moves in a curved path near the upper diagonal wall 125. If on the other hand the upper rack alone moves to the left, said pin follows along the lower wall, as shown in Fig. 39. If both racks move to the left simultaneously, said pin is carried out of engagement with either of said walls and does not interfere with the movement of the pinion in any way during any of these movements.

After the pinions 153 in the intermediate carriage are thrown into mesh with the pinions 139 the arms 109 are then moved rearwardly, not only to initial position, but often beyond their initial positions due to the single or double trip previously described. During such movement the racks 100 and 102 are moved away from the axis of the disks and the limiting stops or tongues 98 and 99 should be moved apart beyond the circumference of said disks. Owing to unequal resistance offered by one or the other of said racks, however, it might happen that one of said tongues 98 or 99 would not move entirely out to the circumference of a disk, whereas the other tongue would move farther out than necessary. As a result all the disks of the unit might be accidentally locked against further rotation by said first tongue. This accidental occurrence is prohibited by the pin 127 which, during the return movement of the pinion 107 to the right, strikes against one or the other of the inclined faces of the walls 125, thereby forcing said pinion to such a position that the racks 102 and 120 adjust themselves to their normal relative positions, just as the pin 127 is entering the slot 126. Said pinion may continue its right-hand movement as far as necessary, the pin 127 riding in said slot, thereby causing both racks 102 and 120 to be carried to the right the same distance, thus insuring a uniform separation of the tongues or wings 98 and 99.

The intermediate carriage of the multiplying totalizer is located above the pinions 139 and is arranged between the main body of the machine and the main carriage, the latter being intended to accumulate the successive products obtained by the operation of the machine, and registered in said intermediate carriage, and also to print the same, as well as to print the total of said products whenever desired.

The intermediate carriage is arranged to travel transversely across the machine from right to left, said carriage being released by an escapement mechanism each time the main handle is pulled during the ordinary multiplying operations, and hence having a step by step movement. The pinions 153 in said carriage, of which there are fourteen illustrated, are thereby brought over the corresponding pinions 139 of which there are at least ten, the latter being engaged by whatever group of upper pinions are caused to drop into mesh therewith during the backward stroke of the operating handle. In this manner successive partial products are accumulated in the intermediate carriage to obtain a complete product of any two numbers within the capacity of the machine. For example, in multiplying a given multiplicand by a multiplier of two or more digits, it is necessary to pull the operating handle once for each digit of the multiplier. The machine thus multiplies by one digit at a time. All the description up to this point relates to multiplication by a single digit. The machine is designed to multiply by the left hand digit first instead of the right hand digit as in the long hand process, as it is more natural for the operator to strike the multiplier keys in order from left to right, as in operating a typewriter for example.

Accordingly the machine multiplies as indicated below, at the right, instead of at the left,—

```
    4 2 6 8           4 2 6 8
      5 9 1             5 9 1
    -------           -------
    4 2 6 8         2 1 3 4 0
  3 8 4 1 2         3 8 4 1 2
2 1 3 4 0             4 2 6 8
-----------         -----------
2,5 2 2,3 8 8       2,5 2 2,3 8 8
```

Upon the first forward stroke of the actuating handle, the machine multiplies 4265 by 5, giving 21,340, the intermediate carriage moving to the left to the position shown in Fig. 49 except that the carriage pinions are elevated and hence out of mesh with the pinions 139 immediately beneath them. During the backward stroke, this partial product is run into the intermediate carriage. During the next forward stroke the intermediate carriage moves one step to the left, the effect of which is to increase the partial product from 21,340 to 213,400, in other words, multiplying it by 10. The machine during said second forward stroke multiplies 4,268 by 9, giving the partial product of 38,412. During the backward movement of the handle said second partial product is run into the intermediate carriage. It is thereby added to 213,400, the total product registered in said intermediate carriage at this time being 251,812. During the third operation of the handle the machine multiplies 4,268 by 1, giving a partial product of 4,268. Before said partial product is run into the intermediate carriage, however, said carriage has been moved another step to the left, thereby increasing the item 251,812 to 2,518,120, and the third partial product is added to this last item, giving a final product of 2,522,388. It will be seen that if there had been more digits in the multiplier this process could have been kept up indefinitely within the capacity of the machine. The final product so obtained is transferred or run into the main carriage by raising the intermediate carriage until its pinions are in mesh with those of the main carriage and then driving said pinions back to zero position, as hereinafter described. It is apparent that the intermediate carriage may be raised in this manner whenever desired, the operator performing this operation by the depression of the total key whenever he has completed the multiplying process.

The main carriage is normally stationary, but is adapted to move from right to left in unison with the intermediate carriage after the depression of the decimal key. Until such depression, however, the intermediate carriage moves from right to left with respect both to the main body of the machine and also with respect to the main carriage, which remains stationary. The purpose and function of the movement of the main carriage and its coöperation with the decimal key will be hereinafter described.

The intermediate carriage comprises in the preferred design illustrated a suitable frame in the form of side walls 160 connected by transverse elements or rods 161 at the front and rear thereof. Said plates are provided with openings 162 which receive the rods 163 on which said carriage slides back and forth transversely with respect to the main axis of the machine. Said rods are suitably supported by standards or brackets 164 as seen in Fig. 63.

*Trans-set mechanism.*

One of the side walls has secured thereto a double rack or ratchet arm 165. This arm coöperates with the double pawl hereinafter described, said elements constituting an escapement whereby said carriage may be given a step by step movement transversely across the machine, the movement being from right to left as viewed from the front of the machine (see Fig. 57). A spring 166 is suitably secured to said carriage and to a fixed support, being put under increased tension during the step by step movement, and restores said carriage to normal position when the escapement mechanism is rendered inoperative.

*Engaging and disengaging mechanism.*

Within the main frame of the carriage just described is a second frame (Fig. 69) made up of side members 167 suitably spaced apart by rods 168. Said frame is carried by a pair of links 169 at each side thereof, the upper link being pivoted to the outer frame 160 at the point 170, and lower link being pivotally supported on the rod 163. Said links are secured at their opposite ends to the plates 167 by pins 171, which pins project into arc-shaped slots 172 in the side plates 160. It will be seen that the inner frame may swing up and down with a parallel link motion, whereby the plates 167 always remain horizontal during such movement. The slots 172 limit the upward and downward movement of said plates and hence of the shaft 173 mounted therein on which the pinions 153 are supported.

As previously described, said pinions 153 are adapted to be lowered into engagement with the pinions 139 and are also adapted to be raised into engagement with the pinions in the main carriage. In order to effect this upward and downward movement I provide the sliding plates 174, one on each side of the frame of the carriage. Said plates are provided with a plurality of slots 175 which receive the pins or screws 176, the latter being secured in the side walls 160. The left-hand end of the plate 174, as seen in Figs. 67 and 68 may be said to resemble three steps 177, 178, 179, said steps being connected by intermediate inclined planes or cam surfaces. At the lower extremity of said plate an additional step 180 is provided. As shown in Fig. 68, the upper pin 171 is resting on the lowermost step, and the lower pin is held down by the additional stop 180, the pinions 153 being thereby locked in lowermost position. They are locked against downward movement by the step 177 and against upward movement by the step 180. If the plate 174 is moved to the left the pins 171 will be elevated until the upper pin rests on step 178. In this position the pinions 153 are out of mesh with either the upper or the lower adjacent pinions, (see Fig. 67). If said plate 174 is moved to the extreme left-hand position the upper pin 171 rides to the highest step 179. In this position the pinions 153 are in mesh with the pinions in the main carriage (not shown in this figure, see Fig. 71). When said plate 174 is moved to the right the pinions naturally drop of their own weight, this downward movement being insured, however, by the under cam surface which forces the lower pin 171 downward.

In order to produce the back and forth movement of the actuating arms 174, I provide in the rear end thereof notches 181 adapted to receive the bar 182 which is secured to shaft 183 and adapted to turn therewith. Said shaft has secured thereto at one end a forked plate 184, whereby said shaft may be rocked back and forth. The rocking of the bar 182 will throw said arms 174 forward and backward, in whatever position the intermediate carriage may happen to be transversely of the machine. The mechanism for rocking the shaft 183 back and forth will be hereinafter described. It is apparent, that the pinions in the intermediate carriage are normally in mid-position and that they may be positively thrown either down or up and locked in said positions by a simple back and forth oscillation of the shaft 183.

The pinions 153 are not simply idlers but may be termed denominational pinions, as they determine the terms in which the final product will be expressed. In making use of the decimal system, as would ordinarily be done in obtaining results in dollars and cents, the tripping pins 154 carried by said pinions are arranged ten circumferential teeth apart, said pinions being preferably provided with twenty teeth.

*Locking mechanism of totalizer in neutral position.*

It is important, when the pinions are in intermediate position out of mesh with any other pinions, that they be locked in idle position. To insure this locking I provide a Y-shaped element 185, as seen in Fig. 69, said element being pivotally supported on the shaft 168 and having a locking fin 186 adapted to mesh simultaneously with all of the pinions 153 and lock the same against rotation. Diverging arms 187, 188 are also provided, the former being held normally against the rod 161 by a suitable spring 189. When the pinions are in mid-position the locking element is arranged as in Fig. 67. When said pinions are lowered, the lowering of the shaft 168 causes the locking element to turn slightly about the same, the arm 187 bearing against the rod 161, thereby withdrawing the locking fin 186 from between the teeth of the pinions 153 and unlocking the same, as shown in Fig. 68. At this time, however, said pinions are locked by being moved into mesh with the pinions 139. When said pinions are thrown into uppermost position the arm 188 is engaged by the rod 190, thereby causing a slight rotation of the locking element in the same direction as that just described, whereby said pinions are again unlocked by the fin 186, but are simultaneously locked by being thrown into mesh with the pinions in the main carriage. In this manner said pinions are always positively locked against accidental rotation whether in upper, intermediate or lower position.

THE MAIN CARRIAGE.

The main carriage, which contains the accumulator and the printing mechanism, will now be described (see Figs. 70 and 71). In the present design the frame of the carriage comprises side plates 200, suitably spaced apart by various shafts and cross-bars, some of which will be hereinafter described. The carriage is provided at its lower extremities with suitable rollers 201, whereby it may move easily back and forth on rods or guides 202, which are suitably mounted on the main frame of the machine (see Fig. 2). Within the carriage a suitable frame 203 is pivoted about the shaft 204 and arranged between the side walls. A series of pinions 205 are loosely mounted on said shaft and are adapted to be engaged by the pinions 153 when the intermediate or auxiliary carriage is raised. Each pinion 205 is in mesh with a train of pinions 206, 207, 208 and 209, the first two of which are suitably carried by the pivoted frame 203. The pinions 209 may be assumed to constitute the main pinions of the accumulator. The relation of the various pinions to each other is normally as shown in Fig. 7, whereby the accumulator is adapted for addition. In other words it adds or accumulates the various products transferred to it from the main body of the machine. Additional series of reversing pinions 210 and 211 are also provided, the latter pinions being normally in mesh with the row of pinions 209. The pinion 210 is normally out of mesh with the pinion 207, but may be engaged thereby whenever the frame 203 is swung downwardly through a small angle about its pivotal support, as where it is desired to subtract from the accumulated amount, the product about to be transferred to the accumulator from the intermediate carriage. The arrangement of the pinions for subtraction is shown in Fig. 71.

There are also mounted on the shaft 204 a plurality of pinions 212, one arranged adjacent each pinion 205. A ratchet wheel 213 is arranged between pinions 212 and 205, and turns with the former. A spring pawl 214, is mounted on the pinion 205 and engages the teeth of the ratchet wheel 213, whereby rotation of the pinion 212 will drive the pinion 205 in one direction but not in the other. A rack segment 215, is arranged in mesh with each pinion 212 and constitutes part of a type frame 216, which is pivotally mounted on the shaft 217. Springs 218 are suitably secured to fixed supports and to each rack segment 215, and tend to draw the same downwardly, thereby tending to lift the forward or left hand end of the type frames and position the type carried thereby, as hereinafter described. Rotative movement of the type arms or frames is normally obstructed, however, by various elements, among them being the shaft 219, which extends across the entire series of frames and is suitably mounted on pivoted arms, hereinafter described, so that it may be rocked in the arc of a circle about the shaft 217 as a center. The connections with the main operating handle are such that when said handle is drawn forward the shaft 219 is lowered, thereby permitting the springs 218 to rock the individual printing frames 216 about their pivotal support 217, provided the same are free to rock.

Connecting the multiplying totalizer to the main carriage.

The operation of the accumulator in connection with the type arms will be clear from a description of the transfer of a number from the intermediate carriage to the accumulator. It is to be understood that in the present design, a complete forward and backward movement of the main operating shaft is required in order to obtain a product, which is set up on the pinions in the intermediate carriage, but which cannot be read thereon, and accordingly must be transferred to the main carriage by an additional operation of the main operating shaft. When it is desired to make such a transfer, or in other words when it is desired to accumulate and simultaneously print a product the key 11 is depressed, whereupon the pinions 153 in the intermediate carriage are raised and thrown into mesh with the pinions 205 immediately above the same in the manner previously described (Fig. 67). The downward movement of the bar 219, effected by the forward movement of the main operating shaft, permits the springs 218 to rock certain of the type frames 216, and thereby rotate the pinions 212, which in turn drive the pinions 205 through the pawl and ratchet connections, the latter pinions 205 driving the pinions 153 back to zero position. This zero position is determined by the pins 154 on each of said pinions, which strike against the stops 221, of which there are a series equal to the number of pinions, and which are suitably mounted on a support 222. A spring pawl 223 is provided for each pinion 205, thereby locking the same against rotation in one direction, while permitting rotation in the opposite direction.

Adding and subtracting totalizer.

It will be seen as in Fig. 71, for example, that if the pinion 153 has previously been moved nine teeth from its zero position to indicate the number 9, as one of the digits of the final product, the pin 154 will have moved from its position against the stop, 221 nearly to the lower side of said pinion, as shown in dotted lines in said figure. Accordingly, when the pinion is swept back to zero position by the spring 218 and intermediate elements, the pinion 205 will be rotated nine teeth, and this movement will be communicated to the accumulator pinion 209, which will rotate nine teeth either forward or backward, depending upon whether the pivoted frame 203 is set for addition or subtraction, the type arm 216 being raised to the ninth angular position, as shown in said figure, in either case. Assuming that it is set for addition, as in Fig. 70, the movement of the accumulator pinions will be in the direction indicated by the arrow. If set for subtraction, the movement will be in the reverse direction, as indicated by the arrow in Fig. 71. Simultaneously with the transfer of the desired product to the accumulator, said product is printed by suitable printing mechanism hereinafter described, the printing frames 216, as previously explained, having a variable rotation or throw corresponding to the variable rotation of the accumulator pinions.

Adding.

If the accumulator stands at zero when the product is transferred thereto, the total indicated by the accumulator, will be the amount of said product. When the next successive product is transferred to the accumulator, said product will be added to the number already registered thereon, so that the accumulator will indicate the sum of said products. The positioning of the type arms simply permits the printing of said second product, however, and not of the total, assuming that the total is not desired at this stage of the operation. In adding the second product to the first and in adding successive products, it is necessary to transfer or carry from the lower to the higher orders, as in all adding machines.

Subtracting.

When it is desired to subtract from the total amount registered by the accumulator, any desired product set up in the intermediate carriage, the pivoted frame 203 is swung to subtracting position, as shown in Fig. 71, by the depression of the subtraction key and through intermediate mechanism hereinafter described. In this position the movement of the printing frames, when a product is transferred from the intermediate carriage, is the same as that previously described, and the pinions 205 rotate in the same direction as in the case of addition. Said movement is transferred to the accumulator pinions, however, through the train of pinions 206, 207, 210 and 211 to the accumulator 209, which accordingly rotate in a reverse direction, as indicated by the arrow. Accordingly, the total is reduced by the amount transferred from the intermediate carriage.

*Transfer mechanism.*

The carrying is controlled by the pinion 208, which is provided with a projection or pin 225. In the design illustrated said pinion is provided with 10 teeth and said pin trips a suitable mechanism once for every complete revolution of the pinion. It is apparent that the tripping may occur once for any desired or predetermined number. For example, if the carriage is specially designed to indicate the result in inches and feet, said pinion would be provided with 12 teeth or some multiple of 12 with a suitable stop for every twelve teeth. This feature is very important, as it will be seen that different carriages, both main and intermediate, may be constructed to handle different denominational money systems or other systems, and said carriages may be applied interchangeably to the body of a single standard machine, the same type of machine serving therefore for a great variety of systems.

For every complete rotation of the pinion 208 the pin 225 strikes one face of a double cam or projection 226, on the arm 227, said arm being suitably pivoted about the shaft 228. Said arm is normally held in the position shown against a suitable stop 229, by a spring 230, but is intermittently moved forward against the action of said spring by said pin 225. Said arm 227 is also provided with a locking pin or catch 231, which is engaged by a hook 232, on another arm 233, which latter is suitably pivoted on the shaft 204. The rearward face of said link is inclined to form a cam surface. Said arm 233 is continually impelled in a forward direction by a spring 234, but is locked in rearward position by its hook 232 and said locking pin 231, and also by a second lock 235, having the form of a plate or bar fixed to the shaft 236 and normally held in locking position by the spring 237. It will be seen that any or all of the arms 233 may be unlocked individually or simultaneously, but all arms so unlocked are held in normal position by the locking bar 235, until the latter is rocked out of the way at the end of the forward stroke of the main operating handle, and after the accumulator pinions have come to rest. Said arms 233 are restored to normal position by the sweep bar 238, which is carried by suitable arms 239, fixed to the shaft 240, said shaft being rocked forward and backward with the forward and backward movement of the operating handle. When said sweep bar 238 is moved to a forward position, as shown in Fig. 71, the unlocking bar 241 carried by the shaft 240 strikes the coöperating bar 242, and thereby rocks the unlocking plate 235 out of locking position, permitting the springs 234 to move simultaneously whatever arm 233, one or more, may have been unlocked from their catches 231. Each arm 233 carries a pawl 245, pivoted at 246 and normally held against the teeth of the pinion 205 by a spring 247. Said teeth are thereby permitted to ride freely under said pawl when the product is being transferred to the accumulator, as previously described, and said pawl will engage said teeth when the arm 233 is moved forward, but will ride over the same when the arm returns, the pawls 223, preventing a simultaneous return of the pinions 205. When the arm 233 moves forwardly to effect the carrying operation, the amplitude of the forward swing is just sufficient to permit the pawl 245 to rotate the pinion 205 of the next higher order, an amount equal to one tooth, thereby advancing the accumulator pinion 209 of the next higher order an amount equal to one tooth. Any or all of the accumulator pinions above the lowest order may be advanced in this manner, the advances being simultaneous. Just prior to this advance the pinions in the intermediate carriage have been drawn out of engagement with the pinions 205, so that no obstruction to said advance is offered thereby.

At the end of the forward stroke, the lock 235 is operated to release the arms 233. At the end of the back stroke the bar 238 restores said arms 233, permitting them to be engaged by the pin locks 231, (see Figs. 70, 71, illustrating the end of the back and the end of the forward strokes, respectively). The said lock 235 holds the arms 233 against movement during the carrying operation, thereby effecting a delayed transfer and avoiding a transfer to a moving wheel. The pull on the pin 231 by the hook 232 is substantially in line with the fulcrum 228 of the latch 227. Hence the force necessary to release said latch is merely that required to overcome the frictional engagement of said parts plus the tension of spring 230 which is only strong enough to return the latch 227 to its idle position against the stop 229.

It will be seen that said forward movement of the pinions 205 is not communicated to the type frames 216, the latter having been locked against any further advance by suitable type alining mechanism hereinafter described, simultaneously with the rocking of the unlocking shaft 240. The pawl 214 and ratchet 213 permit the carrying to take place in the accumulator without affecting the position of the printing frames, which latter indicate the item just added and not the total.

The rotation of the carrying pinion 208 in a reverse direction for subtraction will trip the latch 237 and will permit identically the same operation of the various carrying elements as previously described in connection with addition. Certain of the pinions 205 will accordingly be advanced one tooth, but said advance on being transferred to the accumulator pinions 209 through the same train above described, will be converted into a rearward movement one tooth instead of a forward movement, so that the resulting number or difference will be properly indicated. The item subtracted, however, will be printed in substantially the same manner as if the same item were to be added, except that said item is preferably printed in red ink, or some other distinguishing color, so as to appear as a credit item, where the machine is used in making out bills, for example.

It will be seen that the accumulator may be operated indefinitely within the capacity of the machine to accumulate the various products obtained. Where the machine is used simply as an adding machine, said products will be the identical numbers struck on the multiplicand keys, the machine automatically multiplying each number by one, which does not change its value. When it is desired to print the accumulated total which may of course have been reduced from time to time, by various items subtracted in the manner previously described, the operator depresses the grand total key (Figs. 70, 71) thereby rocking the shaft 250 by suitable intermediate mechanism explained later, and causing the stops 251 to be interposed in the path of the projections or pins 252, of which there are two carried by each accumulator wheel 209, one stop for each ten circumferential teeth. When the main handle is pulled forward, the printing frames 216 all tend to rock, due to the pull of the springs 218, and said printing frames being geared to the accumulator pinions 209, through the train of pinions illustrated in Fig. 70, in "addition position," all the accumulator pinions which have previously been moved from zero position, are swept back to zero, with the pins 252 abutting against the stops 251, which limit said return movement. Accordingly, the printing frames will be raised to position the type properly to print the total indicated by the accumulator. If it is desired by this operation to complete the operation of the machine, said accumulator pinions remain in zero position, the printing arms being restored to zero position without affecting said pinions due to the pawl and ratchet mechanism. If it is desired to adapt the machine for the printing of sub-totals, suitable key operated means may be provided, whereby the restoration of the printing arms by the restoring bar 219 will cause the various accumulator pinions to be returned to the position in which they indicate the total and from this point on additional items may be added to the total already accumulated.

While the main carriage is desirable where it is required to print the various products or the total thereof, said carriage may be dispensed with. Under these circumstances, the pinions in the intermediate carriage would be provided with numeral wheels arranged so that the desired products may be readily seen at a glance. As the equivalent of the main carriage, a shield or guide may be arranged to be locked to the intermediate carriage and travel therewith so as to properly indicate the location of the decimal points in the final products.

PRINTING MECHANISM.

*Type sectors.*

The means for imparting to the type arms 216 a variable throw has previously been described. The purpose of said movement is to properly position said arms with respect to the platen 260 mounted on the shaft 261. Each type frame comprises duplicate arc shaped members 216 between which the rack segment 215 is secured at one end thereof and the type 262 are secured at the other end. The inner ends of said type have thereon raised characters indicating the numbers 0, 1, 2, 3, 4, 5, 6, 7, 8, 9, the zero being at the top and the nine at the bottom of the series. The individual type are movable longitudinally, their movement away from the platen being limited by the shoulder 263, and their inward movement being limited by the pin 264. Said type are normally impelled outwardly by springs 265 each of which presses outwardly against a short link 266 engaged in notches 267 in adjacent type. The arms 216 are provided with suitable notches 268 which receive the shoulders 263 on the type. Slots 269 are also provided which limit the inward movement of the pins 264. It will be seen that each of the ten type projects outwardly beyond the frame 216. In addition two extra projections 270 are provided which are formed integrally with the type frame 216, the purpose of which will be hereinafter described.

Hammer mechanism.

The projecting ends of the individual type are adapted to be struck by the type hammers 275, said hammers driving against the platen whatever type is positioned in line therewith. Each type hammer is pivotally supported on a rod 276 and is impelled toward the platen by a suitable spring 277. The entire series of hammers, however, is normally locked against the action of the springs by the locking plate 278 secured to the rotatable shaft 279 and adapted when rotated to simultaneously release all of said hammers. Said hammers are also locked by individual latches 280 except two right hand hammers which always release upon operation of the bars 278, representing cents in money (see Fig. 79). Said latches are pivotally supported on the shaft 281 and held in locking position by the springs 282. Each latch carries a projection or pin 283 which is engaged by one end of the lever 284 pivoted on the rod 285 and arranged with its other end bearing against the bottom of the type frame 216. Each lever is normally impelled in the direction indicated, by a spring 286, but is blocked against such movement by said type frame. Whenever any of said type frames are elevated the corresponding levers 284 turn about their pivotal supports in response to the pull of the spring 286, and thereby disengage the corresponding latches 280 from the type hammers. The sequence of operation (see Figs. 76, 77, 78, 79) is such that the individual type hammers are first unlatched and then the entire series of hammers is unlocked by the rotation of the bar 278, whereupon whatever hammers have previously been unlatched are impelled forward by their individual springs 277, thereby striking the type and causing the latter to print on the paper which is held against the platen, said type striking against a suitable two-color inking ribbon and pressing the same against the paper in a manner which is well understood.

Each latch 280, with the exception of the right-hand latch corresponding to the lowest order, is provided with a projection or pin 287, which projects across the latch of the next lower order and is adapted to fit within a notch 288 cut therein. The pins on alternate latches are arranged on a line above those on the remaining latches. In this manner the forward movement of the latch corresponding to the digit of the highest order in the number to be printed will insure the unlocking of all of the type hammers of the succeeding lower orders. Of course, the upward movement of the various type arms 216 would insure said unlocking if such movement always took place. When the number to be printed, however, contains any zeros there will be no upward movement of the corresponding type arm as the zero type is always properly positioned to be struck by the type hammer, as seen in Fig. 70. Under these circumstances the hammer for said zero key would not be unlatched unless special provision were made to unlatch it by some of the elements of the higher orders.

The rocking of the shaft 279 and hence of the unlocking plate 278, is effected by rocking the shaft 276 to which is secured the dog 289 which engages the coöperating dog 290 and rocks the latter and hence said shaft 279 to which it is secured. Said shaft 276 also has secured thereto a pair of arms 291 which carry a sweep bar 292 for restoring the hammers 275 to initial position. Said bar 292 swings rearwardly out of the way of said hammers before they are unlocked and at the end of its return forward swing it causes the latching of any hammers which may have been released.

Alining mechanism.

In order to accurately aline the type just before they are struck by the hammers, I provide suitable latches 293 which are mounted on the rod 294. Each latch is provided with a shoulder 295, which is adapted to be engaged by the outer ends of the type as shown in Fig. 71. Said latches are swung forwardly by the rod 292 which sweeps forward just prior to the final release of the hammers 275 and after the printing frames 216 have been elevated. Accordingly, the shoulders 294 are engaged by the outer ends of certain type and the horizontal row of type in the adjacent printing arms is accurately alined. The release of the type hammer by the bar 278 takes place simultaneously with the release of the transfer or carrying mechanism by the partial rotation of the shaft 240 previously described. Accordingly, the various type frames are held by the latches 292 in the position to which they have been raised, while the carrying is taking place in the accumulator, without danger of moving said type frames beyond their intended position.

Of course the movement of the type arms would be limited by the restoration of the intermediate carriage pinions 153 to zero position, with their pins 154 against the stops 221 (Fig. 71) but for the fact that said pinions drop out of mesh with the main carriage pinions prior to the end of the forward stroke of the handle. If said pinions were not lowered they would obstruct the carrying in the accumulator. Said pinions being out of the way the pinions 205 are free to advance another tooth and independently of the type arms 216, due to the pawl and ratchet connection 213, 214. The type arms are held in raised position by the springs 218, against the latches 293. The object of the two lower projections 270 on the type frame will now be apparent. When the type frame is raised to print the figure 9 the latch 293 is engaged by the lowermost projection 270. When the figure 8 is printed said latch is engaged by the upper of the two projections 270 (see Fig. 71).

*Ribbon mechanism.*

The ribbon spools 300 (Fig. 72) are mounted at opposite sides of the carriage on the shaft 276. The ribbon which is preferably a two-color ribbon, is suitably guided through the slots 301 in the side plates 200 and passes also through the ribbon guide 302 which is carried on an arm 303 pivoted about the shaft 217. A link 304 is connected to the arm 303 at the point 305 and is connected at its opposite end 306 to a bracket or arm 307, projecting from the pivoted frame 203. When said frame is in position for addition the upper half of the ribbon, which may be assumed to be black, is in line with whatever type is struck by the printing hammers. When said frame is in "subtraction position" the lower half of said ribbon, which is of some different color, for example red, is in line with said printing hammers. Accordingly, the usual items are printed in black ink, whereas the items which are subtracted are printed in red ink, and hence appear as credit items.

The ribbon spools are fed forward by a ratchet wheel 310 and a pawl 311, (Figs. 73 and 74) which is suitably mounted on the arm 312 and adapted to oscillate therewith. Said arm is rocked every time an item is printed and accordingly the ribbon is advanced step by step with each operation. The pawl and ratchet mechanism does not operate the spools directly, but operates either one or the other through the shaft 313, on which said ratchet wheel is mounted. Said shaft carries a pinion 314 at each end thereof, said pinions being adapted to engage one or the other of the pinions 315, one of which is mounted so as to turn with each ribbon spool 300. Backward movement of the ratchet wheel is prevented by the additional pawl 316. Said shaft 313 is adapted to be moved longitudinally when one spool is unwound, so as to engage with the opposite spool, thereby rewinding the empty spool. The mechanism for accomplishing this automatic reversal is omitted to simplify the drawings as various devices are in common use which satisfactorily perform this function.

*Auxiliary mechanism.*

The platen 260 is suitably rotated through a small angle after each printing operation in order to advance the paper in a well known manner. Said platen is rotated by a suitable ratchet 320 secured to the shaft 261, and a spring pawl 321 which is carried on the arm 322, the latter being rocked back and forth by suitable means hereinafter described. In the drawings a short platen is illustrated adapted to receive a comparatively narrow strip of paper. For many purposes a longer platen is desirable and may of course be readily provided. When used as a billing machine, the items, that is; the digits to be multiplied and the explanatory details are first written on a typewriter and the sheet is then inserted in the billing machine to obtain the products, add the same and in some cases, deduct credits. For this purpose a platen of standard length is used and it is further desirable to arrange the carriage at the right of the machine instead of at the middle as the platen would necessarily project considerably over the left side of the machine in view of the desirability of printing the items at the right hand side of the bill.

MAIN OPERATING SHAFT AND CONNECTIONS.

The main operating shaft 400 is suitably mounted in the lower part of the side walls of the machine and is actuated by the main lever 401, which is provided with an operating handle 402. Throughout the description reference has been made to the forward and backward stroke of the main operating handle or lever, on the assumption that the machine is manually operated. It is to be understood however that the machine may of course be operated by a motor if desired.

Referring particularly to Figs. 80 and 81, a crank 403 provided with a hub 404 is mounted loosely at the left end of the main operating shaft 400. A similar crank 405 with enlarged hub 406 is mounted loosely at the right hand end thereof. Each of the hubs has a notch or recess 407. The shaft 400 is provided with a sliding spline 408 adapted to be moved back and forth to engage in the notches 407 and thereby lock either hub 404 or 406 to said shaft so as to turn therewith. Both cranks are never locked to the shaft at the same time however. The crank 405 controls the main operation of the machine, while the crank 403 controls the printing operation. The crank 405 is normally locked to the shaft 400, the spline 408 being normally held to the right having secured thereto a collar 409 which is normally impelled to the right by a spring 410 secured thereto and to the shaft 400. Said collar is moved to the left however, whenever the operator depresses either the total key, the grand total key, or the subtraction key. This movement is effected by the link 411, which carries the two projections 412, the latter being adapted to engage the collar and move it against the action of the spring. The connection from the link 411 to said keys is through the bell crank lever 413, link 414, bell crank lever 415, (Fig. 85), link 416 to the double bell crank lever 417, which is connected with the grand total key. To the same bell crank lever 415 is also connected the link 418, which is connected in turn with the double bell crank lever 419, the latter being connected to the total key 11. Both links 416 and 418 are provided with slots at their upper ends, whereby either key may be operated without rocking the bell crank lever to which the other key is secured.

*Mechanism for reciprocating frame and rotating disks.*

When the main operating handle is drawn forward, the main shaft 400 is rocked, the crank 405 is also rocked (Fig. 85) and movement is thereby communicated first to the multiplier disks to rotate the same, and then to the racks which are positioned by the multiplier disks. To accomplish these movements, I provide a link 425, connected with the crank 405, and connected at its opposite end through the pin 426 to a sector-shaped element 427 fast on the shaft 428. The shaft 428 extends across the machine and at its opposite end (Fig. 84) is provided with a similar sector-shaped element 429. The sector 427 engages the roller 430 which is carried by the lever 431, the latter being pivoted at the point 432. A link 433 is connected to the lower end of the lever 431 and extends to the forward part of the machine, its forward end carrying a pin 434, to which is secured a spring 435, the other end of the latter being secured to a pin 436, which is carried by the sliding frame 51, and is adapted to slide in the slot 437 in said link 433. The link 433 is normally held in rearmost position, as shown in Fig. 85, by the spring 438, secured to the rear end thereof and to a suitable fixed support. On the opposite side of the machine as shown in Fig. 84, a second lever 440 is provided, similar to the lever 431. Said lever is provided with a roller 441, which is engaged by the sector 429, and accordingly the levers on both sides of the machine move in unison. A link 442 is also provided, which is connected at its rear end to the lever 440, and at its forward end to the other side of the sliding frame 51 through the spring 443, said link being held normally in rearmost position by the spring 444.

With the above arrangement it will be seen that when the sectors 427 and 429 rock in a forward direction, the rollers 430 and 441 are pushed or swung ahead, thereby rocking the levers 431 and 440 through a small angle and advancing the links 433 and 442, against the tension of the springs 438 and 444, extending the springs 435 and 443, and increasing their tension, whereby the sliding frame is moved forward until stopped by the multiplier keys as previously described and the disks are rotated correspondingly.

*Mechanism for lowering and raising intermediate carriage pinions.*

The sector 427 has connected thereto an additional link 445, having a slot 446 in its forward end which receives the pin 426 loosely. Said link is connected at its rear end to the pin 447 carried by the arm or crank 448, which is fast to the shaft 449, and is adapted to rock the latter back and forth. Mounted loosely on said shaft 449 is an arm 450, arranged adjacent to the arm 448, and provided with a pin 451, which is engaged by the latter arm when the same has nearly completed its forward swing, whereby a short forward swing is imparted to said arm 450. This forward movement is communicated to a link 452, and hence through a pin 453 to the arm 454, which is pivotally supported on the pin 455. Accordingly said arm 454 is given a slight forward movement at the end of the forward stroke of the main operating handle. Said arm has a second pin 456 received in a slot in the rear end of link 457, which latter is secured to the arm 431. Accordingly the arm 454 is rocked forwardly by the link 452, and restored by the rearward movement of the link 457, said rearward movement being limited by a suitable pin 458. The function of the arm 454 is to rock the shaft 183, by engaging in the forked member 184, this limited rocking of the shaft operating to lower the intermediate carriage into mesh with the pinions 139, at the end of the forward stroke and to elevate the carriage to mid position at the end of the return stroke Fig. 85.

*Means for restoring tripping mechanism.*

The arm 448 has a second link 460, secured thereto, said link being secured at its rear end to the pivoted arm 461. When said arm rocks forward, it engages a ratchet arm 462, loosely mounted on a shaft 463. A sector shaped element 464 is fixed to said shaft and carries a spring 465 which normally holds said ratchet 462 against a suitable stop 466. Accordingly the forward movement of the arm 461 causes the shaft 463 to rock, but the rearward movement of said arm 461 has no effect thereon. The function of these elements is to reset the tripping mechanism shown in Figs. 2 and 50. When the shaft 463 rocks, the arm 467 is also rocked, thereby lowering the link 468 against the tension of the spring 469, and rocking the lever 470 on the shaft 471. The restoring rod 469 carried by the ends of the links 467 sweeps upwardly and rocks all the links 149 about the shaft 468, thereby restoring the tripping mechanism to initial position as heretofore described.

*Means for moving differential racks.*

As previously explained, the shaft 449 (Fig. 85) is not rocked until about the middle of the forward stroke of the main operating handle. In other words it does not rock until after the multiplier disks have been rotated. It is then rocked to permit the necessary travel of the various racks, which movement is limited by said disks. As seen in Fig. 2, said shaft 449 has a sector 475, fixed thereon, and provided with pins 476 and 477, the rear ones of which engage the arms 478 and thereby throw the same forward. Each arm 478 of which there are nine, is normally held in rearmost position against a stop 479 on the corresponding rack 109, by a suitable spring 480. Connected to one of said arms 478, is a link 481, which connects also with a second arm 482, fast to the shaft 483. There are additional arms 482 on said shaft, one for each rack 109. Springs 484 are connected to said arms 482 and to the pins 485 on said racks. The tension of each spring is normally relaxed, but when the shaft 449 is rocked, the arms 482 are also rocked and the spring tension is increased. Furthermore the forward movement of the arms 478 removes the obstructions heretofore presented to the forward movement of said racks, and accordingly each rack is free to travel forward, provided that it is also unlocked through its forward differential racks as previously described. The rearward movement of the arms 478 under the influence of the springs 480 restores all the racks to normal position or slightly beyond and also relaxes the tension of the springs 484. It will thus be seen that these latter springs, which are the immediate means for operating the racks, are only under tension for short intervals of time. The restoration of the racks restores also the train of gears in mesh therewith shown in Fig. 50. As the racks reach normal position, the carrying mechanism shown in said figure becomes effective, whereby the pinions in the intermediate carriage are tripped or moved an additional one or two teeth and whereby said racks are moved beyond initial position a corresponding amount. They are subsequently restored exactly to zero position, however, when the tripping mechanism is restored by the restoring rod 469 as previously described.

*Operating means for trans-set mechanism.*

Referring to Fig. 84, it will be seen that the arm 440 is provided with a projection 490, which engages a double cam or pawl 491, formed on the arm 492, which latter is pivotally supported at 493. Accordingly when the arm 440 is rocked at the beginning of the forward movement of the handle, the projection 490 snaps over said double cam 491, and momentarily moves the arm 492 rearward against the action of the spring 494. Said arm is secured by a pin 495, to a link 496 and thereby gives the same a momentary rearward impulse. Said link is connected to the bell crank lever 500, (see Figs. 57 and 60) the latter being pivoted at the point 501, and having pivoted thereon about the point 502, a pawl 503, which normally engages the rack 165, and is held against the same by a spring 504. Said rack is also engaged by a second pawl 505, which is held against the same by a spring 506. Accordingly it will be seen that said rearward movement of the arm 496 will rock the bell crank lever 500 through a small angle and cause the rack 165 to advance one step to the left of the machine. Hence a step by step movement is imparted to the intermediate carriage every time the main operating handle is pulled forward after the depression of the usual digit keys.

*Addition key connections.*

The escapement mechanism just described may be rendered inoperative if the arm 496 is moved rearwardly a greater amount than the throw imparted thereto by the projection 490. This excessive throw may be given in two ways, one of which is by depressing the addition key 9. As seen in Figs. 58 and 84, the key stem of said key is provided with a notch 507 which adapts it to be locked to the plate 4. The depression of said key rocks the bell crank lever 508 and imparts a rearward throw to a link 509 secured thereto. Said link has a slot 517 in its rear end which receives the pin 495, and hence said rearward throw is communicated to the link 496. Said movement is sufficient to rock the bell crank lever 500 a greater amount than the normal amount, whereupon the spring pawl 503 is engaged by a pin 511, fixed in the side wall or the frame of the machine, thereby throwing said pawl out of engagement with the rack 165. The long arm of the bell crank lever 500 also strikes the other spring pawl 505, and disengages it also from said rack, whereupon said escapement mechanism is rendered temporarily inoperative and the intermediate carriage is not advanced in the manner heretofore described but remains in extreme right-hand position as in Fig. 57. The position of the parts of the escapement when the same is inoperative is shown in dotted lines in Fig. 60.

It will be seen that when the addition key is locked in depressed position, the intermediate carriage remains stationary, and the items set up on the multiplicand key board are accumulated or added in said intermediate carriage. If it is desired to print the individual items it is necessary to depress the total key and actuate the handle after adding each item. In the latter case the items are added in the main carriage and not in the intermediate carriage. In either case the total may be printed by depressing in the one case the total key, and in the other case the grand total key. Items may be subtracted from the total in the usual manner.

The addition key may also be depressed if it is desired at any time to restore the intermediate carriage to initial position, manually.

*Zero key connections.*

A step by step movement may also be imparted to said carriage by repeated depressions of the zero key, (See Figs. 1, 57, 58 and 84). Said key when depressed rocks the link 512, shaft 513 and arm 514 and imparts to the link 509 a small rearward throw about equal to that imparted by the arm 440. Said throw is limited by a pin 515 (Fig. 58) otherwise said throw might be as great as that imparted by the depression of the addition key, and render the escapement inoperative. The forward end of the link 509 is provided with two slots 516, 517, where it is connected to the two levers 514 and 508, whereby the depression of either keys does not effect the other.

*Restoration of intermediate carriage.*

The advancement of the intermediate carriage one step to the left is equivalent to multiplying by ten, any item registered therein, as will be apparent. Said carriage is automatically restored to initial position whenever the printing operation is effected. Said restoration is effected by rocking the bell crank lever 500 an excessive amount as previously described. Whenever the arm 403 on the main shaft (see Fig. 84) is rocked, the link 520 secured thereto causes the arm 521 to rock the shaft 522 whereby the dog 523 in its upward movement rides under the spring latch 524 and on its downward movement engages the same and rocks it, together with the arm 525. The rearward movement of said latter arm causes it to engage the pin 526 on the link 496 and thereby impart to the latter a rearward throw in excess of its normal rearward movement. The intermediate carriage is thereby released and restored to initial position.

*Actuating connections for main carriage.*

Whenever the arm 403 is locked to the (Fig. 84) main shaft 400 by the depression of the total key, grand total key or subtraction key, the rocking of said main shaft will rock said shaft 522 passing through the main carriage, as described above. Said shaft is maintained in normal position by means of an arm 530 drawn rearwardly by a spring 531 secured thereto and to a fixed pin 532. The rocking of said shaft causes the rocking of the arm 533 (Figs. 73 and 74). Secured to said arm at the point 534 are two links 535 and 536. The former is connected to the curved arm 537 which rocks the shaft 276 and thereby effects the unlocking of the type-hammers as previously described. The other link 536 is secured at its opposite end 538 to a bell crank lever 539 which is fixed to the shaft 240 and thereby operates to effect the carrying at the end of the forward stroke of the main operating shaft, as previously described.

A third link 540 is also secured to said arm 533 and is secured at its opposite end to the arm 312 which controls the pawl and ratchet mechanism for feeding the ribbon.

Mounted on the shaft 217 is a forked plate 541, one arm of which carries a roller 542 and the other arm of which carries the sweep-bar 219 which restores the type arms. Said plate is normally held in the position shown in Fig. 73 by said roller which bears against the outer end of the arm 533. Accordingly, said plate is not permitted to rock until after said arm has swung through a few degrees and on the return stroke of the main operating handle said plate is restored to initial position before the arm 533 reaches initial position. Said plate has a link 543 secured thereto and secured also to the arm 322 which controls the intermittent rotation of the platen. All of the above elements operate as described whenever the main handle is operated subsequent to the depression of the total, grand total or subtraction key. Said elements are shown in their normal positions in Fig. 73 and are shown in Fig. 74 as having moved to the extreme limit of their movement. Said main carriage is adapted to move across the machine transversely under certain circumstances as hereinafter described, the squared end of the shaft 522 (Fig. 85) permitting said shaft to travel with said carriage and at the same time maintain its operative connection with the arm 530 which rocks it.

*Subtraction key connections.*

In order to provide for subtraction, and for printing a grand total, it is necessary to rock the frame 203 about the shaft 204 as previously described. This rocking may be effected by depressing the subtraction key 10 (Fig. 84), said key being secured to a bell crank lever 545, one arm of which is connected to a link 546, connected to bell crank lever 547 which is fixed to the same shaft to which the bell crank lever 415 on the opposite side of the machine is secured.

By this connection the depression of the subtraction key insures the operation of the printing mechanism by locking the arm 403 to the main shaft 400. The bell crank lever 545 also has secured to its other arm a rod or wire 550 fastened at its other end to the arm 551 which has an opening fitting over the squared end of the shaft 552. Said shaft passes through the side walls 200 of the main carriage (Fig. 74) and has mounted thereon within said carriage an arm 553 connected also to a link 554 the opposite end of which is provided with a slot 555 which receives loosely the pin 556 secured in said frame 203. Said frame is normally in uppermost position but is rocked to lowermost position whenever the subtraction key is depressed.

*Grand total key connections.*

The same frame 203 may also be rocked to lowermost position by the depression of the grand total key 12, (Fig. 85), the depression of which rocks the bell crank lever 417 previously described and through the rod or wire 557 rocks an arm 558 secured to a second squared shaft 559 (Figs. 73, 74), the latter having secured thereto an arm 560 to which is secured a link 561 having an opening 562 therein and secured at its other end to an arm 563 which is fast to the shaft 250, the rocking of which interposes the stops which limit the return movement of the accumulator pinions to zero position. The downward movement of the link 561 causes the lowering of the pivoted frame 203 by virtue of the pin 564 secured to said frame and projecting into said opening 562. It will be seen that said pivoted frame may be rocked to subtraction position through the downward movement of either link 554 or 561, neither link effecting the operation of the other because of the loose connection between them and said frame.

The frame 203 is provided with a projecting pin 565 which engages a double cam surface on a pivoted arm 566 and thereby rocks the same momentarily whenever said pivoted frame is either raised or lowered. Said arm 566 is fast on the shaft 567 and is held in normal position by the spring 568. A locking fin 569 (Fig. 71) is also fixed on said shaft and is adapted to engage the teeth of the accumulator pinions 209 to positively lock the same during the short interval that the frame 203 is being raised or lowered, as during such interval the pinions 207 are momentarily out of mesh with either series of pinions 208 or 210.

*Total key connections.*

The depression of the total key and the consequent rocking of the bell crank lever 419 causes the wire 570 (Fig. 85) to be drawn forward thereby rocking the link 571 and moving rearwardly the sectoral plate 572 formed as an integral part thereof. Said plate is locked in said position by the spring pawl 573, the latter having a projection 574 which is engaged by an arm 575 at the end of the forward stroke of the operating handle during the printing operation. Said sectoral plate 572 is thereby unlatched and restored to normal position by a spring 576. Said plate has secured thereto a link 578 which is suitably supported at its opposite end by another link 579 and is provided with two pins 580 and 581. The function of said first pin is to engage the forked plate 184 and thereby rotate the shaft 183 to elevate the pinions of the intermediate carriage and throw them into mesh with those of the main carriage. Accordingly, in taking a total, the depression of the total key causes said pinions to be thrown into mesh prior to the operation of the handle, said pinions being thrown out of mesh at the end of the forward stroke of the handle at which time the amount registered in the intermediate carriage will have been run into the accumulator in the main carriage and will also have been printed.

*The decimal key connections.*

The function of the decimal key will now be described. As previously explained, the intermediate carriage has a step-by-step movement across the machine from right to left, whereas the main carriage normally remains stationary. Whenever the decimal key is depressed (Figs. 1, 58, 84), the main carriage is locked to the intermediate carriage and thereby is carried along with said intermediate carriage in its further step-by-step movement. The locking together of said two carriages is effected by the depression of the decimal key (Figs. 63–64), which rocks the link 585, shaft 586 and link 587 and pulls forward the link 588, secured thereto at 589, thereby rocking the lever 590 and the shaft 591 to which it is fixed, and simultaneously rocking the dog 592 at the opposite end thereof.

The shaft 591 extends across the machine and is suitably mounted in fixed supports, whereas a bell crank lever 593 is carried by the side wall 200 of the main carriage and, accordingly, travels therewith whenever said carriage is caused to move transversely. Said carriage is normally locked in initial position, however, by the bell crank lever, one arm of which normally rests in a slot 594 in a locking bar or rail 595, the latter being arranged transversely of the machine immediately beneath the main carriage. The other arm of the bell crank lever has a catch 596 projecting therefrom, which is adapted to engage any one of a series of notches 597 in a bar or plate 598 carried by the intermediate carriage and secured preferably to the front end thereof. The bell crank lever is held normally in locking position by the spring 599, but is rocked against the action of said spring whenever the decimal key is depressed, thereby locking the main carriage to the auxiliary carriage through the locking projection 596 which engages whichever one of the notches 597 happens to be in line therewith at the time said decimal key is depressed. As soon as the intermediate carriage continues its step-by-step movement to the left, the main carriage is carried therewith and, accordingly, the bell crank lever 593 is moved out of engagement with the dog 592 and the two carriages would now be unlocked through the action of said spring but for the provision of the locking rail 595 along which the bell crank lever slides, thereby retaining the latter in locked position. On the return movement of the main carriage, said bell crank lever is restored to initial position by its spring, which causes the lower arm thereof to snap back into the notch 594, thereby again locking the main carriage in initial position.

From a consideration of the illustration previously given wherein 4268 is multiplied by 591, it will be seen that the product 2,522,388.00, will be indicated on the pinions 139 in the intermediate carriage. In obtaining such a product, the main carriage remains stationary and performs no function whatever as far as the operation has been described, up to this point. If it is desired to print said product, the same may be transferred into the main carriage simply by depressing the total key and operating the main handle, whereupon the intermediate carriage is raised until its pinions are in mesh with the pinions of the main carriage, as previously described. If, in the problem referred to, the multiplier instead of being 591 had been 591.591, the operator, after having performed the steps previously described to obtain the product in the intermediate carriage, would depress the decimal key, thereby locking the main carriage to the auxiliary carriage. He would then depress the remaining digit keys 5, 9, 1, in the order named, operating the main handle after each depression, whereupon the previously obtained product 2,522,388.00 would be suitably increased. It will be apparent, however, that said previously obtained product determines the number of digits which will be found in the final product to the left of the decimal point, regardless of how many digits there may be in the multiplier to the right of the decimal point. In other words, in the particular example given, the left-hand figure of the product will be in the millions column and, although the final result will be greater than the product set out above, it will not be enough greater to increase the number of digits to the left of the decimal point. As soon as the main carriage is locked to the intermediate carriage, therefore, the position of the decimal point has been determined and, inasmuch as there is no further relative movement between the intermediate carriage and the main carriage, the additional partial products run into the intermediate carriage will not affect the position of the decimal point in the product as printed. The intermediate carriage and the main carriage will, of course, continue their step-by-step movement in unison to the left for three additional steps when the machine is being operated to multiply by the additional three digits to the right of the decimal point. If the total key is now depressed, the final product will be printed and also run into the accumulator with the decimal point in the proper place.

OPERATION.

As a résumé of the general operation of the machine the main steps required in multiplying 1919⅞ by 11.09⅜ are set out below. The multiplication of these numbers illustrates most of the typical features of the operation of the machine.

*Initial operation.*—Depress the following multiplicand keys preferably in their natural order from left to right: 1919⅞. Depress left hand multiplier key 1.

*First operation of main shaft.*

Forward swing 1919.875×1=   1919.875 registered in main body of machine.
Backward swing 1919.875 transferred to intermediate carriage.   1919.875 intermediate car.
Depress multiplier key 1 again.

*Second operation.*

Forward intermediate carriage one step to left.   19198 75 intermediate car.
 Simultaneously 19198.75×1=   1919 875 main carriage.
Backward—(19198.75+1919.875=)   21118 625 intermediate car.
Depress decimal key, locking main carriage to intermediate carriage.
Depress zero key. Both carriages one step to left but no change in decimal point.   21118 6 25
Depress 9 multiplier key.

*Third operation.*

Forward both carriages to left.   21118 62 5
 Simultaneously 1919.875×9=   172 78 875
Backward—(21118.6250 plus 17278.875)=   21291 41 375
Depress 5 key.

*Fourth operation.*

Forward both carriages to the left.
 Simultaneously 1919.875×5=   95 99 375
Backward—(21291.41375 plus 9.599375   21301.013 125
Depress total key. Intermediate carriage meshes with main carriage.

*Fifth operation.*

Prints product and registers same in accumulator.   21301.01

It will be seen that inasmuch as there are three multiplier units to the right of the decimal point, said right hand unit represents mills where the result to be obtained is in dollars and cents. The machine prints only dollars and cents as it is customary in financial transactions to omit the figure in the lower order, unless said figure is 5 or a number larger than 5, in which case the cents digit is usually increased by one cent. The present machine may be readily adapted to perform this function by depressing the 5 multiplicand key and thereby adding 5 to the digit in the mills column prior to printing the final column. If said mills digit happens to be 4 or less, the addition of 5 thereto will not give a large enough total to operate the transfer mechanism and thereby increase the digit in the next higher order, namely, the cents column. If, however, said digit is 5 or more, the addition of 5 thereto will provide a total of 10 or more, thereby operating the transfer mechanism and adding 1 to the cents column, which is thereafter printed.

Although the machine under discussion has been described particularly with reference to addition, subtraction and multiplication, it is apparent that the essential elements thereof lend themselves readily to the processes of division, and also to other mathematical operations.

In conclusion, it is again emphasized that the preceding description is directed to the machine illustrated in the drawings, which machine constitutes the preferred embodiment of the invention as viewed at the present time, and the invention is by no means limited to said embodiment. Accordingly, I do not desire to limit myself to the particular elements, groups of elements or relative arrangement of parts described and illustrated, except where limitations are imposed in the appended claims, as many and various changes, reorganizations and combinations of elements may be made without departing from the scope of the invention. Furthermore, wherever suggested modifications have been referred to throughout the specification, that phase of the invention is not to be limited to devices of the character or classification proposed in said modification. In general, therefore, I desire to have it understood that the various words and phrases employed throughout the specification have been used in a descriptive rather than in a limiting sense, and furthermore, the invention is to be interpreted as covering broadly any suitable equivalent means for accomplishing the desired results set out above, wherever said means fall within the scope of the appended claims.

Having thus described my invention, what I claim as new and desire to secure by Letters Patent of the United States is:

1. In a computing machine, a series of multiplier keys representing the digits from two to nine inclusive, an equal number of stops, one only for each of said keys, and an additional stop representing the digit one, said additional stop being normally set, and means for rendering said stop inoperative when any of the remaining stops are set.

2. In a computing machine, a series of multiplier keys representing the digits from two to nine inclusive, an equal number of stops, one only for each of said keys, and an additional stop representing the digit one, said additional stop being normally set, means for rendering said stop inoperative when any of the remaining stops are set, said means including a shaft adapted to be partially rotated by the depression of any of said other keys, and means coöperating with said shaft and said one stop for moving the latter when said shaft is rocked.

3. In a multiplying machine, one series of stops for all multiplicand orders, a locking shoulder for each stop, a series of multiplier keys for moving said stops to operative position, and means engaged by said shoulders for preventing a return movement of said stops.

4. In a computing machine, a series of stops, a locking shoulder for each stop, a series of multiplier keys for moving said stops to operative position, and a reciprocating frame engaged by said shoulders for preventing a return movement of said stops, the movement of said frame being limited by said stops.

5. In a computing machine, a series of stops, a locking shoulder for each stop, a series of multiplier keys for moving said stops to operative position and a reciprocating frame whose forward movement is limited by said stops, said frame being adapted to be engaged in forward position by said shoulders whereby said stops are locked against return movement, the rearward movement of said frame permitting said stops to be restored to normal position.

6. In a computing machine, a single element having a portion of irregular outline representing in one plane multiples of more than one digit.

7. In a computing machine, a single element having a portion of irregular outline representing in one plane the units digits of the multiples of a plurality of digits.

8. In a computing machine, a single element having a portion of irregular outline representing in one plane the units digits of multiples of complementary numbers.

9. In a computing machine, a member having a portion of irregular outline representing the units order of multiples of more than one digit, the tens order for the multiples of the same digits being also represented by further irregular portions on the same member in a single plane.

10. A computing machine having a member with an irregular portion representing one of the digits of the multiples of a given digit, said member having a second irregular portion representing one of the digits of the multiples of a different digit, said member being adapted to move in either of two directions to properly position either one or the other of said irregular portions under the influence of the key board.

11. A computing machine having a member representing multiples of two digits, said member having a back and forth movement for positioning the same to act as a stop in determining said multiples, the movement of said member in one direction serving to position the same for one digit and the movement in the other direction serving to position the same for the other digit.

12. In a computing machine, a multiplying disk adapted to rotate in either of two directions, said disk having two groups of notches representing digits of the same order in the multiples of two digits, rotation of said disk in one direction serving to position one group of notches and rotation in the other direction serving to position the other group.

13. In a computing machine, disks constituting a physical representation of the multiples of the various digits, each disk representing both the units and the tens of the multiples of more than one digit.

14. In a computing machine, disks constituting a physical representation of the multiples of the various digits, each disk representing both the units and the tens of the multiples of two digits.

15. In a computing machine, disks constituting a physical representation of the multiples of the various digits, each disk representing both the units and the tens of the multiples of complementary digits.

16. In a computing machine, disks constituting a physical representation of the multiples of the various digits, each disk having portions representing the units and the tens of the multiples of more than one digit, the portions representing the digits of the same order in said multiples being grouped together.

17. In a computing machine, disks constituting a physical representation of the multiples of the various digits, each disk having portions representing the units and the tens of the multiples of more than one digit, the portions representing the tens of said multiples being grouped together.

18. In a computing machine, disks constituting a physical representation of the multiples of the various digits, each disk having portions representing both the units and the tens of the multiples of more than one digit, the units portion and the tens portion for each digit being arranged diametrically opposite each other.

19. In a computing machine, disks constituting a physical representation of the multiples of the various digits, each disk having portions representing both the units and the tens of the multiples of more than one digit, the units portion and the tens portion for each digit being arranged diametrically opposite each other, and a pair of members movable toward each other and limited in their movement by said units portion and tens portion respectively.

20. In a computing machine, disks constituting a physical representation of the multiples of the various digits, each disk having portions representing both the units and the tens of the multiples of more than one digit, the units portion and the tens portion for each digit being arranged diametrically opposite each other, the units portions being duplicates of each other.

21. In a computing machine, disks constituting a physical representation of the multiples of the various digits, each disk having portions representing both the units and the tens of the multiples of more than one digit, the units portion and the tens portion for each digit being arranged diametrically opposite each other, and a pair of members each adapted to move radially inward toward said disk, the movement of one of said members being limited by any one of said tens portions and the movement of the other member being limited by any one of said units portions.

22. In a computing machine, disks constituting a physical representation of the multiples of the various digits, each disk having portions representing both the units and the tens of the multiples of more than one digit, the units portion and the tens portion for each digit being arranged diametrically opposite each other, and a pair of members each adapted to move radially inward toward said disk, the movement of one of said members being limited by any one of said tens portions and the movement of the other member being limited by any one of said units portions, said latter movement being the same for the corresponding multiples in the reverse order of all digits represented by a disk.

23. In a computing machine, disks constitiing a physical representation of the multiples of the various digits, each disk having portions representing both the units and the tens of the multiples of more than one digit, the units portion and the tens portion for each digit being arranged diametrically opposite each other, and a pair of diametrically opposite members arranged to move toward each other, the movement of one of said members being interrupted by one of said tens portions and the movement of the other member being interrupted by one of said units portions.

24. In a computing machine, disks constituting a physical representation of the multiples of the various digits, each disk having portions representing both the units and the tens of the multiples of more than one digit, the units portion and the tens portion for each digit being arranged diametrically opposite each other, and a pair of oppositely disposed members adapted to move toward each other along radial lines, said disks being rotatably mounted, whereby they may rotate in either direction to interpose various portions thereof in the path of said members.

25. In a computing machine, disks constituting a physical representation of the multiples of the various digits, each disk having portions representing both the units and the tens of the multiples of more than one digit, the units portion and the tens portion for each digit being arranged diametrically opposite each other, and a pair of oppositely disposed members adapted to move toward each other along radial lines, said disks being rotatably mounted, whereby they may rotate in either direction to interpose various portions thereof in the path of said members, the latter being normally held against movement until after rotation of said disk, and means for moving said members toward each other until such movement is limited by certain of said portions, the movement of one member being always proportional to the units of the multiples of a given digit, and the movement of the other member being proportional to the tens of said multiples.

26. In a computing machine, an element having portions representing the digits of certain multiples, and a plurality of parts adapted to move simultaneously until limited by said element, said element being movable in either of two directions to determine the extent of movement of said parts by selected keys.

27. In a computing machine, an element having abutments, the radial values of which represent the digits of the multiples of a given number, and a plurality of parts adapted to move radially until limited by said element, said element being rotatable in both directions to determine the extent of movement of said parts by selected keys.

28. In a computing machine, a single flat element having portions representing the digits of the multiples of a given number, a plurality of parts adapted to move until limited by said element, and means for simultaneously moving said parts in different directions, until obstructed by different parts of said element, the latter being rotatable to position the same with respect to said parts.

29. In a computing machine, an element having portions in one plane representing the digits of the multiples of a given number, a plurality of parts adapted to move in different directions toward said element until limited thereby, means for simultaneously moving said parts until obstructed by said element, said element being rotatable to position the same with respect to said parts, and digit keys for positioning said rotatable element.

30. In a computing machine, an element having portions representing the digits of the multiples of a given number, a plurality of parts adapted to move until limited by said element, means for simultaneously moving said parts until obstructed by said element, said element being rotatable either backward or forward, and means under the control of multiplicand keys for rotating said element either backward or forward.

31. In a computing machine, an element having portions representing the digits of the multiples of a given number, a plurality of parts adapted to move until limited by said element, means for simultaneously moving said parts until obstructed by said element, said element being rotatable either backward or forward, means under the control of multiplicand keys for rotating said element either backward or forward, and means under the control of multiplier keys for determining the extent of rotation.

32. In a multiplying machine, a disk having recesses constituting stops, said disk being rotatable either backward or forward, a pair of bars adapted to move toward said disk, means for moving said bars until obstructed by said stops, means under the control of multiplicand keys for determining the direction of rotation of said disk, and means under the control of multiplier keys for determining the extent of said rotation.

33. In a computing machine, an element having portions representing the digits of the multiples of a given number, a plurality of parts adapted to move until limited by said element, means for simultaneously moving said parts until obstructed by said element, said element being rotatable either backward or forward, means under the control of multiplicand keys for rotating said element either backward or forward, means under the control of multiplier keys for determining the extent of rotation, and means for moving said parts until obstructed by said rotatable element, said latter movement being subsequent to the rotation of said element.

34. In a multiplying machine, a rotatable element having portions representing the digits of the multiples of two numbers, two differentially movable parts arranged to be obstructed by said element, multiplier keys for limiting the rotation of said element, and means for subsequently moving said parts until obstructed by said rotatable element.

35. In a computing machine, an element having portions representing the digits of various multiples, a plurality of parts adapted to move until limited by said element, said element being rotatable either backward or forward, means under the control of multiplicand keys for rotating said element either backward or forward, means under the control of multiplier keys for determining the extent of rotation, and means for moving said parts in opposite directions until obstructed by said rotatable element, said latter movement being subsequent to the rotation of said element.

36. In combination, a series of stops, multiplier keys for setting said stops, a rotatable element having portions representing the digits of the multiples of more than one number, and means under the control of multiplicand keys for rotating said element either backward or forward, the extent of said rotation either backward or forward being determined by the said stops.

37. In a computing machine, a member adapted to move an amount proportional to the units digit of a given partial product, a member adapted to move an amount proportional to the tens digit of a partial product of the next lower order, and a third member controlled by said first two members controlling the movement of an accumulator wheel and partaking of the movement of both of said first mentioned members.

38. In a computing machine, a member adapted to move an amount proportional to the units digit of a given partial product, a member adapted to move an amount proportional to the tens digit of a partial product of the next lower order, and a third member having a continuous movement proportional to the sum of the movements of said first two members.

39. In a computing machine, a member adapted to move an amount proportional to the units digit of a given partial product, a member adapted to move an amount proportional to the tens digit of a partial product of the next lower order, a third member having a continuous movement proportional to the sum of the movements of said first two members, and an accumulator wheel having its movement controlled by the movement of said third member.

40. In a computing machine, a member adapted to move an amount proportional to the units digit of a given partial product, a member adapted to move an amount proportional to the tens digit of a partial product of the next lower order, and a third member coöperating with said first two members by a differential gear element.

41. In a computing machine, a member adapted to move an amount proportional to the units digit of a given partial product, a member adapted to move an amount proportional to the tens digit of a partial product of the next lower order, a third member coöperating with said first two members and having a movement equal to one-half of the sum of the movements of said first two members, and an accumulator wheel controlled by the movement of said third member.

42. In a computing machine, a member adapted to move an amount proportional to the units digit of a given partial product, a member adapted to move an amount proportional to the tens digit of a partial product of the next lower order, multiplying members having an irregular outline for determining the proper movement of said two members, an accumulator, and means for transferring to said accumulator the combined movement of said two members.

43. In a computing machine, a pair of movable rack members, and a pinion meshing with both of said racks, one of said members being adapted to move an amount proportional to the tens digit of a partial product and the other said member being adapted to move in the same direction an amount proportional to the units digit of the partial product of the next higher order, whereby the bodily movement of said pinion is proportional to the sum of such movements.

44. In a computing machine, a pair of movable rack members, and a pinion meshing with both of said rack members, one of said members being adapted to move an amount proportional to the tens digit of a partial product and the other said member being adapted to move in the same direction an amount proportional to the units digit of the partial product of the next higher order, whereby the bodily movement of said pinion is equal to one-half of the sum of such movements.

45. In a computing machine, a group of multiplying disks for each order, each group containing less than nine disks, certain of said disks having a notched periphery representing the units of the partial products of complementary numbers and having diametrically opposite said notched portion two groups of notches, one of which represents the tens digit of the partial product of one of said complementary numbers and the other of which represents the tens digit of the partial product of the other said complementary numbers whereby the multiples of all the digits may be represented by said group.

46. In a computing machine, a group of five multiplying disks for each order, said disks having notched peripheries representing multiples of the various digits, each disk representing two digits whereby only half as many disks are required as there are digits.

47. In a computing machine, a group of multiplying disks for each order, said disks having toothed circumferential portions, a plurality of racks in engagement with said toothed portions, and keys for moving one or the other of said racks to operative position to permit a movement of translation thereof, whereby said disk is rotated through a pre-determined angle.

48. In a computing machine, a group of multiplying disks for each order, said disks having toothed circumferential portions, a pair of racks each in engagement with one of said toothed portions, keys for moving one or the other of said racks to permit a movement of translation thereof, a series of stops for limiting the movement of either of said racks whereby said disk is rotated a pre-determined amount, and means for causing said movement.

49. A disk having pinion teeth on opposite sides thereof and having groups of notches arranged intermediate the toothed portions, said notches serving as stops and said toothed portions serving as means to rotate said disk for selecting partial products from the multiplication table.

50. In a multiplying machine, a multiplying disk having pinion teeth on opposite sides thereof, racks in engagement with said teeth and arranged in the plane of said disk, recesses in the circumference of said disk constituting stops, and a pair of opposed arms arranged to move toward each other and limited in their movement by said recesses.

51. In a computing machine, a group of multiplying disks for the orders lower than the units order, said disks having toothed circumferential portions, a plurality of racks in engagement with said toothed portions, fraction keys for said group each of which keys coöperates with a rack in one or more of said order groups to permit a movement of translation thereof, a series of stops for limiting the movement of said racks whereby said disks are rotated a predetermined amount, and means for causing said movement.

52. In a multiplying machine, a series of multiplying disks having a common axis of rotation, said disks being arranged in groups corresponding to consecutive orders both to the right and the left of the decimal point, means for simultaneously rotating one disk in each group through a predetermined angle, and manually operable keys for selecting the disks to be rotated.

53. In a multiplying machine, a series of multiplying elements arranged in groups corresponding to consecutive orders to the right and left of the decimal point, the elements in each group being duplicated in most of the remaining groups for fractional multiplication.

54. In a multiplying machine, groups of multiplying elements corresponding to consecutive decimal orders both to the right and the left of the decimal point, the elements in all the groups to the right of the decimal point except the last one being identical with elements found in the groups to the left of the decimal point, all of said latter groups being identical.

55. In a computing machine, a multiplier unit comprising side members, a shaft supported thereby at its ends, and five disks mounted on said shaft, said disks representing the multiples of all the digits.

56. In a computing machine, a multiplier unit comprising side members, five disks mounted on a common shaft, said disks representing the multiples of all the digits and having toothed portions above and below, and racks permanently in mesh with said portions.

57. In a computing machine, a multiplier unit comprising side members, five disks mounted on a common shaft, said disks representing the multiples of all the digits and having toothed portions above and below, racks in mesh with said portions, and means for maintaining said racks in mesh while permitting both a reciprocating and rocking movement thereof.

58. In a computing machine, a multiplier unit comprising end walls, a plurality of multiplier disks arranged between said walls, said disks being rotatably mounted on a common shaft, each disk having recesses constituting stops and having a radial recess, said radial recesses at least as deep as any of said stop recesses being arranged in the same plane when said disks are in normal position.

59. In a computing machine, a multiplier unit comprising side walls, a plurality of multiplier disks arranged between said walls and mounted about a common axis, one of said walls having a slot therein arranged radially with respect to said axis, a tongue arranged to slide back and forth in said slot, and radial recesses in each disk whereby when said recesses are in alinement with each other and with said slot, said tongue may move radially inward without being obstructed by said disks.

60. In a computing machine, a multiplier unit comprising side walls, each having a pair of oppositely extending slots therein, a plurality of multiplier disks arranged between said walls, said disks being rotatably mounted about a comomn axis, said slots being radially arranged with respect to said axis, and a member arranged to slide back and forth in each of said slots, each of said members projecting across the entire series of disks whereby the inward movement of either of said members may be limited by one of said disks.

61. In a computing machine, a multiplier unit comprising side walls, each having a pair of oppositely extending slots therein, a plurality of multiplier disks arranged between said walls, each of said disks having a series of steps or notches arranged on opposite sides thereof, said disks being rotatably mounted about a common axis, said slots being radially arranged with respect to said axis, and a member arranged to slide back and forth in each of said slots, each of said members projecting across the entire series of disks whereby the inward movement of either of said members is limited by said steps or notches.

62. In a computing machine, a multiplier unit comprising a pair of plates, five multiplier disks arranged between said plates, said disks being rotatably mounted about a common axis, each of said disks having opposite groups of circumferential notches whereby the entire multiplication table is represented in said unit and having a pair of radial recesses arranged diametrically opposite each other and of a depth at least as great as any of said steps or notches, all of said recesses being arranged in the same plane when said disks are in normal position, a pair of oppositely arranged spring actuated members adapted when released to slide toward each other in said recesses, and means for rotating any one of said disks to limit said inward movement.

63. In a computing machine, a multiplier unit comprising a pair of plates, five multiplier disks arranged between said plates, said disks being rotatably mounted about a common axis, each of said disks having opposite groups of circumferential notches whereby the entire multiplication table is represented in said unit and having a pair of radial recesses arranged diametrically opposite each other and of a depth at least as great as any of said notches, all of said recesses being arranged in the same plane when said disks are in normal position, a pair of oppositely arranged members adapted when released to slide toward each other in said recesses, means for rotating any one of said disks to limit said inward movement, and locks normally operative for preventing the inward movement of said members.

64. In a computing machine, a group of multiplier units, each of said units containing five multiplier disks which represent the multiples of all the digits, the disks in any one unit being exact duplicates of the disks of the remaining units.

65. In a computing machine, a group of multiplier units, each of said units containing five multiplier disks which represent the multiples of all the digits, the disks in any one unit being exact duplicates of the disks of the remaining units except one, and all the disks in each unit being unlike.

66. In a computing machine, a group of multiplier units, each of said units containing five multiplier disks which represent the multiples of all the digits, the disks in any one unit being exact duplicates of the disks of the remaining units except one, and all the disks in each unit being unlike, each of said disks representing the multiples of two digits.

67. In a computing machine, a series of multiplier units, each of said units including disks representing multiples of various digits, there being one of said groups for each desired order of the multiplicand, and additional groups representing the orders of the decimal equivalents of the desired fractions.

68. In a computing machine, a series of multiplier units arranged side by side, end walls for each unit, a pair of end walls for the entire series of units, a plurality of disks for each unit, racks for rotating said disks, and a transverse spacing element for said extreme end walls, said transverse element acting as a lock for said racks.

69. In a computing machine, a series of multiplier units arranged side by side, end walls for each unit, a pair of end walls for the entire series of units, a plurality of disks for each unit, racks for rotating said disks, a transverse spacing element for said extreme end walls, said transverse element acting as a lock for said racks, and means under the control of multiplicand keys for moving said racks out of engagement with said transverse element.

70. In a computing machine, a series of multiplier units, each unit including multiplier pinions and at least one rack in mesh with each pinion, a pair of transverse bars acting as locks for all of said racks whereby said pinions are prevented from rotating backward and forward, a sliding frame extending across all of said units, and means for moving any desired rack out of line with said bar and into positive engagement with said frame whereby the movement of said frame will slide said rack and cause the rotation of the corresponding pinion, said arm serving to lock said rack in engagement with said frame during said sliding movement.

71. In a computing machine, a reciprocating element, disks rotatable backward or forward, means adapted to coöperate with said element to move said disks either way, keys for causing said coöperation, and means controlled by multiplier keys for varying the extent of movement of said element and thereby determining the angular position of said disks.

72. In a computing machine, a reciprocating element, means adapted to coöperate with said element to properly position certain devices representing the multiples of the various digits by moving them in either of two directions, multiplicand keys for causing said coöperation, and means controlled by multiplier keys for varying the extent of movement of said element and thereby determining the positioning of said devices, said last mentioned means including a series of graduated stops.

73. In a computing machine, a reciprocating element, a series of groups of multiplying devices, the devices in each group representing the multiples of all the digits, means associated with each of said groups adapted to engage said element but normally out of engagement therewith, a series of multiplicand keys for each of said groups for causing such engagement, and means for preventing the engagement with said element of more than one of said engaging means in each group, said last mentioned means including a locking member coöperating with each series of keys.

74. In a multiplying machine, an operating shaft having a back and forth movement, a traveling member having a differential movement depending on the value of the multiplier digit, a plurality of multiplying devices adjustable in two directions, means coöperating with said member to cause such adjustment, and intermediate connections permitting a full and unvarying movement of said operating shaft regardless of the extent of movement of said member.

75. In a multiplying machine, a reciprocating element having a differential movement, a plurality of groups of rotatable multiplying devices, the devices in each group representing the multiples of all the digits, and means arranged on opposite sides of said devices adapted to engage said element to rotate said devices either backward or forward, said means being normally out of engagement with said reciprocating element.

76. In a multiplying machine, a reciprocating element having a differential movement, a plurality of groups of rotatable multiplying devices, the devices in each group representing the multiples of all the digits, means arranged on opposite sides of said devices adapted to engage said element to rotate said devices either backward or forward, said means being normally out of engagement with said reciprocating element, and multiplicand keys for causing the desired engagement.

77. In a computing machine, a series of pinions, means for rotating said pinions to indicate a partial product, a second series of pinions suitably mounted and normally out of engagement with said first pinions, means for causing the engagement of said two series of pinions after said first pinions have been moved to indicate a partial product, means for restoring said first pinions to initial position, whereby said partial product is transferred to said second series of pinions, and means for moving said second series of pinions from the lower orders to the successive higher orders, whereby successive partial product may be properly accumulated.

78. In a computing machine, means for determining partial products, a traveling carriage having means for accumulating successive partial products, and a second traveling carriage to which the total of said accumulated products may be transferred.

79. In a computing machine, means for determining partial products, a traveling carriage having means for accumulating successive partial products, and a second traveling carriage to which the total of said accumulated products may be transferred, said second carriage being normally stationary.

80. In a computing machine, means for determining partial products, a traveling carriage having means for accumulating successive partial products, a second traveling carriage to which the total of said accumulated products may be transferred, said second carriage being normally stationary, and means for causing said second carriage to travel with said first carriage.

81. In a computing machine, means for determining partial products, a traveling carriage having means for accumulating successive partial products, a second traveling carriage to which the total of said accumulated products may be transferred, said second carriage being normally stationary, and a lock for causing said carriages to travel together.

82. In a computing machine, means for determining partial products, a traveling carriage having means for accumulating successive partial products, a second traveling carriage to which the total of said accumulated products may be transferred, said second carriage being normally stationary, and means under the control of a decimal key for maintaining the relative positions of said two carriages during the movement of the first carriage.

83. In a computing machine, means for determining partial products, a traveling carriage having means for accumulating successive partial products, a second traveling carriage to which the total of said accumulated products may be transferred, said second carriage being normally stationary, and a lock actuated from the key board for locking said second carriage to said first carriage.

84. In a multiplying machine, means having a contour representing the multiplication table, mechanism for accumulating partial products, totalizing element to which said partial products may be transferred, and means under the control of a decimal key independently of any numeral key actuated in proper sequence with respect to the digits of the item being entered for controlling automatically the relative movement of said mechanism and said elements, whereby the final product is accurately pointed off.

85. In a multiplying machine, a series of multiplier keys representing the various digits and representing also the decimal point, mechanism for obtaining partial products, said mechanism operating in part by the depression of the keys representing the digits of the multiplier read from left to right, and means controlled by the decimal key for regulating the transfer of the accumulated partial products to the totalizer, whereby the depression of the decimal key in its natural order among the multiplier digits will properly position the digits of the final product with respect to the decimal point.

86. In a multiplying machine, means having a contour representing the multiplication table, a series of multiplier keys, said keys including a decimal key which is actuated in the natural sequence in which the decimal point appears among the digits of the item being entered independently of any other key.

87. In a computing machine, a series of pinions adapted to register a succession of products, printing mechanism for printing said products, an accumulator for adding said successive products, and means for connecting said pinions in operative relation to said printing mechanism and said accumulator to permit said printing and accumulating operation, said means including a pawl and ratchet mechanism permitting said accumulator to advance independently of said printing mechanism.

88. In a computing machine, a series of pinions for indicating products, a carriage containing printing mechanism and an accumulator, said pinions being normally disengaged from and independent of said carriage, means for throwing said pinions into operative relation with said carriage, and means for restoring said pinions to zero position whereby the product indicated thereon may be simultaneously printed and accumulated.

89. A carriage for a computing machine comprising a suitable frame adapted to move transversely across said machine, printing mechanism carried thereby, accumulator mechanism also carried thereby, pinions intermediate said printing mechanism and said accumulator mechanism and having operative connections with both, and means normally disengaged from said pinions but adapted to engage therewith to transfer a product thereto.

90. A carriage for a computing machine comprising a suitable frame adapted to move transversely across said machine, printing mechanism carried thereby, accumulator mechanism also carried thereby, pinions intermediate said printing mechanism and said accumulator mechanism and having operative connections with both, means normally disengaged from said pinions but adapted to engage therewith to transfer a product thereto, and stops for limiting the movement of said means, said stops being mounted on said carriage.

91. In a multiplying machine, a series of accumulator pinions, a pivoted frame adjacent thereto, a train of gears carried by said pivoted frame, reversing gears normally in engagement with said pinions, and means for moving said pivoted frame to effect an operative connection between said reversing gear and said train.

92. In a multiplying machine, a traveling carriage comprising a suitable supporting frame, a printing mechanism for printing successive items, an accumulator mechanism for accumulating said items, and means actuated by a decimal key for controlling the movement of said carriage independently of any numeral key.

93. In a multiplying machine, a movable carriage comprising printing mechanism for printing successive products, an accumulator mechanism for accumulating said products, and means actuated by a decimal key for controlling the movement of said carriage independently of any numeral key.

94. In a multiplying machine, a movable carriage comprising printing mechanism for printing successive products, an accumulator mechanism for accumulating said products, and operative connections between said accumulator mechanism and said printing mechanism whereby the total of said products may be printed.

95. In a multiplying machine, a movable carriage comprising a suitable frame, printing mechanism mounted therein for printing successive products, accumulator mechanism also mounted therein operatively connected with said printing mechanism whereby individual products are either added or subtracted in said accumulator, and means for positioning said printing mechanism in accordance with the total indicated by said accumulator mechanism whereby any desired total may be printed.

96. In a computing machine, a series of disks adapted for differential rotation forward or backward, rack bars adapted to have a differential movement determined by said disks, a main operating shaft, and connections between said shaft and said other two elements whereby said disks are first rotated one way or the other and said rack bars are then moved until positioned by said disks.

97. In a computing machine, computing mechanism, a carriage printing mechanism mounted in said carriage, a decimal key controlling the position of said carriage, a main operating shaft, connections between said shaft and said respective mechanisms, one of said connections being normally inoperative, and means for rendering the same operative at will.

98. In a computing machine, computing mechanism, printing mechanism, a main operating shaft, a plurality of arms loosely mounted on said shaft, connections between said arms and said respective mechanisms, and means for locking one or the other of said arms to said shaft to permit the operation of one or the other of said mechanisms.

99. In a computing machine, a traveling carriage having pinions which indicate products or the sum of successive partial products, means for imparting to said carriage a step by step movement, and additional means for rendering said first means inoperative at will.

100. In a computing machine, a carriage having a step by step movement to accumulate partial products, a series of pinions carried by a supporting frame on said carriage and means for raising and lowering said frame to coöperate with the actuating mechanism in one position and with the totalizing mechanism in another position.

101. In a computing machine, a carriage having a step by step transverse movement to accumulate partial products, a series of denominational pinions therein, and means for automatically moving said pinions bodily with respect to said carriage upon each actuation of the machine to coöperate with the actuating mechanism in one position and with the totalizing mechanism in another position.

102. In a computing machine, a carriage having a step by step transverse movement, a series of denominational pinions therein, means for automatically moving said pinions bodily with respect to said carriage upon each actuation of the machine, and key-controlled means for moving said pinions at will in another direction for totalizing.

103. A multiplying machine comprising a main body portion containing mechanism for obtaining successive partial products, a main carriage in which the final products may be accumulated, and an intermediate carriage normally out of operative relation with either said main body or said main carriage but adapted to have operative connection with either.

104. A multiplying machine comprising a main body portion containing mechanism for obtaining successive partial products, a main carriage in which the final products may be accumulated, an intermediate carriage normally out of operative relation with either said main body or said main carriage but adapted to have operative connection with either, means for automatically bringing said intermediate carriage into operative relation with the main body during each actuation of the machine, and means for bringing said intermediate carriage into operative engagement with said main carriage whenever desired.

105. A multiplying machine comprising a main body portion containing mechanism for obtaining successive partial products, a main carriage in which the final products may be accumulated, an intermediate carriage normally out of operative relation with either said main body or said main carriage but adapted to have operative connection with either, means for automatically lowering parts of said intermediate carriage into operative relation with the main body during each actuation of the machine, means for raising said parts into operative engagement with said main carriage whenever desired, said carriages being normally independent of each other in their relative movement, and means for causing said carriages to travel in unison.

106. A multiplying machine having an accumulating and printing carriage containing accumulator pinions, means controlled by the successive multiplying operations for positioning said carriage, means for reversing the rotation of said pinions to effect subtraction, and means controlled by a total key for adjusting the accumulator mechanism to subtraction position in printing a grand total.

107. In a multiplying machine, a main carriage and an intermediate carriage, said intermediate carriage having a step by step transverse movement, said main carriage being normally stationary, an arm for locking said main carriage in normal position, said arm coöperating with a notched rail, and means under the control of the decimal key for disengaging said arm from the notch in said rail and for causing it to engage said intermediate carriage to lock said main carriage thereto, said rail serving to maintain said locking engagement in all positions of said main carriage other than initial positions.

108. In a multiplying machine, multiplying units for the respective orders to the right of the fraction point, decimal keys, and intermediate connections permitting the actuation of the multiplier elements representing the decimal equivalents of the fractional keys.

109. In a multiplying machine, multiplying units for the respective orders to the right of the decimal point, decimal keys and intermediate connections permitting the actuation of the multiplier elements representing the decimal equivalents of the fractional keys, said connections comprising a shaft which is rotated by the depression of a key and a plurality of arms on said shaft for actuating the elements of the desired units.

110. In a computing machine, a pair of racks movable toward each other for determining the digits of a product, and means for locking said racks in initial position.

111. In a computing machine, a series of multiplier disks, a pair of racks adapted to move in opposite directions toward the centers of said disks, and locks for preventing such movement.

112. In a computing machine, a series of multiplier disks, a pair of racks adapted to move in opposite directions toward the centers of said disks, locks for preventing such movement, multiplicand keys, and means controlled by the actuation of said keys for unlocking said racks.

113. A multiplying machine comprising means for obtaining partial products, a totalizing actuator member adapted to add a number greater than a single digit, and transfer mechanism connected to the totalizer adapted to transfer one or more to the next higher order totalizer wheel during one cycle of operation of the machine.

In witness whereof I hereunto subscribe my name this 16th day of November, A. D., 1912.

JOHN P. CLULEY.

Witnesses:
 EUGENIE LE ROUX,
 H. L. ROCKWELL.